(12) United States Patent
Phoebe et al.

(10) Patent No.: US 11,079,360 B2
(45) Date of Patent: Aug. 3, 2021

(54) SYSTEMS AND METHODS FOR CHROMATOGRAPHIC ANALYSIS

(71) Applicant: Waters Technologies Corporation, Milford, MA (US)

(72) Inventors: Aaron D. Phoebe, Uxbridge, MA (US); Sylvain G. Cormier, Mendon, MA (US); Charles H. Phoebe, Jr., Uxbrige, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 201 days.

(21) Appl. No.: 16/139,356

(22) Filed: Sep. 24, 2018

(65) Prior Publication Data
US 2019/0101513 A1    Apr. 4, 2019

Related U.S. Application Data

(60) Provisional application No. 62/567,822, filed on Oct. 4, 2017.

(51) Int. Cl.
*G01N 30/20*     (2006.01)
*G01N 30/32*     (2006.01)
*G01N 30/86*     (2006.01)
*G01N 30/64*     (2006.01)
(Continued)

(52) U.S. Cl.
CPC ............. *G01N 30/20* (2013.01); *G01N 30/32* (2013.01); *G01N 30/64* (2013.01);
(Continued)

(58) Field of Classification Search
CPC ........ G01N 30/20; G01N 30/88; G01N 30/32; G01N 30/8696; G01N 30/64;
(Continued)

(56) References Cited

U.S. PATENT DOCUMENTS 6,318,157 B1 * 11/2001 Corso ................. G01N 30/466
                                              210/198.2
6,576,125 B2 *  6/2003 Berger ................. B01D 15/14
                                              210/198.2
(Continued)

FOREIGN PATENT DOCUMENTS

WO    2013134222 A1    9/2013
WO    2016160157 A1   10/2016

OTHER PUBLICATIONS

Agilent, Agilent 7890 Series Gas Chromatograph Advanced operation Manual, pp. 215-226 (Year: 2013).*
(Continued)

*Primary Examiner* — Jonathan M Dunlap
(74) *Attorney, Agent, or Firm* — Schmeiser, Olsen & Watts LLP

(57) ABSTRACT

Methods of chromatographic detection are provided that include the step of providing a chromatography instrument without an autosampler, an external device, a pressurized sample injection device and a chromatographic data system. The chromatographic instrument has a sample valve, a column manager and a solvent manager. The present methods further include the steps: injecting sample into the sample valve with a pressurized sample injection device; transmitting a signal from the chromatographic data system to the external device, receiving the signal by the external device, producing an event output with the external device, discharging solvent from the solvent manager into the sample valve, and discharging sample into the column for chromatographic detection.

20 Claims, 65 Drawing Sheets

(51) Int. Cl.
*G01N 30/88* (2006.01)
*G01N 30/02* (2006.01)

(52) U.S. Cl.
CPC ......... *G01N 30/8696* (2013.01); *G01N 30/88* (2013.01); *G01N 2030/027* (2013.01); *G01N 2030/201* (2013.01); *G01N 2030/202* (2013.01); *G01N 2030/326* (2013.01); *G01N 2030/328* (2013.01); *G01N 2030/8804* (2013.01)

(58) Field of Classification Search
CPC ..... G01N 2030/8804; G01N 2030/328; G01N 2030/201; G01N 2030/202; G01N 2030/326; G01N 2030/027
See application file for complete search history.

(56) References Cited

U.S. PATENT DOCUMENTS

| | | | | |
|---|---|---|---|---|
| 8,312,762 | B2* | 11/2012 | Fadgen | G01N 30/20 73/61.55 |
| 9,470,664 | B2* | 10/2016 | Dourdeville | G01N 30/04 |
| 10,054,569 | B2* | 8/2018 | Song | G01N 30/88 |
| 10,209,229 | B2* | 2/2019 | Albrecht, Jr. | G01N 30/20 |
| 2012/0262178 | A1* | 10/2012 | Dourdeville | G01N 30/82 324/321 |
| 2015/0089997 | A1 | 4/2015 | Nema et al. | |
| 2016/0077060 | A1* | 3/2016 | Cormier | B01D 15/12 73/864.34 |
| 2016/0077061 | A1* | 3/2016 | Cormier | G01N 30/20 73/61.55 |
| 2018/0340916 | A1* | 11/2018 | Song | G01N 30/24 |

OTHER PUBLICATIONS

International Search Report & Written Opinion in PCT/US2018/052359 dated Jan. 28, 2019; 20 pages.
"Waters e-SAT/IN Module Installation Guide," Jan. 1, 2010, Waters Technologies Corporation; 70 pages.
International Preliminary Report on Patentablity in PCT/US2018/052359 dated Apr. 16, 2020.

* cited by examiner

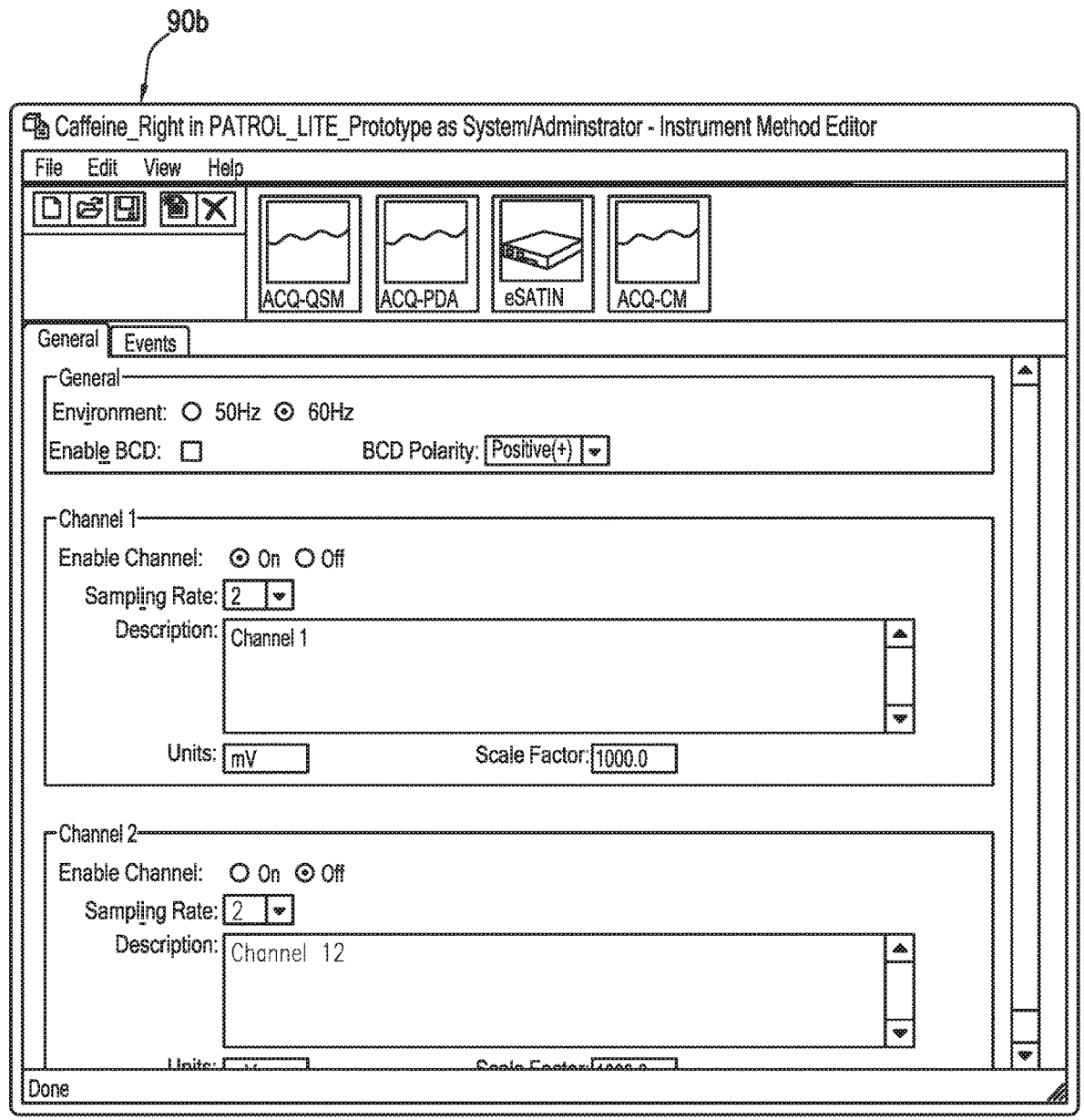
FIG. 10C1

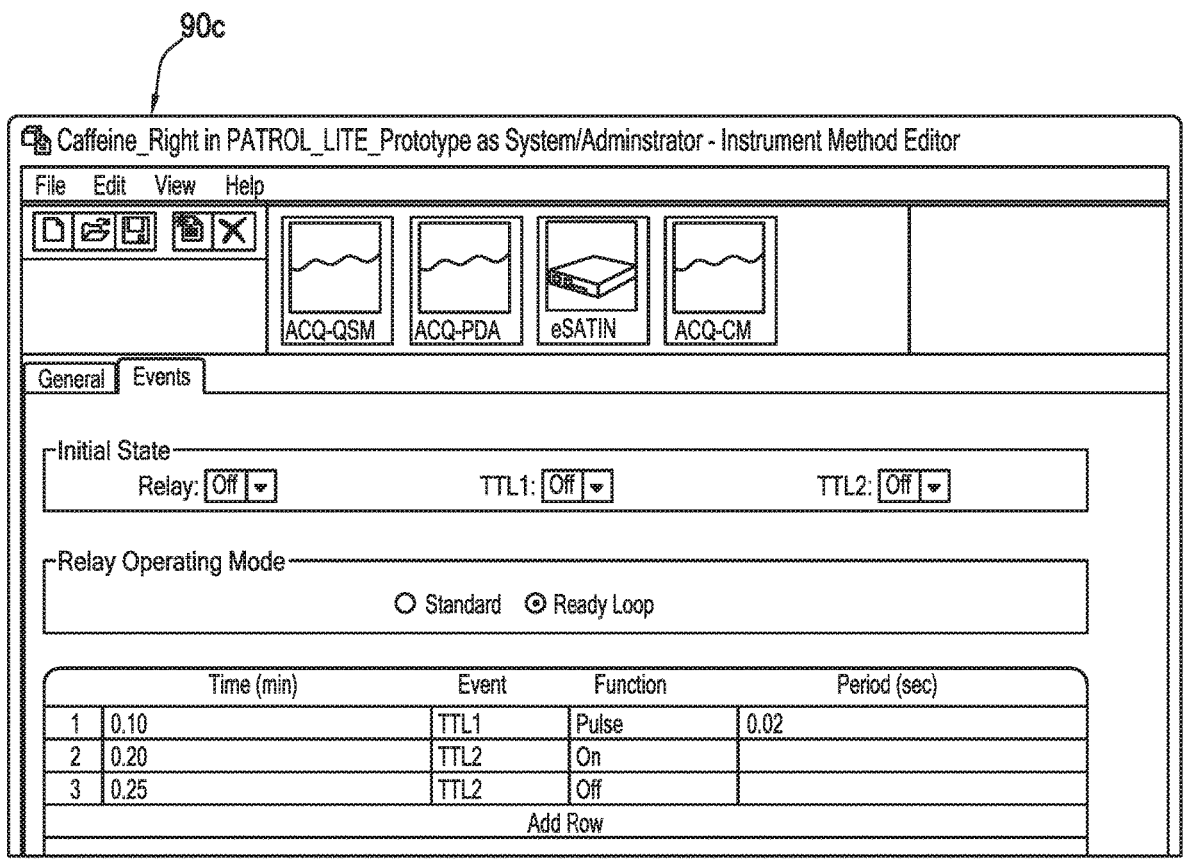
FIG. 10C2

Caffeine in PATROL_LITE_Prototype as System/Administrator - Instrument Method Ed

File  Edit  View  Help

ACQ-QSM   ACQ-PDA   eSATIN   ACQ-CM

Quaternary Solvent Manager

Auto-Blend Plus™

General | Misc | Data

Solvents
- A: Water
- B: Acetonitrile
- C: Methanol
- D: Water 2% Formic Acid    No Change

Pressure Limits
- Low: 0 psi
- High: 15000 psi

Seal Wash Period: 5.00 min

Gradient:

| # | Time | Flow (mL/min) | %A | %B | %C | %D | Curve |
|---|------|---------------|------|------|-----|-----|---------|
| 1 | Initial | 0.600 | 80.00 | 15.0 | 0.0 | 5.0 | Initial |
| 2 | 1.00 | 0.600 | 80.00 | 15.0 | 0.0 | 5.0 | 6 |
| 3 | 1.90 | 0.600 | 80.00 | 15.0 | 0.0 | 5.0 | 11 |
| 4 |  |  |  |  |  |  |  |

Comment:

*FIG. 15A*

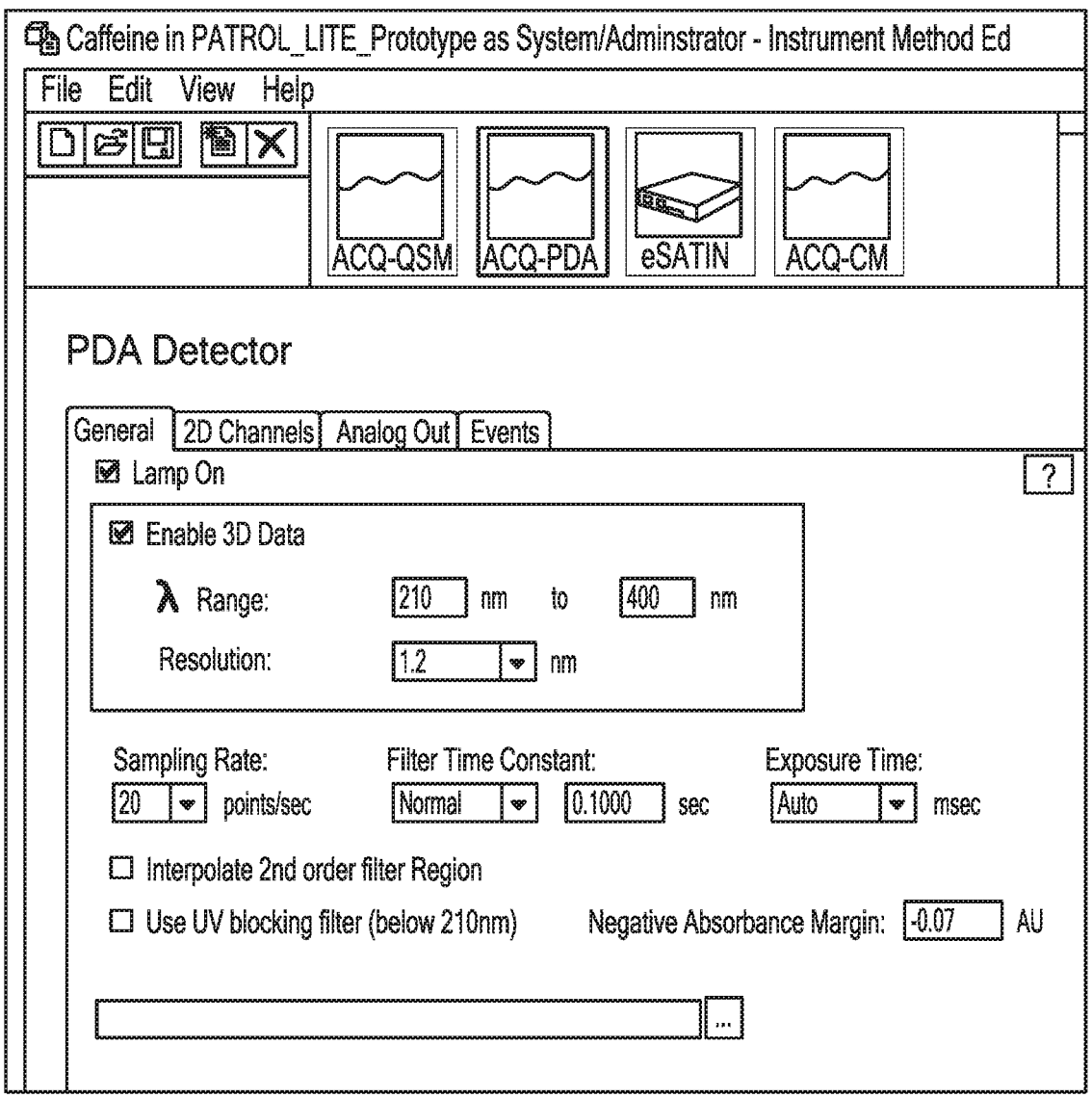
FIG. 15B1
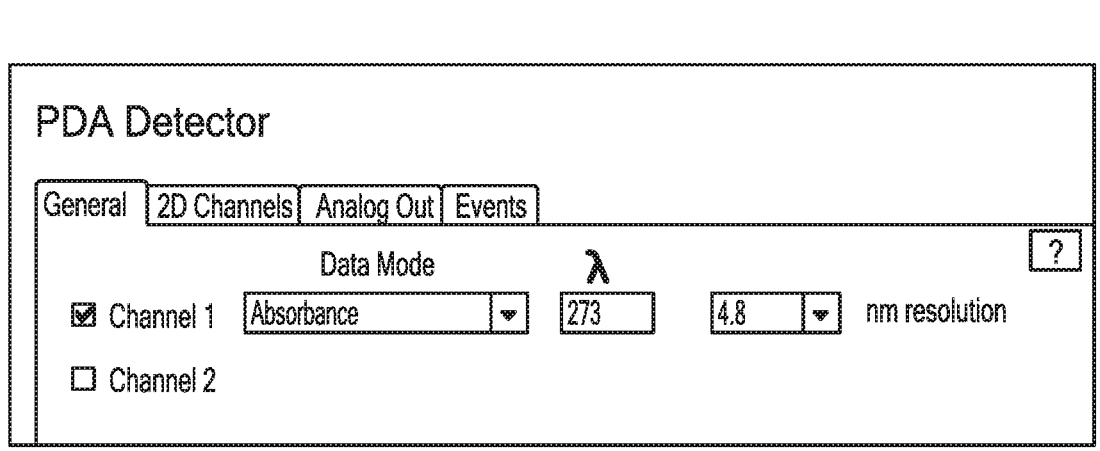
FIG. 15B2

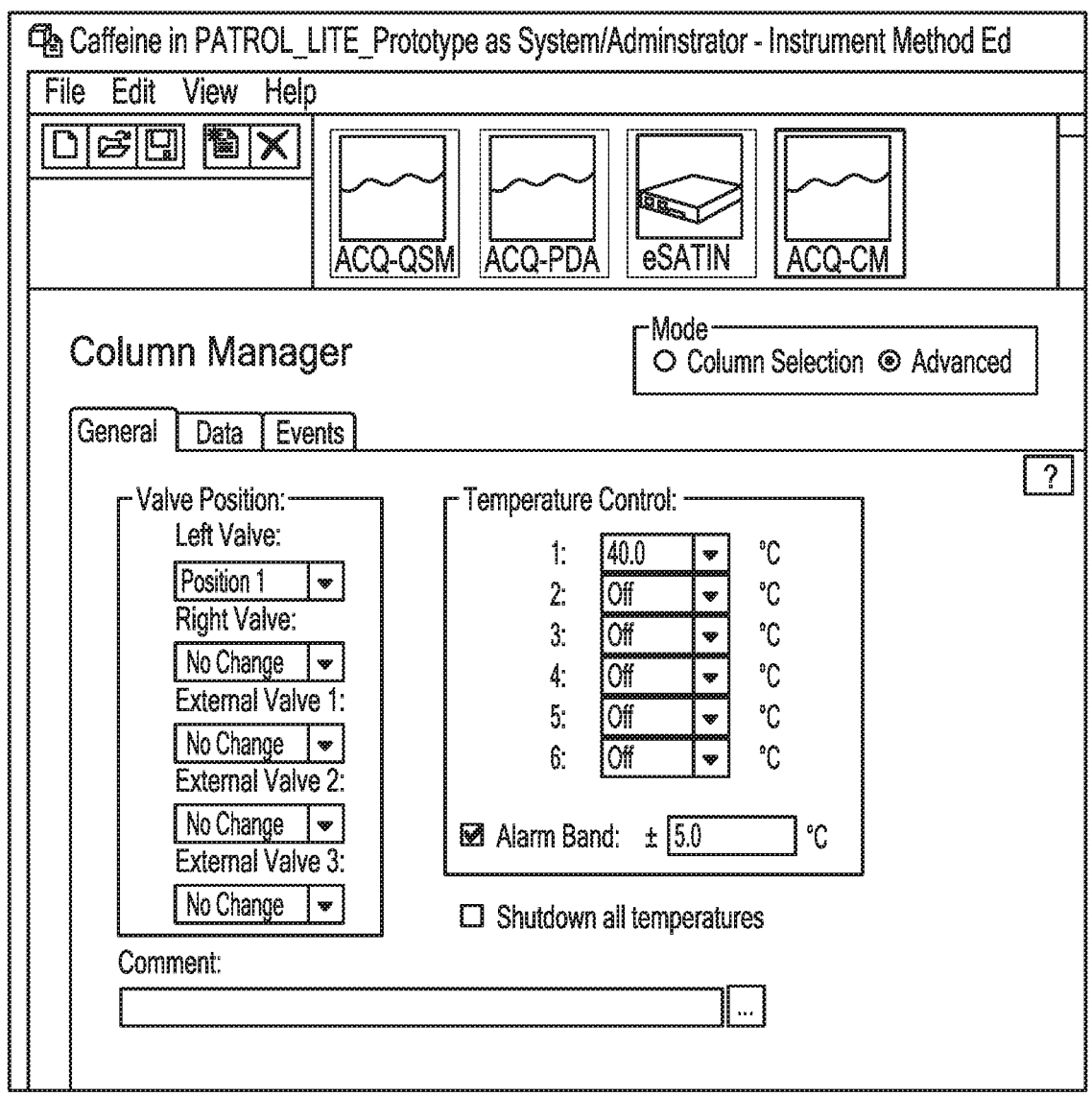
FIG. 15C1

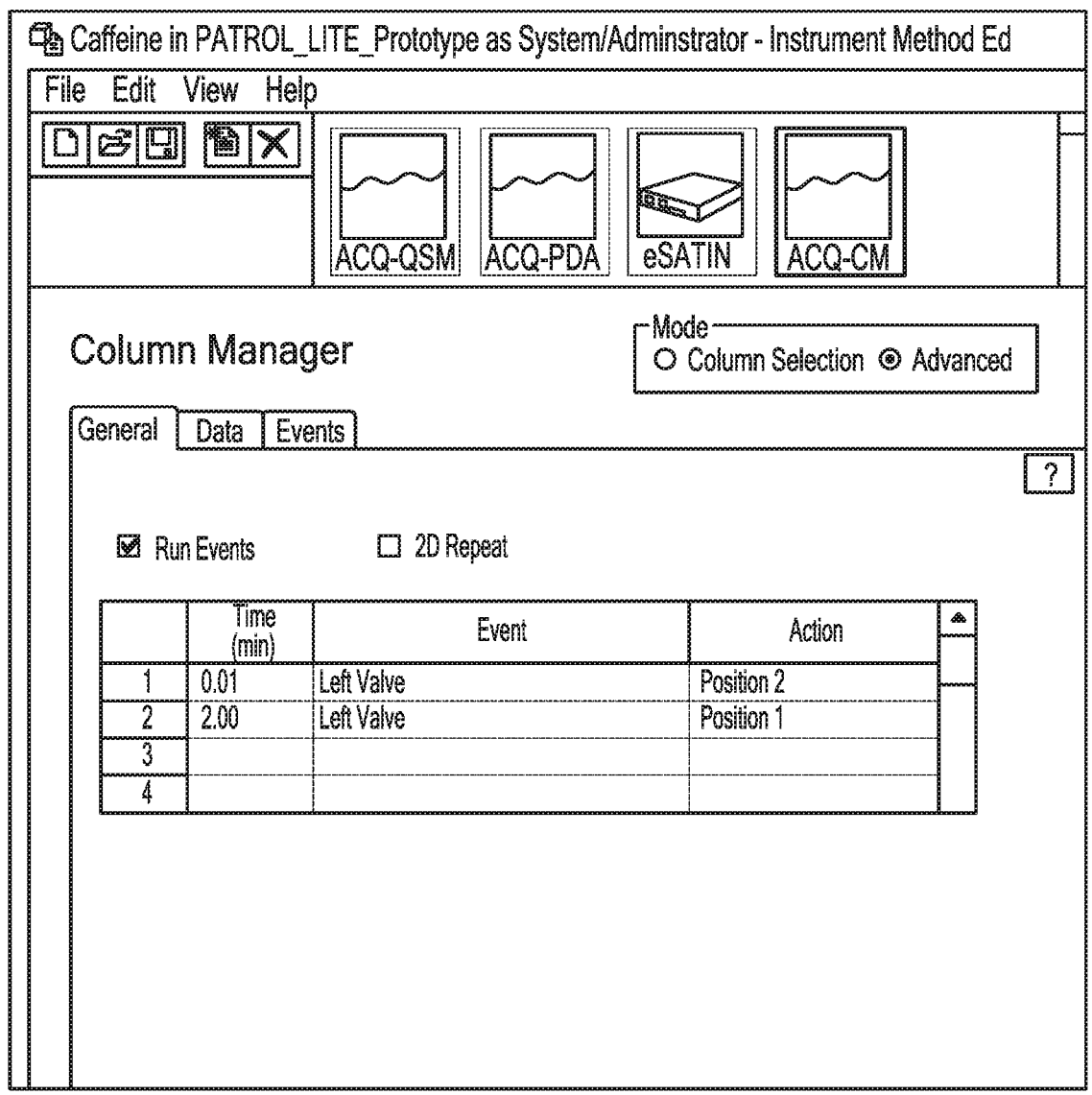
FIG. 15C2

FIG. 15D1

| General | Events | | | | | |
|---|---|---|---|---|---|---|
| Initial State | | | | | | |
| Relay: Off ⌄ | | TTL1: Off ⌄ | | TTL2: Off ⌄ | | |
| Relay Operating Mode | | | | | | |
| ○ Standard ● Ready Loop | | | | | | |
| | Time (min) | Event | Function | Period (sec) |
| 1 | 0.10 | TTL1 | Pulse | 0.02 |
| 2 | 0.20 | TTL2 | On | |
| 3 | 0.25 | TTL2 | Off | |

*FIG. 15D2*

PEAK RESULTS

|   | NAME | RT | AREA | HEIGHT |
|---|---|---|---|---|
| 1 | CAFFEINE | 0.408 | 369046 | 581528 |
| 2 | CAFFEINE | 0.409 | 369324 | 581426 |
| 3 | CAFFEINE | 0.409 | 369150 | 582639 |
| 4 | CAFFEINE | 0.410 | 369223 | 583557 |
| MEAN | | 0.409 | 369186 | 582287 |
| STD. DEV. | | 0.001 | 117 | 1009 |
| % RSD | | 0.17 | 0.03 | 0.17 |

FIG. 15G

| VIAL | INJECTION | SAMPLE NAME | SAMPLE TYPE | DATE ACQUIRED | ACQ METHOD SET | INJECTION VOLUME (uL) | CHANNEL | CHANNEL DESCRIPTION |
|---|---|---|---|---|---|---|---|---|
| 1 | 1 | Caffeine_1B | UNKNOWN | 9/12/2013 7:50:15 AM EDT | CAFFEINE | 1.00 | PDA Ch1 273nm@4.8nm | PDA Ch1 273nm@4.8nm |
| 2 | 1 | Caffeine_2B | UNKNOWN | 9/12/2013 7:54:57 AM EDT | CAFFEINE | 1.00 | PDA Ch1 273nm@4.8nm | PDA Ch1 273nm@4.8nm |
| 3 | 1 | Caffeine_3B | UNKNOWN | 9/12/2013 7:58:37 AM EDT | CAFFEINE | 1.00 | PDA Ch1 273nm@4.8nm | PDA Ch1 273nm@4.8nm |
| 4 | 1 | Caffeine_4B | UNKNOWN | 9/12/2013 8:02:49 AM EDT | CAFFEINE | 1.00 | PDA Ch1 273nm@4.8nm | PDA Ch1 273nm@4.8nm |

FIG. 15H

Quaternary Solvent Manager

Gradient_2 in PATROL_LITE_Prototype as System/Adminstrator - Instrument Method Ed File  Edit  View  Help ACQ-QSM   ACQ-PDA   eSATIN   ACQ-CM Auto-Blend Plus™

Tabs: General | Misc | Data

Solvents
- A: Water
- B: Acetonitrile
- C: Methanol
- D: Water 2% Formic Acid — No Change

Pressure Limits
- Low: 0 psi
- High: 15000 psi

Seal Wash Period: 5.00 min

Gradient:

| # | Time | Flow (mL/min) | %A | %B | %C | %D | Curve |
|---|------|---------------|------|------|-----|-----|---------|
| 1 | Initial | 0.600 | 85.0 | 10.0 | 0.0 | 5.0 | Initial |
| 2 | 3.50 | 0.600 | 5.0 | 90.0 | 0.0 | 5.0 | 6 |
| 3 | 3.51 | 0.600 | 85.0 | 10.0 | 0.0 | 5.0 | 11 |
| 4 | 5.00 | 0.600 | 85.0 | 10.0 | 0.0 | 5.0 | 11 |

Comment:

*FIG. 16B1*

| Gradient | | | | | | |
|---|---|---|---|---|---|---|
| | Time | Flow (mL/min) | %A | %B | %C | %D | Curve |
| 1 | Initial | 0.600 | 85.0 | 10.0 | 0.0 | 5.0 | Initial |
| 2 | 3.50 | 0.600 | 5.0 | 90.0 | 0.0 | 5.0 | 6 |
| 3 | 3.51 | 0.600 | 85.0 | 10.0 | 0.0 | 5.0 | 11 |
| 4 | 5.00 | 0.600 | 85.0 | 10.0 | 0.0 | 5.0 | 11 |
| 5 | 10.00 | 0.000 | 85.0 | 10.0 | 0.0 | 5.0 | 11 |
| 6 | | | | | | | |
| 7 | | | | | | | |
| 8 | | | | | | | |

FIG. 16B2

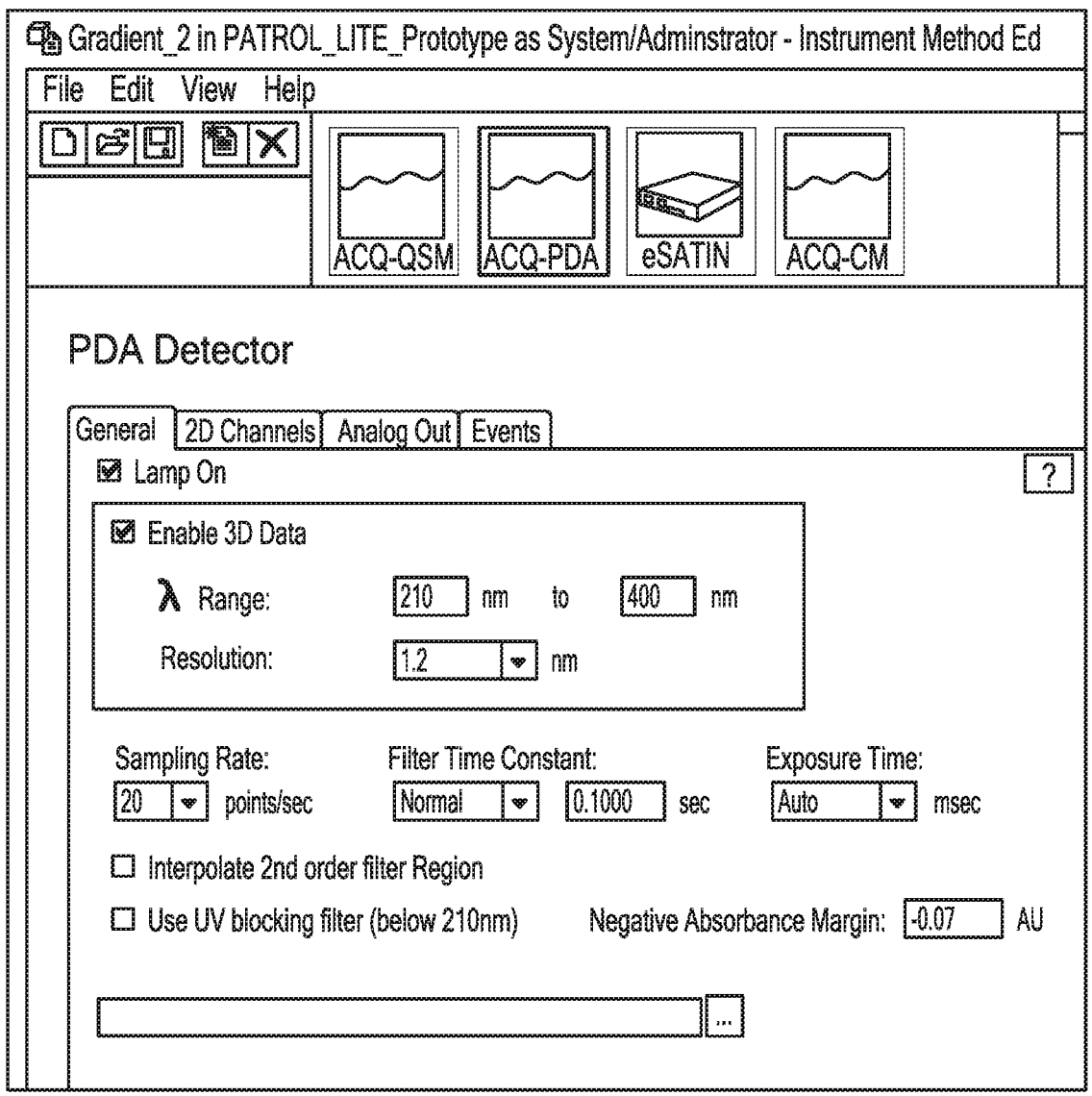
FIG. 16C1
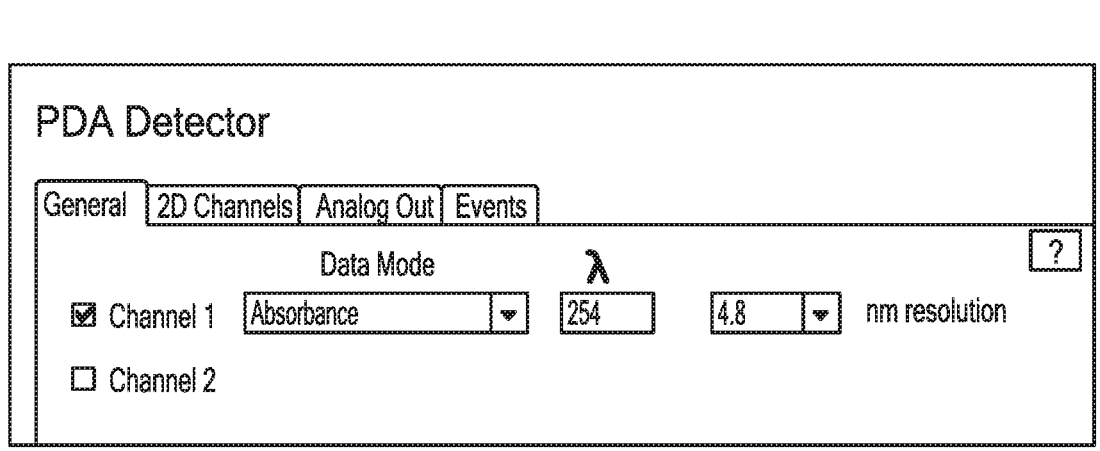
FIG. 16C2

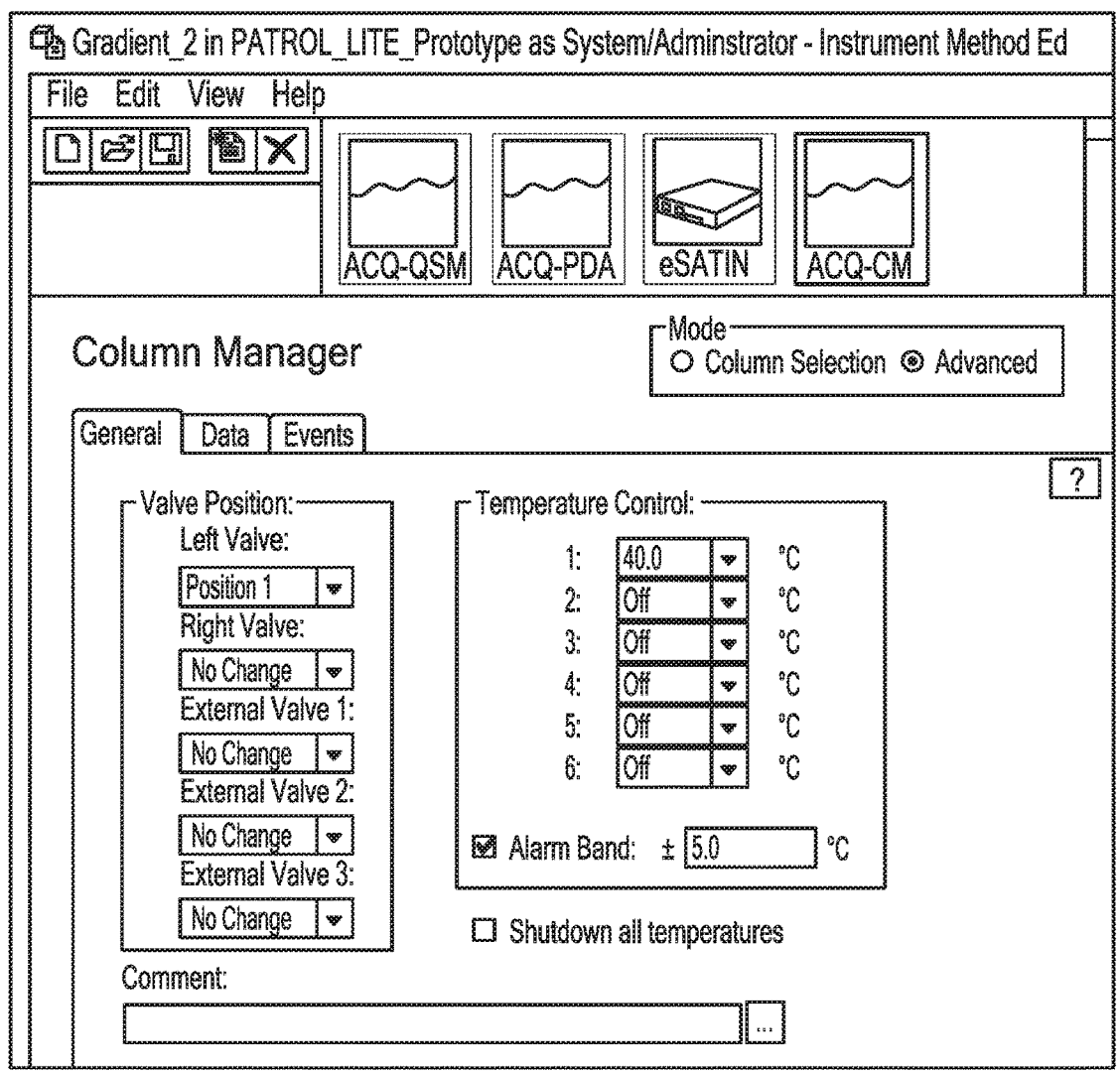
FIG. 16D1
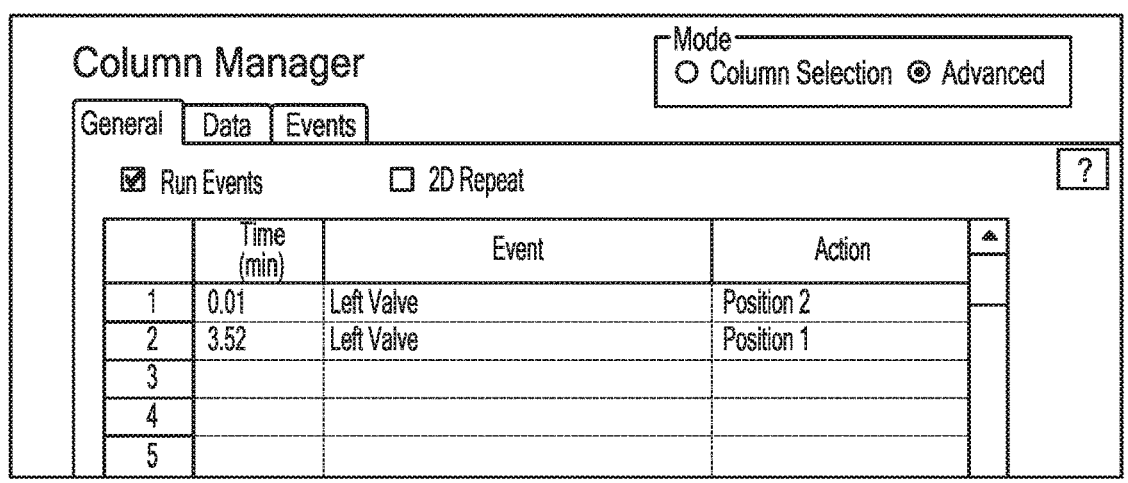
FIG. 16D2

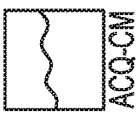
FIG. 16E1

FIG. 16E2

General | Events

Initial State

Relay: [Off ▼]    TTL1: [Off ▼]    TTL2: [Off ▼]

Relay Operating Mode

○ Standard  ● Ready Loop

| | Time (min) | Event | Function | Period (sec) |
|---|---|---|---|---|
| 1 | 0.10 | TTL1 | Pulse | 0.02 |
| 2 | 0.15 | TTL2 | On | |
| 3 | 0.25 | TTL2 | Off | |
| | | Add Row | | |

PEAK RESULTS: 2-ACETYLFURAN

| | NAME | RT | AREA | HEIGHT |
|---|---|---|---|---|
| 1 | 2-ACETYLFURAN | 0.780 | 41223 | 43957 |
| 2 | 2-ACETYLFURAN | 0.781 | 41103 | 43970 |
| 3 | 2-ACETYLFURAN | 0.782 | 41122 | 43898 |
| 4 | 2-ACETYLFURAN | 0.783 | 41154 | 43954 |
| MEAN | | 0.782 | 41151 | 43945 |
| STD. DEV. | | 0.001 | 53 | 32 |
| % RSD | | 0.14 | 0.13 | 0.07 |

*FIG. 16H1*

PEAK RESULTS: BUTYLPARABEN

| | NAME | RT | AREA | HEIGHT |
|---|---|---|---|---|
| 1 | BUTYLPARABEN | 2.410 | 66722 | 81284 |
| 2 | BUTYLPARABEN | 2.410 | 66660 | 81444 |
| 3 | BUTYLPARABEN | 2.411 | 66771 | 81375 |
| 4 | BUTYLPARABEN | 2.411 | 66701 | 81434 |
| MEAN | | 2.410 | 66713 | 81384 |
| STD. DEV. | | 0.001 | 46 | 73 |
| % RSD | | 0.03 | 0.07 | 0.09 |

*FIG. 16H2*

PEAK RESULTS: ACETANILIDE

| | NAME | RT | AREA | HEIGHT |
|---|---|---|---|---|
| 1 | ACETANILIDE | 1.098 | 35182 | 42917 |
| 2 | ACETANILIDE | 1.099 | 35204 | 43051 |
| 3 | ACETANILIDE | 1.099 | 35201 | 43063 |
| 4 | ACETANILIDE | 1.100 | 35209 | 43056 |
| MEAN | | 1.099 | 35199 | 43022 |
| STD. DEV. | | 0.001 | 12 | 70 |
| % RSD | | 0.06 | 0.03 | 0.06 |

*FIG. 16H3*

PEAK RESULTS: ACETOPHENONE

| | NAME | RT | AREA | HEIGHT |
|---|---|---|---|---|
| 1 | ACETOPHENONE | 1.637 | 47634 | 53003 |
| 2 | ACETOPHENONE | 1.637 | 47638 | 53017 |
| 3 | ACETOPHENONE | 1.638 | 47593 | 52970 |
| 4 | ACETOPHENONE | 1.638 | 47596 | 53038 |
| MEAN | | 1.637 | 47615 | 53007 |
| STD. DEV. | | 0.000 | 24 | 29 |
| % RSD | | 0.02 | 0.05 | 0.05 |

FIG. 16H5

PEAK RESULTS: BENZOPHENONE

| | NAME | RT | AREA | HEIGHT |
|---|---|---|---|---|
| 1 | BENZOPHENONE | 2.618 | 83715 | 89100 |
| 2 | BENZOPHENONE | 2.618 | 83572 | 83950 |
| 3 | BENZOPHENONE | 2.619 | 93633 | 89016 |
| 4 | BENZOPHENONE | 2.619 | 83640 | 88902 |
| MEAN | | 2.618 | 83640 | 88992 |
| STD. DEV. | | 0.001 | 59 | 86 |
| % RSD | | 0.03 | 0.07 | 1.10 |

FIG. 16H4

PEAK RESULTS: VALEROPHENONE

| | NAME | RT | AREA | HEIGHT |
|---|---|---|---|---|
| 1 | VALEROPHENONE | 2.783 | 29976 | 31311 |
| 2 | VALEROPHENONE | 2.784 | 29866 | 31266 |
| 3 | VALEROPHENONE | 2.785 | 29926 | 31396 |
| 4 | VALEROPHENONE | 2.785 | 29850 | 31293 |
| MEAN | | 2.784 | 29955 | 31317 |
| STD. DEV. | | 0.001 | 22 | 56 |
| % RSD | | 0 | 0 | 0 |

FIG. 16H6

PEAK RESULTS: PROPRIOPHENONE

| | NAME | RT | AREA | HEIGHT |
|---|---|---|---|---|
| 1 | PROPRIOPHENONE | 2.100 | 33769 | 36370 |
| 2 | PROPRIOPHENONE | 2.100 | 33827 | 36350 |
| 3 | PROPRIOPHENONE | 2.101 | 33829 | 36372 |
| 4 | PROPRIOPHENONE | 2.101 | 33822 | 36378 |
| MEAN | | 2.101 | 33812 | 36368 |
| STD. DEV. | | 0.000 | 28 | 12 |
| % RSD | | 0.02 | 0.08 | 0.03 |

FIG. 16H7

Protein_A_Sean_Method in Protein_A as System/Administrator - Instrument Method Ed File  Edit  View  Help ACQ-QSM | eSATIN | ACQ-CM | ACQ-BSM | ACQ-TUV

Quaternary Solvent Manager

Auto-Blend Plus™

General | Misc | Data

Solvents
- A: Water
- B: Acetonitrile
- C: Methanol
- D: Water 2% Formic Acid    No Change Pressure Limits
- Low: 0 psi
- High: 15000 psi Seal Wash Period: 5.00 min Gradient:

| # | Time | Flow (mL/min) | %A | %B | %C | %D | Curve |
|---|------|---------------|------|------|------|------|---------|
| 1 | Initial | 0.500 | 95.0 | 0.0 | 0.0 | 5.0 | Initial |
| 2 | 4.20 | 0.200 | 95.0 | 0.0 | 0.0 | 5.0 | 11 |
| 3 | 5.70 | 0.200 | 0.0 | 95.0 | 0.0 | 5.0 | 6 |
| 4 | 5.80 | 0.500 | 95.0 | 0.0 | 0.0 | 5.0 | 6 |

Comment:

*FIG. 17A1*

Gradient

| # | Time | Flow (mL/min) | %A | %B | %C | %D | Curve |
|---|------|---------------|------|------|-----|-----|---------|
| 1 | Initial | 0.500 | 95.0 | 0.0 | 0.0 | 5.0 | Initial |
| 2 | 4.20 | 0.200 | 95.0 | 0.0 | 0.0 | 5.0 | 11 |
| 3 | 5.70 | 0.200 | 0.0 | 95.0 | 0.0 | 5.0 | 6 |
| 4 | 5.80 | 0.500 | 95.0 | 0.0 | 0.0 | 5.0 | 6 |
| 5 | 6.50 | 0.500 | 0.0 | 95.0 | 0.0 | 5.0 | 6 |
| 6 | 6.60 | 0.500 | 95.0 | 0.0 | 0.0 | 5.0 | 6 |
| 7 | 7.20 | 0.500 | 0.0 | 95.0 | 0.0 | 5.0 | 6 |
| 8 | 7.30 | 0.500 | 95.0 | 0.0 | 0.0 | 5.0 | 6 |
| 9 | 20.00 | 0.000 | 95.0 | 0.0 | 0.0 | 5.0 | 11 |
| 10 | | | | | | | |
| 11 | | | | | | | |

FIG. 17A2

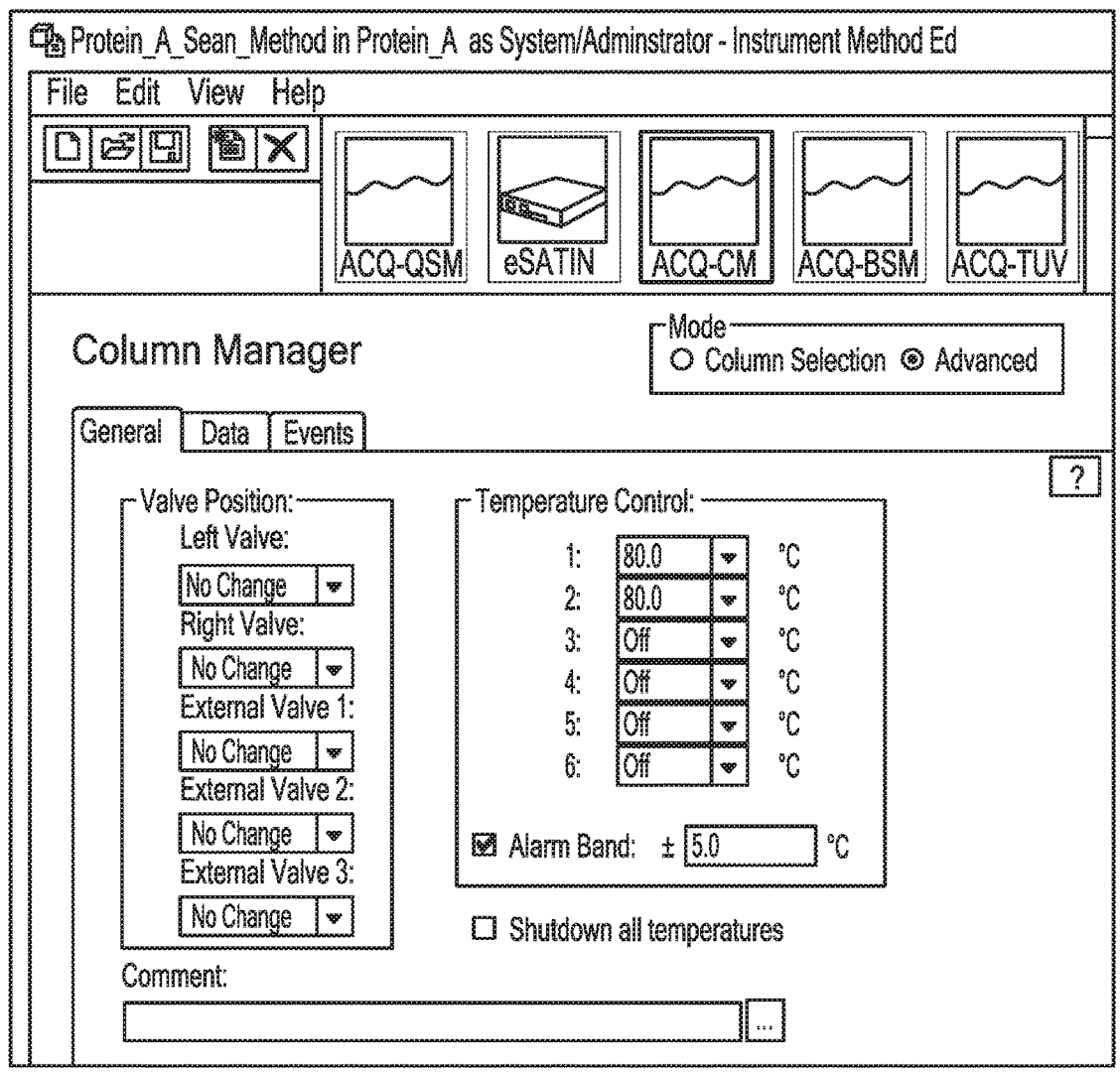
FIG. 17B1
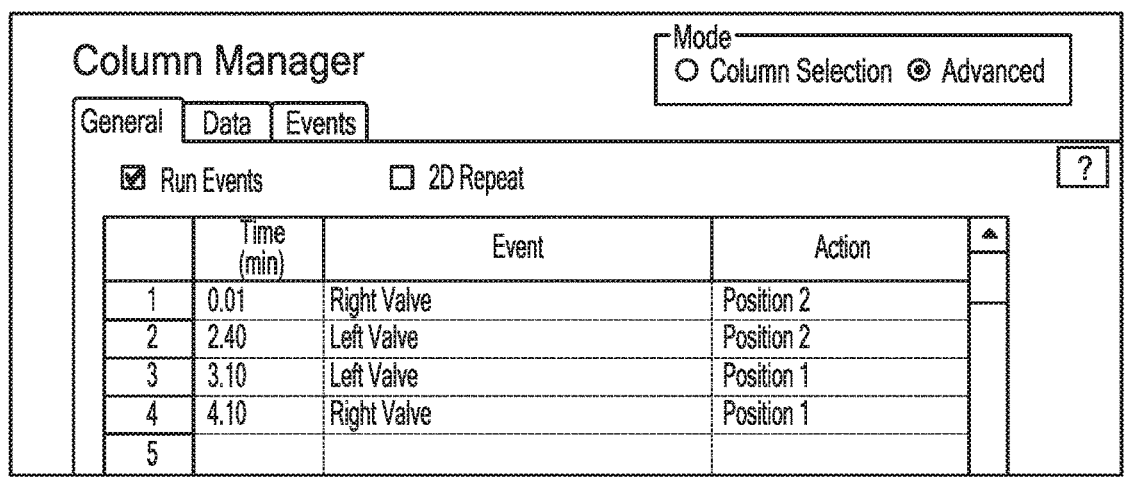
FIG. 17B2

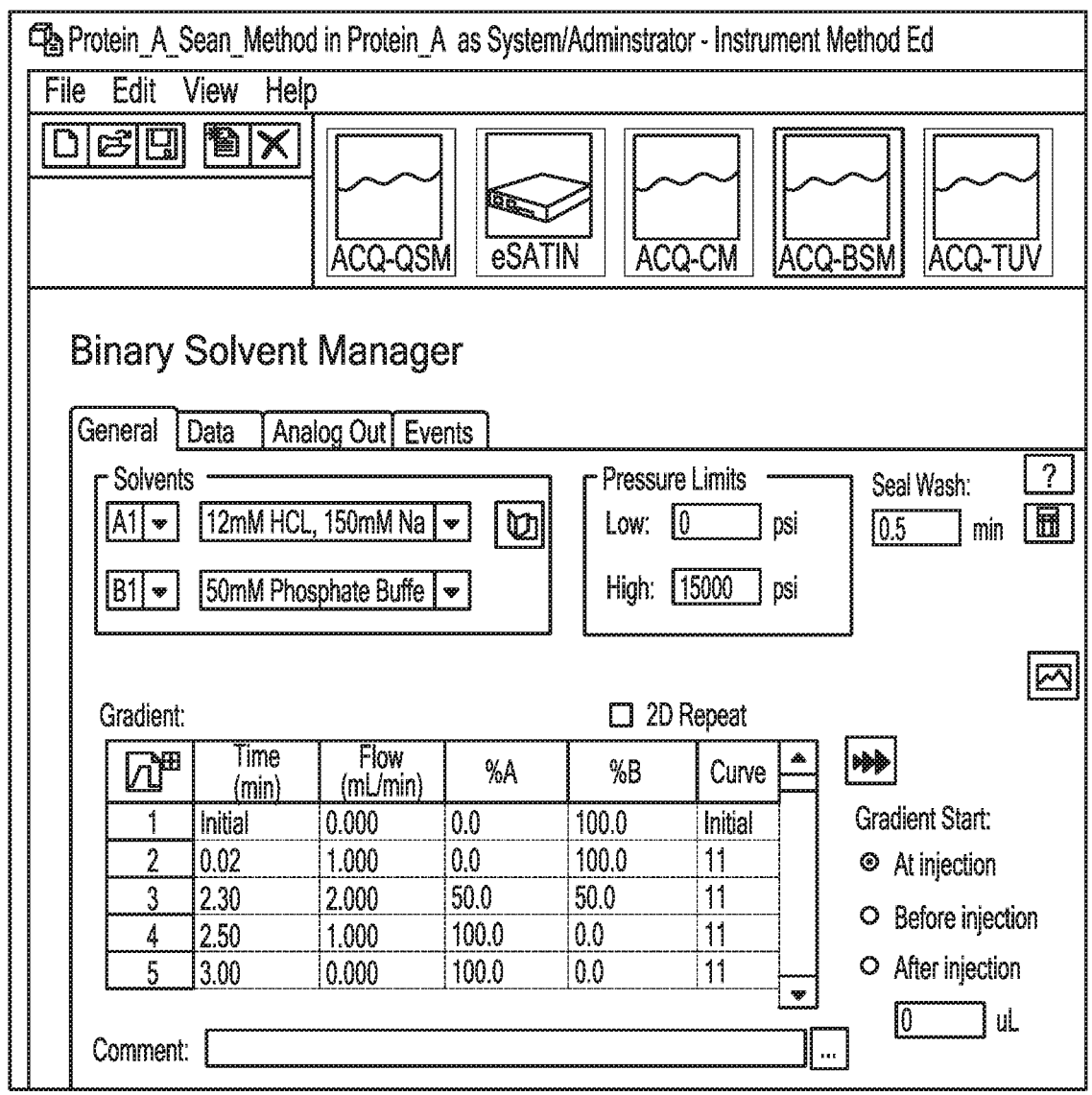
FIG. 17C1

FIG. 17C2

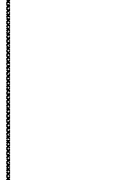
FIG. 17E1

Protein_A_Sean_Method in Protein_A as System/Administrator - Instrument Method Ed File  Edit  View  Help

[ACQ-QSM]  [eSATIN]  [ACQ-CM]  [ACQ-BSM]  [ACQ-TUV]

General | Events

Initial State

Relay: Off ▾   TTL1: Off ▾   TTL2: Off ▾

Relay Operating Mode

○ Standard  ⦿ Ready Loop

| | Time (min) | Event | Function | Period (sec) |
|---|---|---|---|---|
| 1 | 0.10 | TTL1 | Pulse | 0.02 |
| 2 | 0.15 | TTL2 | On | |
| 3 | 0.25 | TTL2 | Off | |

Add Row

*FIG. 17E2*

| | Visible | Vial | Injection | Sample Name | Sample Type | Date Acquired | Acq Method Set | Injection Volume (uL) | Channel Description |
|---|---|---|---|---|---|---|---|---|---|
| 1 | ☑ | 1 | 3 | Remicade_1_C | Unknown | 5/6/2014 3:13:00 PM EDT | Protein_A_Sean_Method | 10.00 | ACQUITY TUV ChA 280nm |
| 2 | ☑ | 1 | 4 | Remicade_1_C | Unknown | 5/6/2014 3:21:25 PM EDT | Protein_A_Sean_Method | 10.00 | ACQUITY TUV ChA 280nm |
| 3 | ☑ | 1 | 1 | Remicade_1_C | Unknown | 5/6/2014 3:29:52 PM EDT | Protein_A_Sean_Method | 10.00 | ACQUITY TUV ChA 280nm |
| 4 | ☑ | 1 | 2 | Remicade_1_C | Unknown | 5/6/2014 3:38:16 PM EDT | Protein_A_Sean_Method | 10.00 | ACQUITY TUV ChA 280nm |

*FIG. 17F*

SYSTEMS AND METHODS FOR CHROMATOGRAPHIC ANALYSIS

CROSS REFERENCE TO RELATED APPLICATIONS

This application claims the benefit of and priority to U.S. provisional application No. 62/567,822, filed Oct. 4, 2017, titled "SYSTEMS AND METHODS FOR CHROMATOGRAPHIC ANALYSIS" the entirety of which is incorporated by reference herein.

FIELD OF INVENTION

The present invention relates to chromatographic systems, and more particularly, relates to systems, methods and devices that do not require a separate device or methodology to start an injection sequence or introduction of a sample for analysis in chromatographic systems.

BACKGROUND OF THE INVENTION

Chromatographic systems often rely upon a separate device or apparatus for sample management, sample introduction and initiation of an injection sequence that starts the chromatographic system components and the chromatographic data system. However, this type of configuration is not always necessary for example, in educational, process development and manufacturing settings where high sample throughput is not required, and in such circumstances, simply adds costs and complications to the overall chromatographic system and process.

A need exists to eliminate a sample manager or other similar device and rely instead upon other methods and devices for sample introduction and commencement of the chromatographic components and a chromatographic data system.

SUMMARY OF THE INVENTION

Methods of chromatographic detection are provided herein. The methods include the step of providing a chromatography instrument without an autosampler, an external device, a pressurized sample injection device and a chromatographic data system. The chromatographic instrument has a sample valve, a column manager and a solvent manager. The sample valve is connected to the column manager. The solvent manager is connected to the column manager. Each of the column manager, the solvent manager, the external device and the chromatographic data system are in communication with the other. The chromatographic data system comprises a plurality of sample set methods for acquiring data. Sampling rates, BCD preferences, units and/or scale rates are associated with the external device.

The chromatographic instrument can employ liquid chromatography or a super critical fluid system such as carbon dioxide or other compressible base fluid chromatography. For example, the methods described herein are useful in connection with an ultra-performance liquid chromatography process, a high performance liquid chromatography process, an ultra performance convergence chromatography process, or an ultra high performance liquid chromatography process.

The present methods further include the steps: injecting sample into the sample valve with a pressurized sample injection device; transmitting a signal from the chromatographic data system to the external device; receiving the signal by the external device; producing an event output with the external device wherein a fluidic pathway between the solvent manager and the column manager is established; discharging solvent from the solvent manager into the sample valve; and discharging sample into the column for chromatographic detection. The methods may also include the step of transmitting an internal signal to the external device to trigger an Inject Start signal to the chromatographic instrument and chromatographic data system. The event output can generate a contact closure that activates the sample valve. Further, the methods provided herein can comprise the step of discharging the sample from the column into a detector. The detector identifies and/or quantitates the concentration of sample constituents.

In the present methods, the chromatographic instrument can be started after an Inject Start signal is received by the solvent manager and the solvent manager signals the column manager to start. The sample valve moves from a first position to a second position establishing a fluidic pathway from the solvent manager to the column and sample is discharged from the sample valve to the column. After sample is injected, the sample valve can be reset to the first position where the sample valve is ready to be injected with another sample. The chromatographic instrument may also have a selector valve having a first position and a second position, where in its first position, the selector valve establishes a fluidic pathway between the sample valve and the column, and in its second position, the selector valve establishes a fluidic pathway between the column and a detector or a waste reservoir.

Also provided are chromatography systems comprising at least one chromatographic instrument having a sample valve, a column manager and a solvent manager. The chromatography systems further include an external device, a pressurized sample injection device and a chromatographic data system. The external device can comprise a single time base, dual-channel analog to digital converter configured to trigger an internal signal to start the chromatographic instrument and chromatographic data system. The external device can have a contact that can activate and/or regulate the solvent manager and the column manager. The external device is configured to generate an event output to establish a fluidic pathway between the solvent manager and the column manager. In the chromatography systems, the chromatographic instrument employs an ultra-performance chromatography process, a high performance liquid chromatography process, an ultra performance convergence chromatography process, or an ultra high performance chromatography process.

In the chromatography systems, the sample valve is configured to move between a first position and a second position to establish a fluidic pathway from the solvent manager to the column. In addition, the sample valve is configured to move between the second position and the first position to reset the sample valve for a next injection of sample. The present chromatography system can further comprise a detector that identifies and/or quantitates the concentration of sample constituents. In addition, the chromatography system can further comprise a selector valve having a first position and a second position. In the first position, the selector valve establishes a fluidic pathway between the sample valve and the column, and in the second position, the selector valve establishes a fluidic pathway between the column and a detector.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 5A shows an I/O connector. FIG. 5B shows a binary code connector.

FIG. 7 specifically depicts the communication between the external device and the solvent manager for ready loop application.

FIGS. 10A, 10B, 10C1 and 10C2 show a series of chromatographic instrument user menus. FIG. 10A is a chromatographic instrument console user menu for a column manager. FIG. 10B is the instrument method editor menu for a column manager. FIGS. 10C1 and 10C2 is the instrument method editor menu showing a particular selection, the Ready Loop, for an Ethernet-satellite/interface ("e-SAT/IN") module.

FIGS. 15A, 15B1, 15B2, 15C1, 15C2, 15D1, 15D2 and 15E are chromatographic data software user menus for the Caffeine Instrument Method of Example I. FIG. 15A shows the menu for the quaternary solvent manager and the chromatographic eluent composition of Example I. FIGS. 15B1 and 15B2 show the menus for the photodiode array ("PDA") detector and the sample rate, range and resolution. FIGS. 15C1 and 15C2 are menus associated with programming the column manager as described in Example I. FIGS. 15D1 and 15D2 show menus used to program the e-SAT/In Module in Example I. FIG. 15E is the menu for the caffeine instrument method as used to collect the data in Example I. FIG. 15G shows a peak results table for Example I. FIG. 15H shows a table of raw date and time stamped data from which the peak results table for Example I is generated.

FIGS. 16B1 and 16B2 show the chromatographic data software menu to program the quaternary solvent manager ("QSM"). FIGS. 16C1 and 16C2 show the chromatographic data software menu to program the photodiode array detector ("PDA"). FIGS. 16D1 and 16D2 show the chromatographic data software to program the column manager. FIGS. 16E1 and 16E2 show the chromatographic data software menus used to program the e-SAT/IN module in Example II. FIGS. 16H1, 16H2, 16H3, 16H4, 16H5, 16H6 and 16H7 show the results for each peak detected in Example II.

FIGS. 17A1, 17A2, 17B1, 17B2, 17C1, 17C2, 17D, 17E1, and 17E2 show the different menus of the chromatographic data software used to program the various instruments and that makes up the chromatographic data system of Example III. FIG. 17F depicts the raw data.

DETAILED DESCRIPTION OF THE INVENTION

Figure 1:
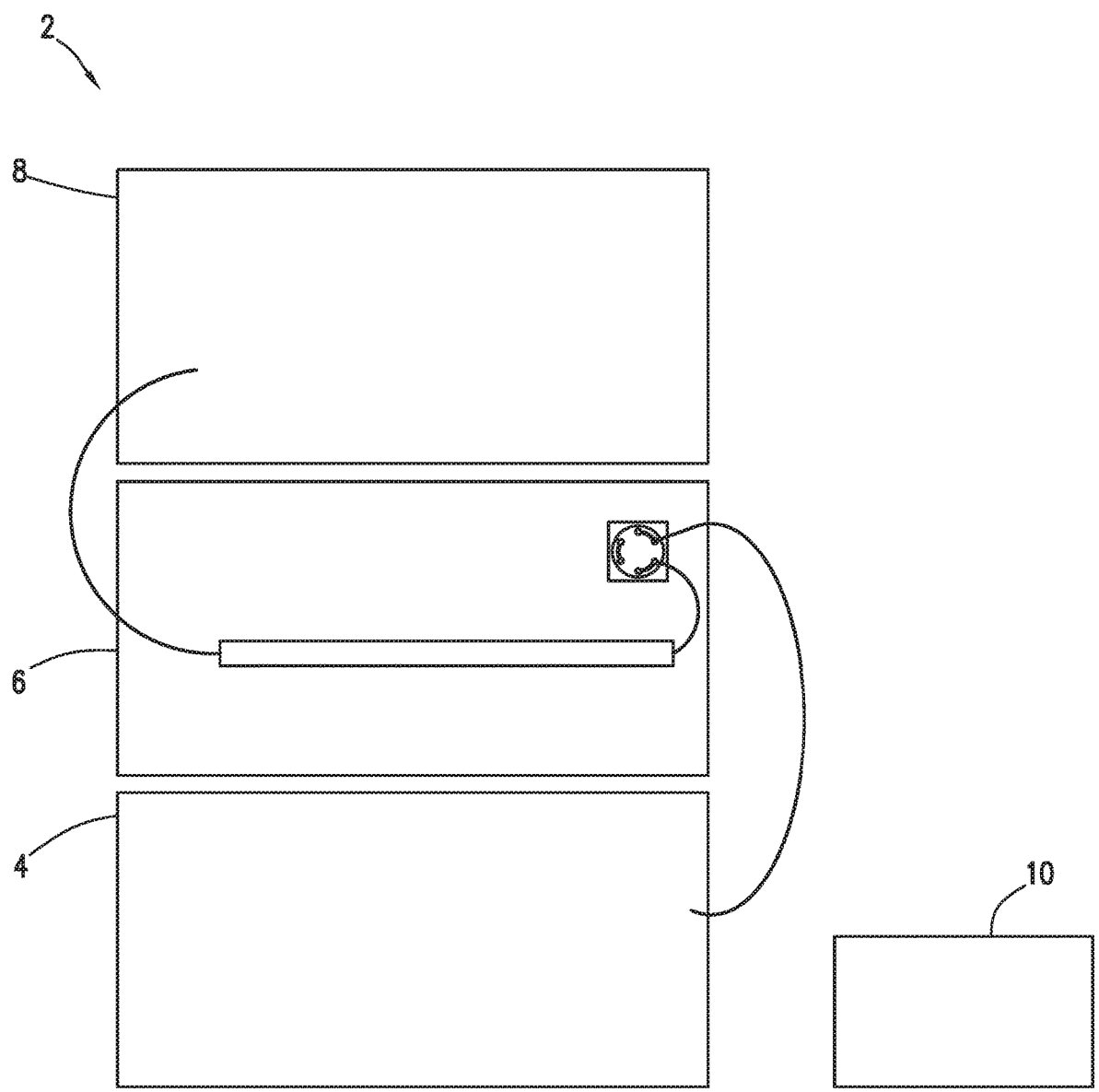
FIG. 1 is a general depiction of a chromatographic instrument a column manager and a quaternary solvent manager. Also shown is a pressurized source of sample injection and a detector.

Systems, methods and devices for ultra-performance chromatography are provided herein. To meet the specific needs of certain applications, a chromatographic system 100 (referred to sometimes as a "LC system") is provided to eliminate the need for a sample manager or similar device that handles sample management, sample introduction and the initiation of an injection sequence to start the chromatographic components and the chromatographic data system. The LC system 100 described herein is useful in both industrial and educational settings. The LC system 100 includes one or more of the following chromatography ("LC") instruments: an Ultra-Performance Liquid Chromatography system ("UPLC®" system); a high performance liquid chromatography system ("HPLC system"); an Ultra Performance Convergence Chromatographic system ("UPC2® system"); and/or an ultra high performance liquid chromatography system ("UHPLC"). The chromatographic system 100 can be a supercritical fluid system, carbon dioxide or other compressible base fluid chromatography system.

Supercritical fluid chromatography ("SFC") is a chromatographic technique that uses a supercritical fluid or near supercritical fluid as the mobile phase. For various liquid substances there is a temperature above which the substance cannot exist as a liquid regardless of increasing pressure. Similarly, there is a pressure above which the substance cannot exist as a gas regardless of increasing temperature. These levels are the critical temperature and critical pressure of the substance, and define boundaries on a phase diagram for the substance. At these levels, the liquid and vapor have the same density and the fluid cannot be liquefied by increasing the pressure. At greater temperature or pressure, there is no phase change and the substance acts as a supercritical fluid. Thus, a supercritical fluid can be described as a fluid obtained by heating to a temperature greater than the critical temperature and compressing to greater than the critical pressure. There is a continuous transition from liquid to supercritical fluid by increasing temperature at constant pressure or from gas to supercritical fluid by increasing pressure at constant temperature.

Compressible fluid-based chromatography ("CFC") includes chromatography techniques using highly compressible fluids, such as supercritical fluids and fluids having temperatures and/or pressures near the boundaries defining the supercritical state for the fluid (i.e., "near-supercritical" fluids). Thus, the mobile phase, and optionally one or more co-solvent fluids, in a CFC system may be in a gaseous state at ambient or room temperature and pressure, and may be in a liquid, near-supercritical, or supercritical state in at least one location within the system. The mobile phase can be in a supercritical or near-supercritical state at the column. If the fluid is pure carbon dioxide, the fluid may be in a supercritical state somewhere in the chromatography system; however, as a modifier such as methanol is added to the carbon dioxide, the solvent mixture may be liquid at some times and at one or more locations in the system. Thus, it will be understood that a fluid which is supercritical while flowing through the chromatographic column may be liquid or gaseous at other locations in the CFC system. Moreover, the fluid state may change as the relative amount of modifier changes according to a gradient composition.

Highly-compressible fluids are also used in the mobile phase of chromatography systems. Highly-compressible fluid chromatography has also been referred to as $CO_2$-based chromatography, where $CO_2$ is used in the mobile phase, or supercritical fluid chromatography (SFC). (In this application, mobile phase is used as a term to describe the combined flow stream flowing through a chromatography column. For example, in a separation in which $CO_2$ and methanol (a co-solvent) are mixed together to create a combined flow stream passing through a chromatography column, the term mobile phase will refer to both the $CO_2$ and the methanol co-solvent. In a separation where there is no co-solvent, the $CO_2$ alone would be referred to as the mobile phase.) Similarly, highly-compressible fluid extraction has been referred to as supercritical fluid extraction ("SFE").

Hence, highly-compressible fluid chromatography is a type of chromatography that is configured to operate with a solvent that includes a fluid (e.g., carbon dioxide, Freon, etc.) that can be in a gaseous state at ambient/room temperature and pressure. Typically, highly-compressible fluid chromatography involves a fluid that experiences noticeable density changes over small changes in pressure and temperature. As such, mobile phase fluids, such as methanol and water under conventional HPLC or UHPLC operating conditions are not considered to be a highly-compressible fluid chromatography system. Although highly-compressible fluid chromatography can be carried out with several different compounds, carbon dioxide is used as a reference compound as it is the currently the most commonly employed. Highly-compressible fluid chromatography can be referred to as carbon dioxide based chromatography, or in some instances as supercritical fluid chromatography, especially where carbon dioxide is used as the mobile phase. In some aspects, the mobile phase can contain at least 10%, 20%, 30%, 40%, 50%, 60%, 70%, 80%, 90%, 95%, 98% or about 100% highly-compressible fluid, e.g., carbon dioxide.

In early chromatography instruments, high pressure of about 35 bar was used to generate the flow in packed columns. These systems were known as High-Pressure Liquid Chromatography ("HPLC"). The 1970s brought improvements in HPLC technology and operating pressures up to 400 bar where improved injectors, detectors and columns were then incorporated. With continued advances in performance with technologies such as smaller particles and higher pressures the acronym remained the same but the name was changed to High-Performance Liquid Chromatography (also referred to as "HPLC"). Furthermore, advancements in instrumentation and column technology in 2004 have led to increases in resolution, speed and sensitivity in chromatography. High performance can be achieved through the use of columns having particles ranging in size from 1.5 to 2 microns and instrumentation with specialized capabilities can deliver the mobile phase at about 1250 bar and referred to as Ultra-Performance Liquid Chromatography ("UPLC®") or Ultra-Higher Performance Liquid Chromatography ("UHPLC").

Today, LC instruments can identify compounds in trace concentrations as low as parts per trillion (ppt). Many variations exist in relation to the pressure with which the solvent is pumped through the LC system, i.e., low pressure chromatography (approximately at 25 bar), high pressure chromatography (approximate 400 bar) and more recently ultra-high pressure chromatography (approximate 1250 bar). HPLC and UPLC® have applications in many industries including pharmaceuticals, food, cosmetics, environmental matrices, forensic samples and industrial chemicals.

As described herein, the LC system 100 comprises an LC instrument 2 having a column manager 6 and an analytical solvent manager 4. The LC system 100 further includes an external device 10 such as an e-SAT/IN module, but does not have, employ, or require a sample manager or other autosampler.

The LC system 100 can further comprise a detector 8. The detector 8 is a component of the LC system 2 that identifies and quantitates the concentration of the sample constituents. Fundamentally, the detector 8 records an electrical signal (data signal) needed to generate the chromatogram on its display. Since sample compound characteristics can be different, different types of detectors have been developed. For example, if a compound can absorb ultraviolet light ("UV"), a UV-absorbance detector is used. If the compound fluoresces, a fluorescence detector is used. If the compound ionizes, a mass spectrometer ("MS") detector can be used. If the compound does not have these characteristics, a more universal type of detector is used, such as an evaporative-light-scattering detector ("ELSD") or a differential refractive index detector ("dRI"). A powerful approach is the use multiple detectors in series. For example, a UV and/or ELSD detector may be used in combination with an MS to analyze the results of the chromatographic separation. This provides, from a single injection, more comprehensive information about an analyte.

Currently, chromatography can utilize detectors classified as either bulk property detectors, or specific property detectors. Bulk property detectors measure the bulk physical property of the column 22 discharge and specific property detectors measure a physical or chemical property of the solute. Bulk property detectors include a refractive index detector, an electrochemical detector, and a light scattering detector. Specific/solute property detectors include a UV-Visible light detector, fluorescence detector and mass spectroscopic detector.

The LC system 100 can also include a chromatographic data system 62 that can collect data from analog channels or digital channels. The chromatographic data system 62 includes a data acquisition computer 58 and chromatographic data software (not shown) and allows a user to control certain chromatography components such as the analytical solvent manager 4 and the column manager 6, and/or a detector 8. The chromatographic data system 62 sends a signal to the external device to initiate the LC instrument 2 to begin the chromatographic process.

Typically, the column manager 6 can provide automated switching for two to four columns 14a, 14b having dimensions from 0.3 to 4.6 mm in internal diameter ("I.D.") and from 30 to 150 mm in length. Additional features of the column manager 6 includes heating and cooling columns from 4 to 90° C., lifetime usage information tracked for each column 14a, 14b, advanced design pre-column solvent heating.

The column manager 6 incorporates one or more programmable switching valves referred to herein as a sample valve 16. In certain embodiments, the sample valve 16 can be a six-port valve. However, as described herein, the sample valve 16 can be an eight-port valve or a ten-port valve. The sample valve 16 is connected to the column 14 and/or detector 8 and the solvent manager 4.

Figure 2A:
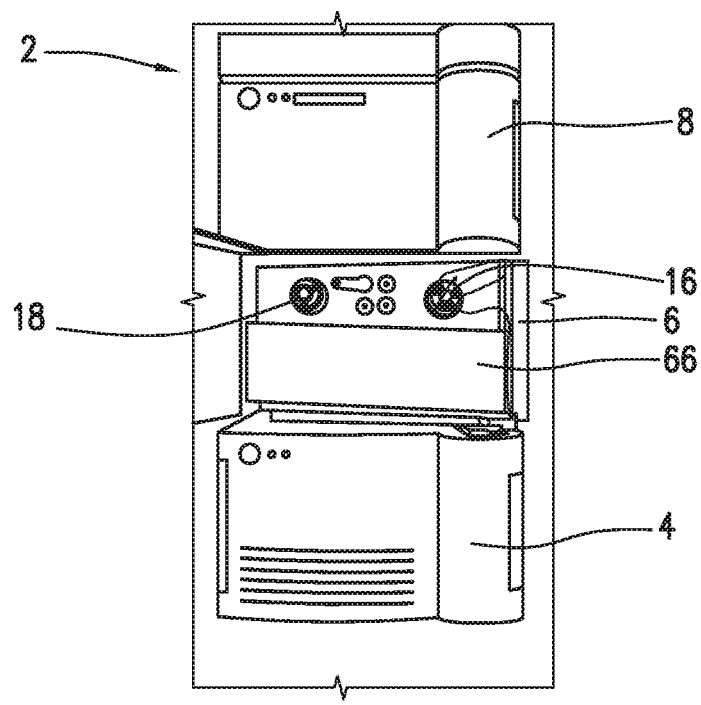
FIG. 2A illustrates a front view of the chromatographic instrument.
Figure 2B:
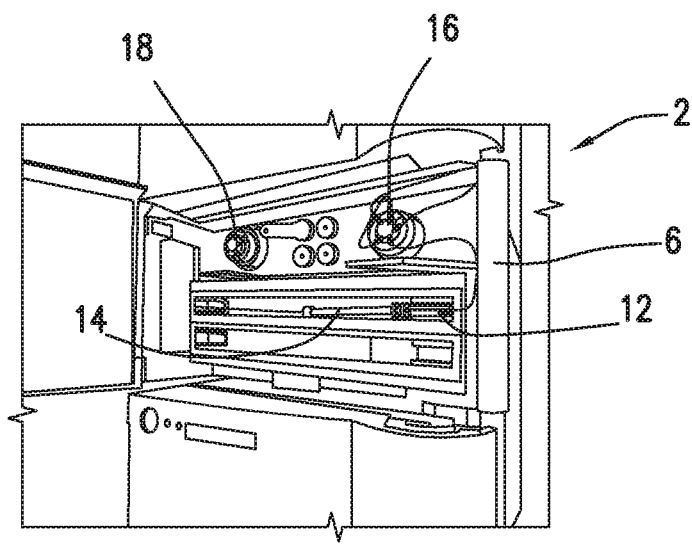
FIG. 2B shows the chromatographic instrument having a column manager with a column manager compartment door shown open.
Figure 2C:
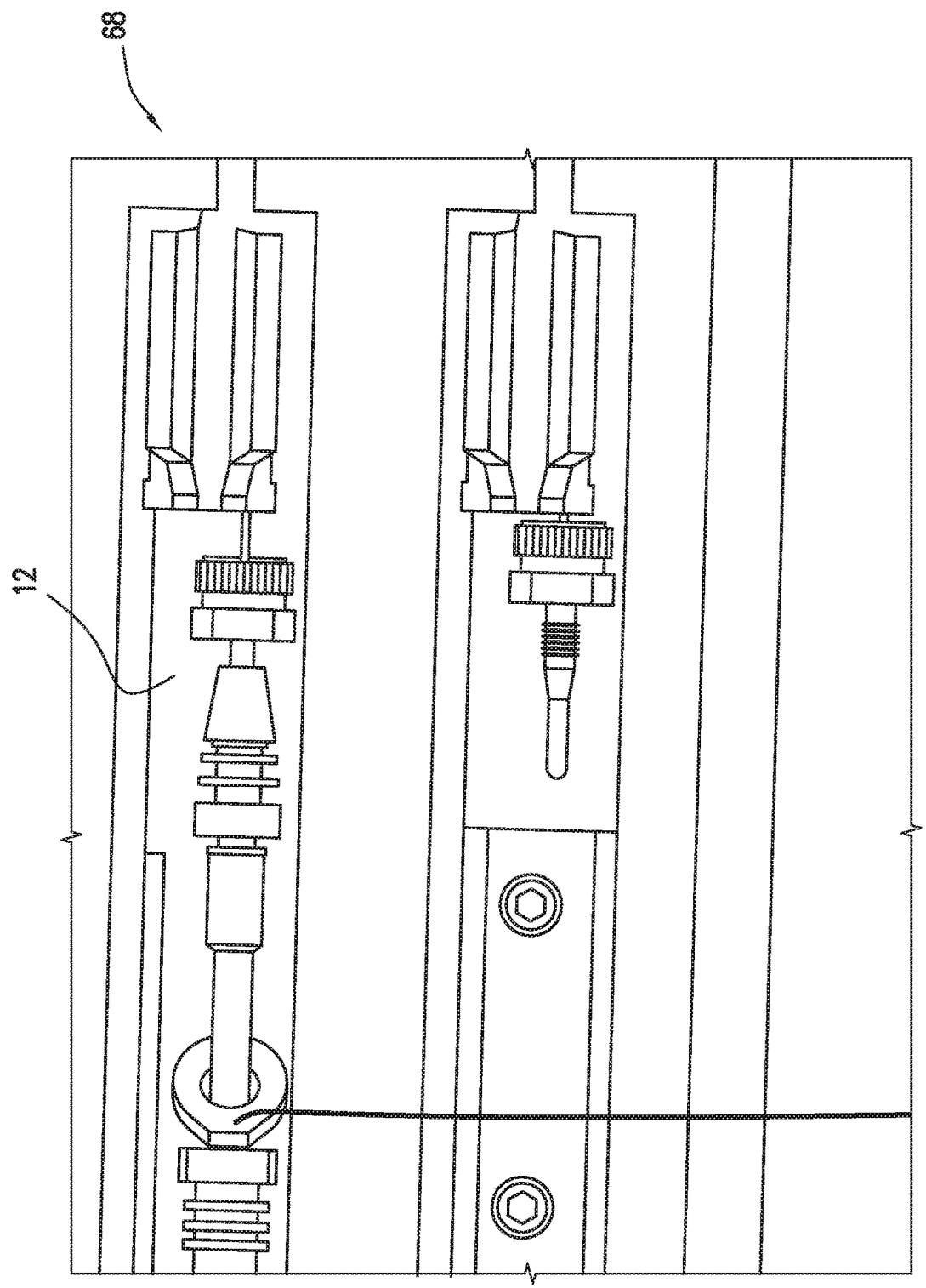
FIG. 2C shows an active preheater and a column installed in a first column trough of the column manager.
Figure 2D:
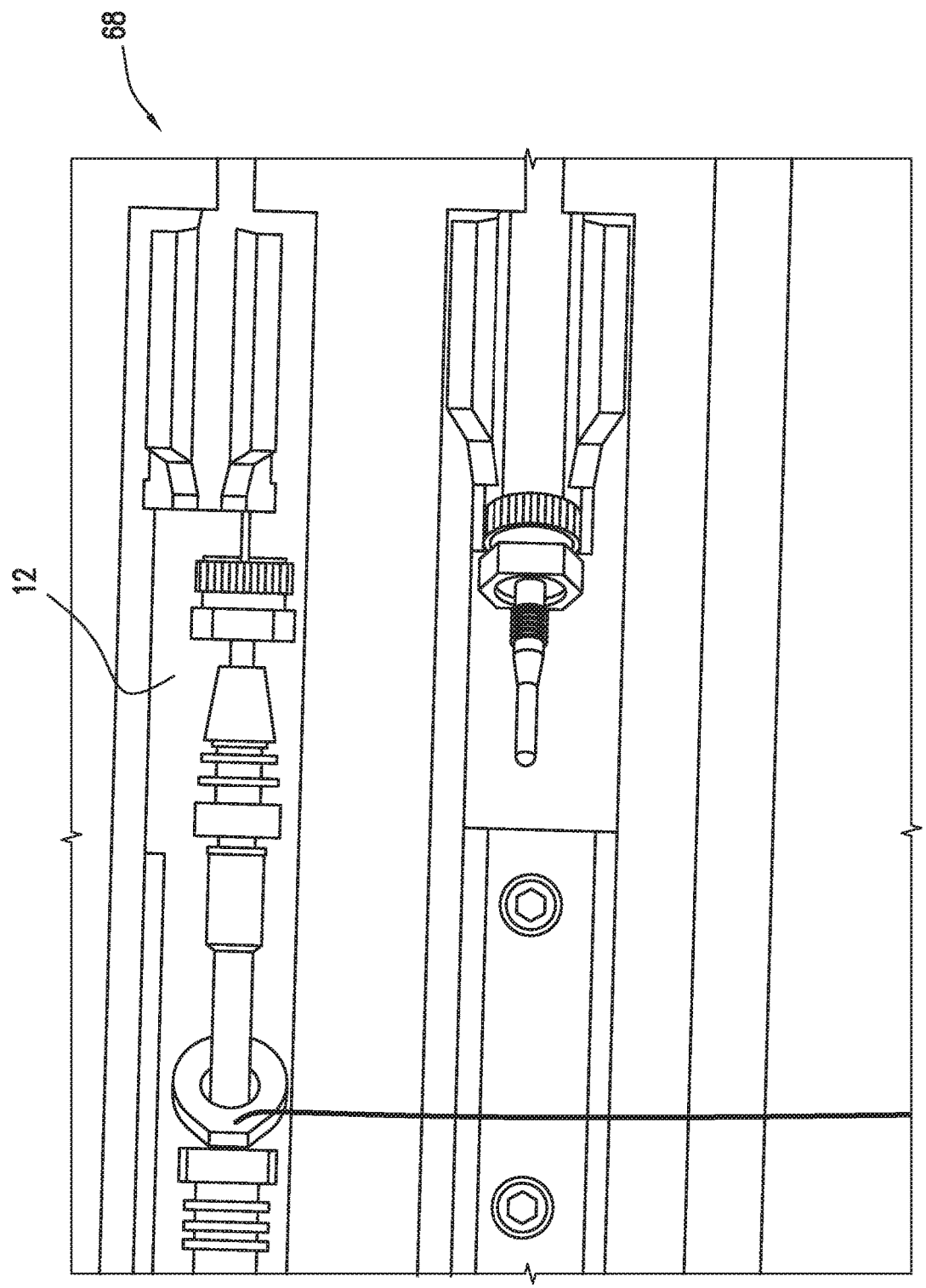
FIG. 2D shows the active preheater and the column installed in the first column trough of the column manager and a second active preheater partially removed in a second column trough.
Figure 2E:
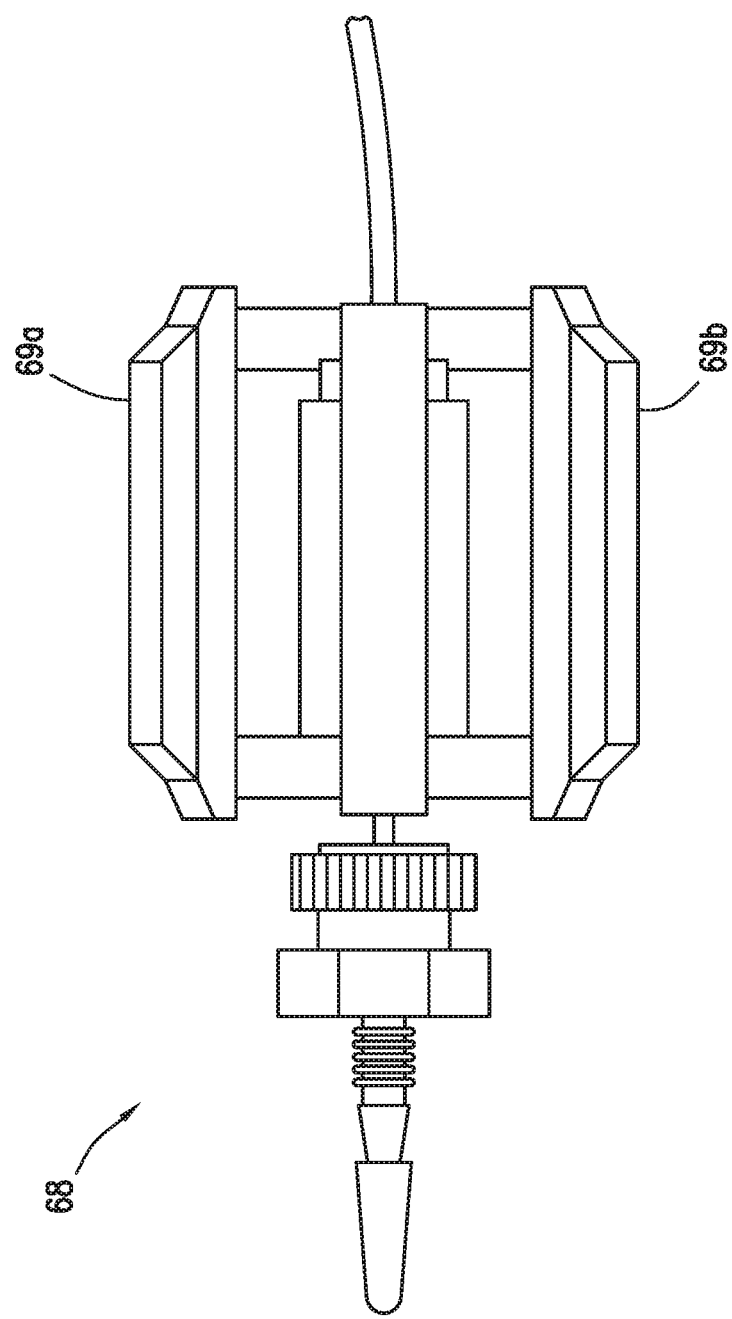
FIG. 2E is a top view of the active preheater where the tabs can be pinched for insertion into the retainer located in the troughs of the column manager.
Figure 2F:
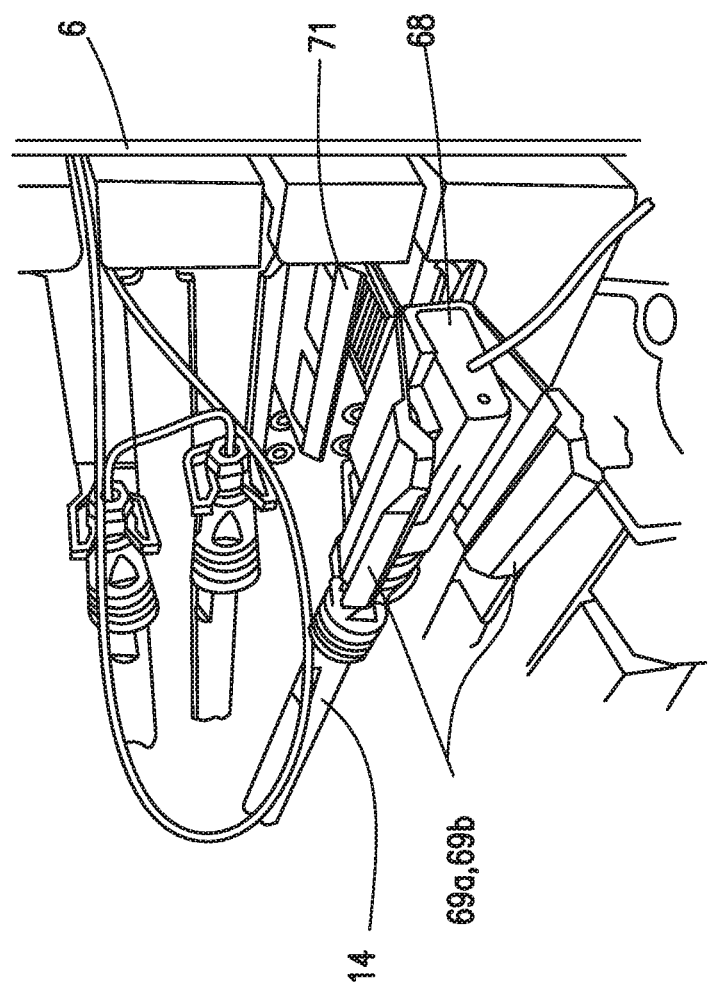
FIG. 2F shows the active preheater prior to installation into the retainer located in the trough of the column manager.
Figure 2G:
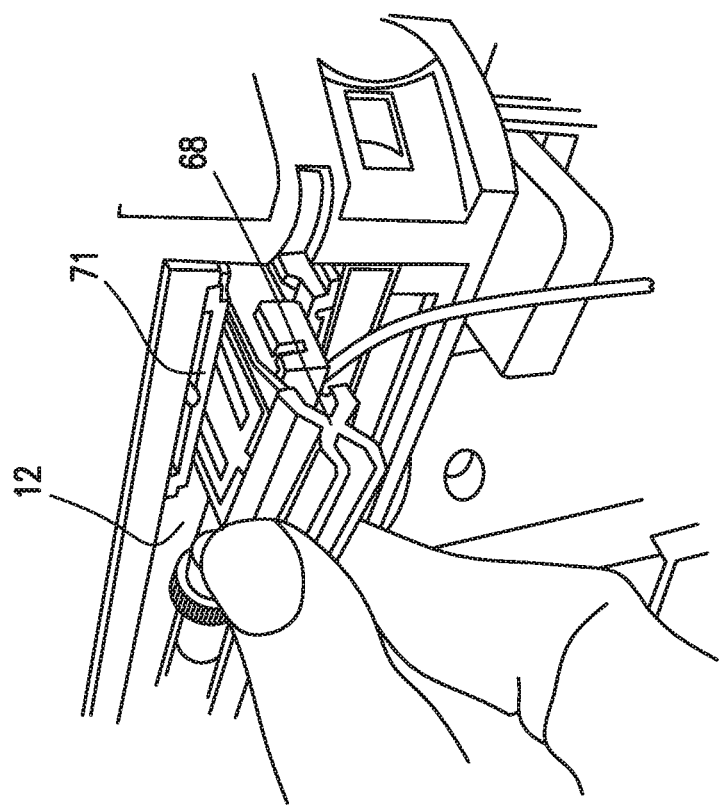
FIG. 2G shows insertion of the active preheater into the retainer of the column manager.
Figure 2H:
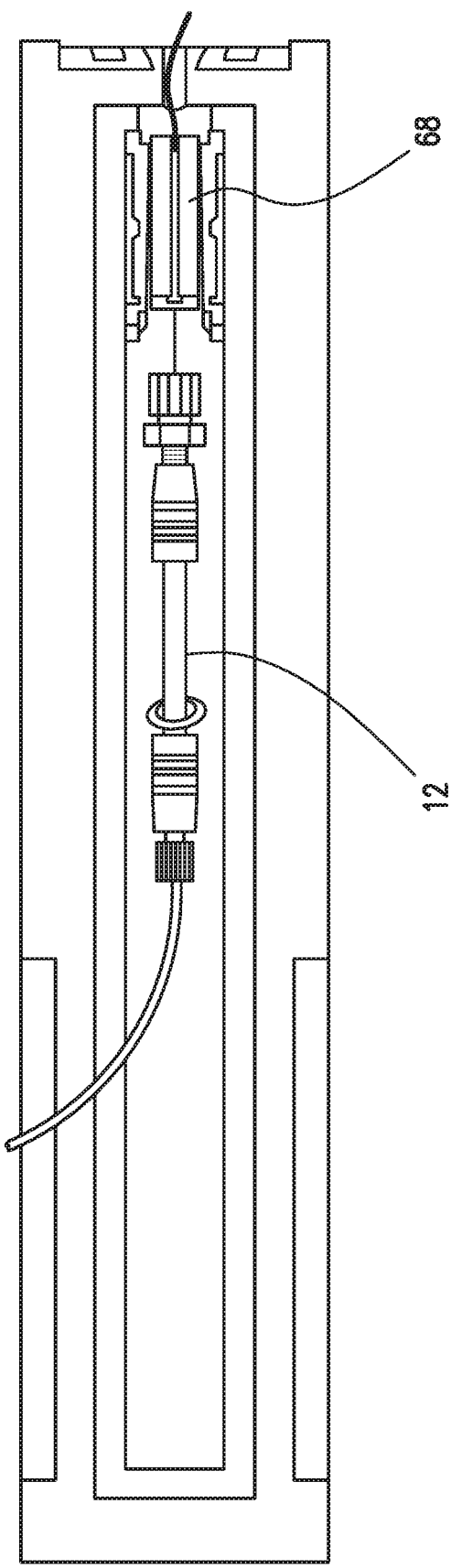
FIG. 2H shows the active preheater and the column installed in the column trough of the column manager.

As shown in the FIGS. 2B, 2C and 2H, the column manager 6 includes at least one column 14 or can have two columns 14a, 14b. The column manager 6 has a compartment cover 66 that can be removed. The column manager 6 also has one or more column troughs 12 for independent temperature control when multiple columns 14 are used and a retainer for holding an active preheater 68. As shown in FIGS. 2C, 2D, 2F, and 2G, the column 14 and the active preheater 68 can be positioned in the column trough 12. As shown in FIG. 2E, the active preheater 68 has tabs 69a and 69b that are pinched to insert the active preheater into the column trough 12. The active preheater 68 is held by the retainer 71 and within the column trough 12 of the column manager 6.

Figure 3:
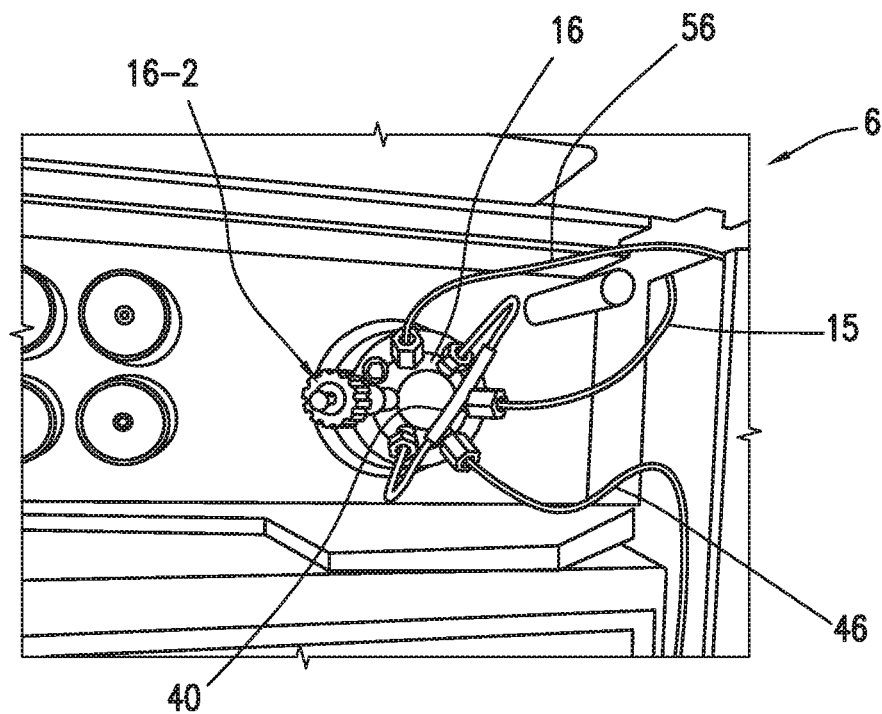
FIG. 3 shows the chromatographic instrument having a six port 2-position sample valve and a manual pressurized source of sample injection.
Figure 4:
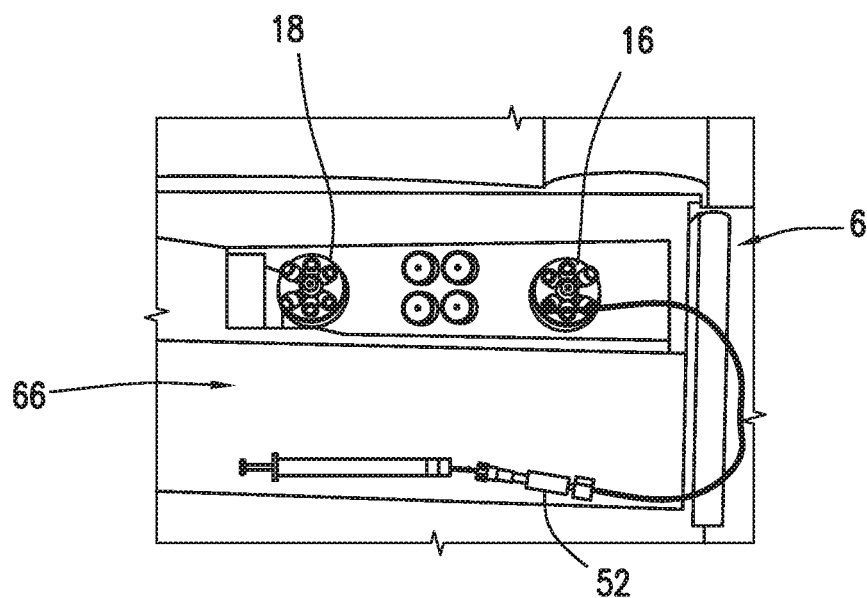
FIG. 4 depicts the manual pressurized source of sample injection with an extension of the manual injection port.

For the LC instrument 2 having more than one column 14, as described herein, a column selector valve 18 is provided to establish a fluidic pathway between the sample valve 16 and the column 14 to be used in the analysis. As shown in FIG. 3 and further discussed herein, the sample valve 16 can have a manual injector port 16-3 (a fluidic port described below) and a sample loop 40 connected to port 16-1 and 16-4. An eluent line 46 from the analytical solvent manager 4 is connected to the sample valve 16 at fluidic port 16-5 and fluidic port 16-6 a preheater line 15 that is connected to the chromatographic column 14a or 14b. In addition, there is a sample overfill line 56 attached to fluidic port 16-2 to waste or a collection reservoir 44. An embodiment of a pressurized source of sample introduction 52 is shown in FIG. 4.

The present LC system 100 can have as many as four different analytical solvent managers 4. The analytical solvent manager 4 can be a binary solvent manager (not shown), an isocratic solvent manager (not shown), a quaternary solvent manager (not shown), or an inert quaternary solvent manager (not shown). An isocratic solvent manager delivers only a single chromatographic element. A binary solvent manager allows for the programmable delivery of two independent chromatographic eluents using two independent pumps where the mixing of the eluents occurs at the high pressure outlet of each pump. A quaternary solvent manager allows the programmable blending of up to four chromatographic eluents where the mixing of the eluents occurs at low pressure followed by the delivery of the chromatographic blended eluent at high pressure. The inert quaternary solvent manager is the same as the quaternary solvent manager but where the materials of construction have been changed from stainless steel to titanium and nick-cobalt based alloy tubing known as NeoNickel MP35N Alloy.

The column manager 6 and analytical solvent manager 4 together with one or more detectors 8 offer a wide range of instrumentation which can facilitate single dimensional and multidimensional analysis. The solvent manager 4 and injector (not shown) can sustain pressures up to 124, 106 kPa (1241 bar, 18000 psi) and can generate gradients with minimal gradient delay. Chromatographic flow rates can range anywhere from a few µL/min up to 100's of mL/min. In this example typical flow rat ranges of 0.1 to 2.2 mL/min are used.

In addition, the LC instrument 2 can have an active preheater 68. Column temperature variations can shift peak retention times and alter peak shapes, increasing the difficulty of achieving precise results. The column manager 6 helps to ensure precise reproducible separations by controlling the column temperature. A supplementary pre-heating device (active preheater) can be installed to heat the incoming solvent before it enters any column. For example, the active preheater 68 heats incoming eluent (solvent) to a specific column temperature before the eluent enters the column 14. Use of the active preheater 68 ensures that separations occur at the programmed and pre-equilibrated column temperature, not at the temperature of the incoming solvent.

More specifically, the column manager 6 in various forms are currently available. For example, the column manager 6, CM-A sold by Waters provides two columns standard (maximum length of 150 mm) with filter or guard column, or four columns (maximum length of 50 mm) as supported with optional tubing kit, with an I.D. up to 4.6 mm. Also sold by Waters is the CM-AUX column manager 6 providing a column capacity the includes two columns standard (maximum length of 150 mm with filter or guard column). The two column managers 6, CM-A with 2 CM-AUX can be combined to support of up to six columns. The CM-A column manager 6 also includes switching valves (two nine-port, eight-position valve) that can provide programmable, automatic, or random access switching between columns, and bypass for rapid solvent changeover. The temperature range of a column compartment is 4.0 to 90.0° C., settable in 0.1° C. increments. Two independent heat/cool zones per module, with up to six zones in the stacked configuration are also available in the column manager 6. The temperature accuracy of the column compartment(s) of the column manager is ±0.5° C. The temperature stability of the column compartment(s) of the column manager is ±0.3° C. The column manager 6 uses utilized standard solvent conditioning as active pre-heating. Column tracking is provided with an eCord Technology column having information management tracks and archives column usage history. 2D support is optional.

The present LC system 100 can also independently control as many as three external valves 20 for sample dilution and as attached to the column manager 6 through the analysis method. Moreover, recycling systems and devices (not shown) can be connected to the column manager 4 to dispose of, or recycle, excess sample through the sample overfill line 56. Tubing is used throughout the LC instrument 2. The tubing can be stainless-steel or MP35N for corrosion resistance in high-ionic strength aqueous conditions, or PEEK.

Figure 5A:
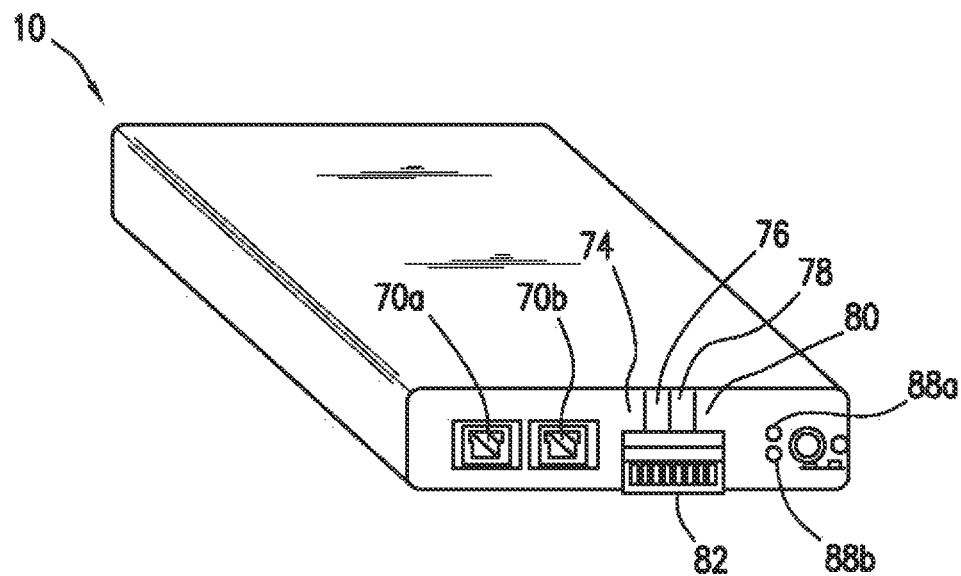
FIGS. 5A and 5B are front view of an external device.
Figure 5B:
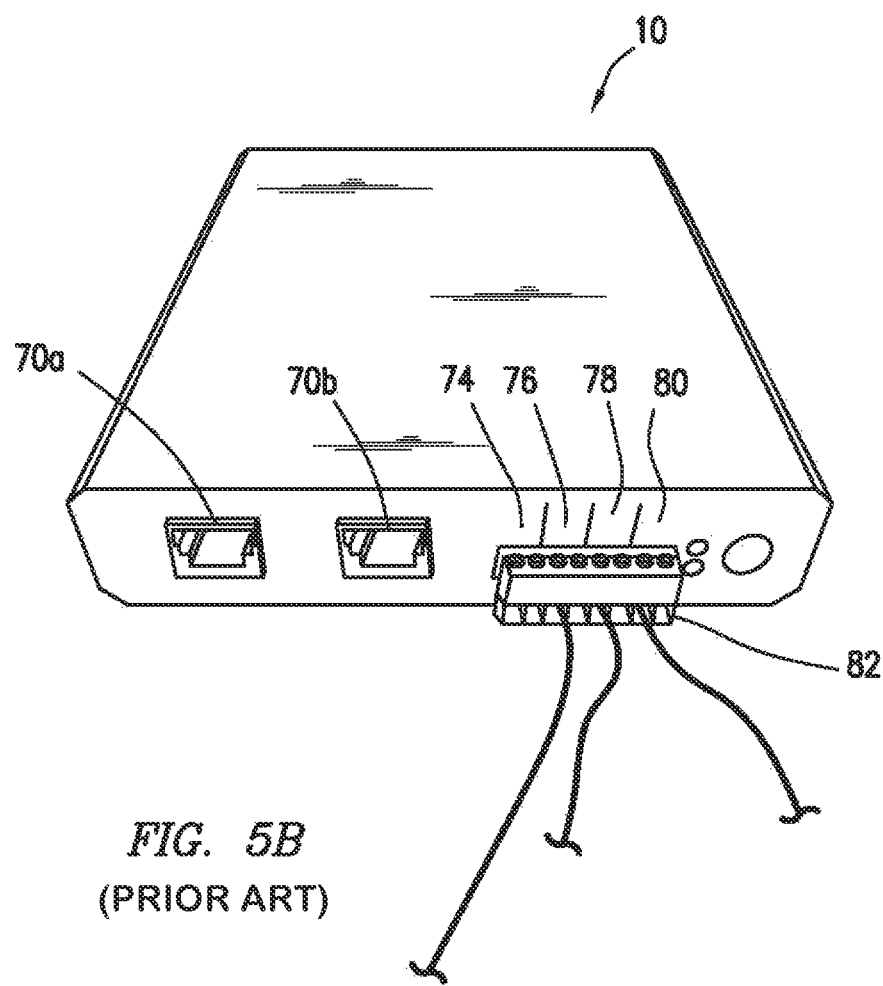

As shown in FIGS. 5A and 5B, the external device 10 can be an e-SAT/IN (Ethernet-satellite/interface) module. This type of external device 10 is a single-time base, dual-channel analog to digital (A/D) converter. Particularly, the e-SAT/IN module provides software-selectable setting for low power line input frequency (50 or 60 Hz), fixed data acquisition rates at 50 to 60 HZ from 2 to 480 samples per second (Hz) and up to 24-bits of A/D conversion depending on the sampling rate. See Waters the external device, Installation Guide 71500049404/Revision C, 2014, at 1-3. The e-SAT/IN module 10 uses a dedicated local area network ("LAN") to communicate to a chromatographic data system 62 and is connected to the chromatographic data system 62 using a 10 base-T Ethernet interface. Chromatographic data software and other control drivers are used to control and operate the external device 10. For instrument control, instruments require drivers and firmware and utility application. An instrument driver approach allows creation of software plugins to add hardware control capabilities.

As shown in FIGS. 5A and 5B, the external device can have two analog input channels 70a and 70b, one Ethernet 10 base-T connector (not shown) for communication, one BCD input port 74 and three programmable event outputs 76, 78 and 80. A network interface card ("NIC") (not shown) can be used to communicate with the external device 10. The addressing the card allows for one or more communications to be established between the chromatographic data system 62 and the external device 10. In addition, a software driver can be installed in the chromatographic data system computer 58 before the chromatographic data system 62 will recognize the presence of the external device 10. The external device 10 will typically self-test and calibrate internally when powered on.

Figure 6:
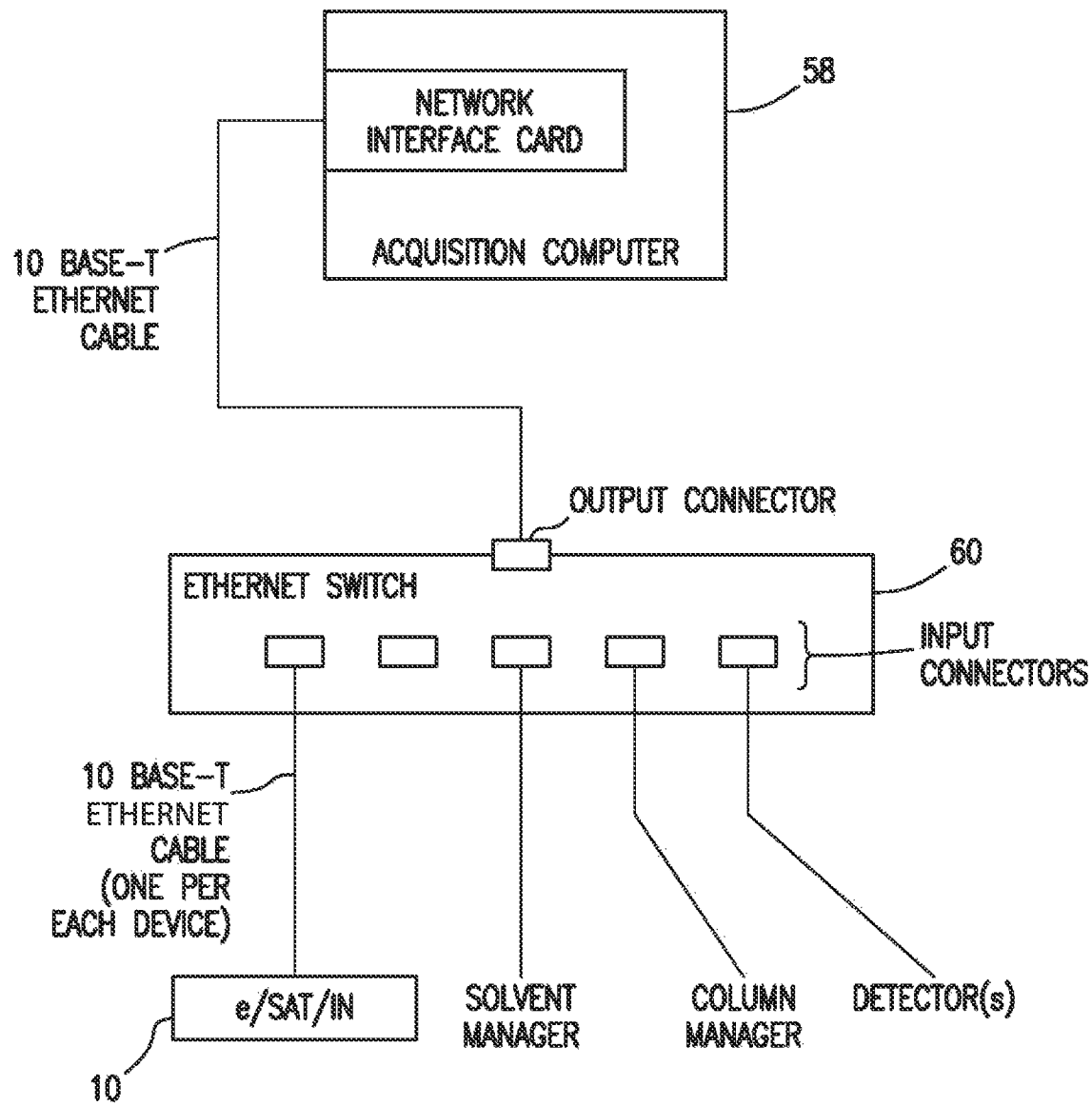
FIGS. 6 and 7 each represent the communications between the data acquisition computer (also referred to sometimes as the data acquisition system) and the solvent manager, column manager, the external device and one or more detectors.
Figure 7:
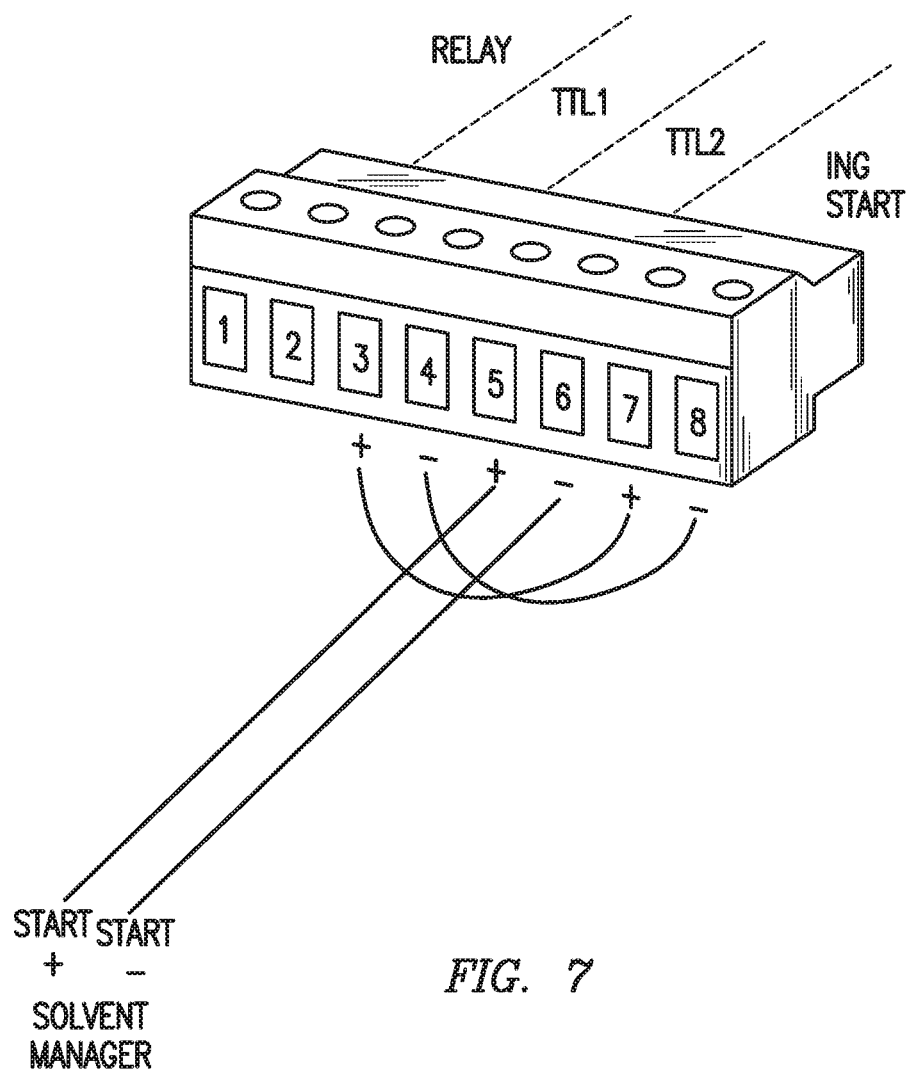

As shown in FIG. 6, the LC system 100 can include a single external device, a standard Ethernet cable along with a modular coupler and Ethernet crossover cable (10 BASE-T Ethernet cable for example). As shown in FIG. 6, in LC system 100 can have multiple external devices 10a, 10b, 10c1, 10c2, when connection to several instruments are needed. A network switch box 60 (also referred to herein as an Ethernet switch box 60) can be used to multiplex the communication between the external devices 10 and the computer 58. The computer 58 identifies each external device 10 by its network address.

In the present chromatography systems 100, a ready loop configuration (not shown) can be used to prevent an injection when the rest of the chromatographic system (pump, detector or chromatographic data system) is not ready to run or collect data from the next sample. Contact closures are internally controlled by transistor to transistor logic circuits. Applying what is referred to as a "Ready Loop Architecture" to the chromatography system allows an external signal to be applied to instrumentation (not under the direct control of the chromatographic data software) to start at the initiation of a chromatographic analysis. The Ready Loop Architecture informs the chromatographic data software when to proceed with the chromatographic analysis. The Ready Loop Architecture holds back the chromatographic data software from initiating the chromatographic analysis until the "ready loop" is closed.

The two programmable event outputs use transistor-transistor logic ("TTL") and one programmable event output uses relay event output. Transistor-transistor logic is a class of digital circuits built from bipolar junction transistors ("BJT") and resistors. It is called transistor-transistor logic because both the logic gating function (e.g., AND) and the amplifying function are performed by transistors (contrasted with RTL and DTL). The e-SAT/IN module as the external device 10 provides three programmable event outputs as shown in Table 1 below:

TABLE 1

| Programmable Event Outputs | | | |
|---|---|---|---|
| Programmable | | Reference Voltage | |
| Event Channel | Trigger Methods | High (ON) | Low (OFF) |
| Relay | Solid-state relay | N/A | N/A |
| TTL1 | TTL | >3.5 Vdc | <0.8 Vdc |
| TTL2 | TTL | >3.5 Vdc | <0.8 Vdc |

Event cables (not shown) transmit trigger signals between the external device 10 and the LC system components. As described herein, the external device 10 sends one or more signals referred to herein sometimes as an event signal, event in signal, event out signal and/or event output that can trigger action of the other components of the LC system.

For example, Event In and Event Out signals can correspond to the eight position I/O connector 82 located on the front panel and Table 2 immediately below provides the Event In and Event Out assignments for the external device 10.

TABLE 2

Event In and Out Signal Assignments

| Position number | Event type | Label |
|---|---|---|
| 1 | OUT (+) | RELA |
| 2 | OUT (−) | |
| 3 | OUT (+) | TTL1 |
| 4 | OUT (−) | |
| 5 | OUT (+) | TTL2 |
| 6 | OUT (−) | |
| 7 | IN (+) | INJ START |
| 8 | IN (−) | |

Here, TTL1 76 (position 3 and 4) loops back and connects to INJ START 80 (position 7 and 8). TTL2 78 (position 5 and 6) is connected to the INJ START 80 of the analytical solvent manager 4. Therefore, when the analytical solvent manager 4 receives an INJ START signal, it sends out a signal to other components (i.e., the column manager 6) to start.

In an example, after powering on the external device, the external device 10 performs self-tests to determine that the unit is functional. When the power-on self-test sequence is completed successfully, a LED indicator 88b will show that the unit is requesting an IP address. The LED indicator 88b indicates (for example) that the external device 10 is requesting IP configuration information by blinking. After the external device 10 receives an IP configuration information, the LED light 88b remains on and the external device 10 is ready for use.

To configure the external device 10, preferences must be associated with the external device 10 through use of the chromatographic data software in the chromatographic data system 62. For example, sampling rates, BCD preferences, units, and scale factors can each be specified. In addition, enabling an event output generates a contact closure that can initiate a process on other device at a specified time after the event clock starts. The contact closure can control operation of a fraction collector or chart recorder or activate the solvent or column switching valves.

Chromatographic data software can provide different sample set methods which can be manually created and selected for acquiring data. For example, the time that data collection is to begin can be specified and can be measured from the injection time. Furthermore, a delayed start of data acquisition can be programmed. Moreover, the size of the data file controlled. In addition, eluent fronts from the data file can be eliminated. However, if the laboratory is regulated, these data start parameters may or may not be allowed.

The chromatographic data software and chromatographic data system can acquire data and control a variety of LC instruments 2. Also, advanced detection techniques can be applied through the chromatographic data software such as MS and PDA without outsourcing to a third party. Further applications can be deployed including, but not limited to, dissolution, method validation, integrated chemical structures and polymer or size exclusion analysis. From custom calculations to final reports and e-signatures, the chromatography data software and chromatographic data system can make a laboratory more productive. As described herein, the chromatography data software can control and processes data for HPLC, UPLC®, UHPLC, and UPC2® instruments and systems.

As noted above, an injection process can be started by sending a signal from the chromatography data software in the chromatographic data system 62 to the external device 10 to get ready. FIGS. 10A, 10B, 10C1 and 10C2 show a series of chromatographic instrument user menus 90a, 90b and 90c displayed by the chromatographic instrument software as could appear on a console (not shown) of the data acquisition computer 58. As noted above, one known useful chromatographic instrument software package that can produce such menus has been sold and marked by Waters as the EMPOWER chromatography data software.

Figure 10A:
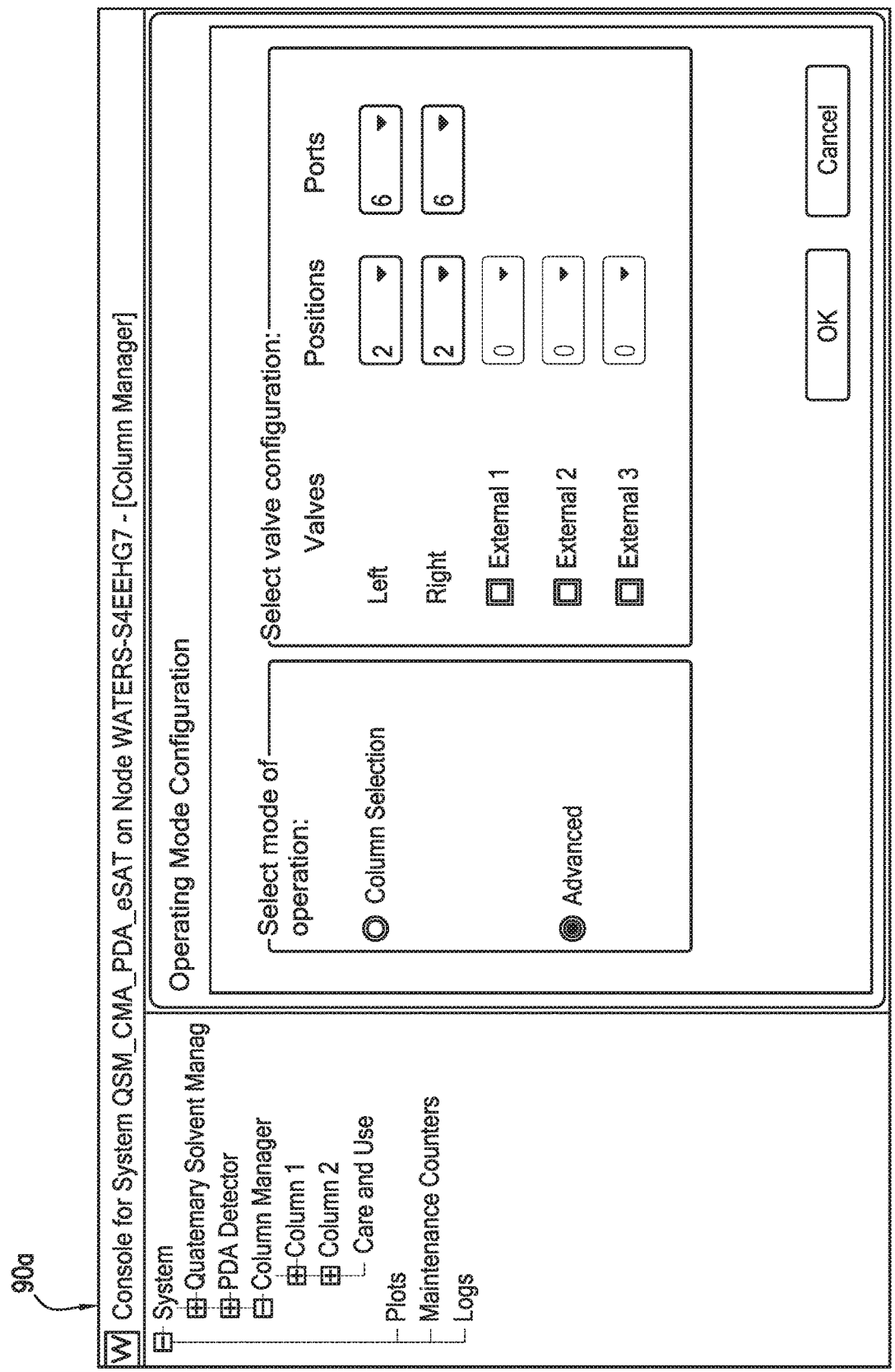
Figure 10B:
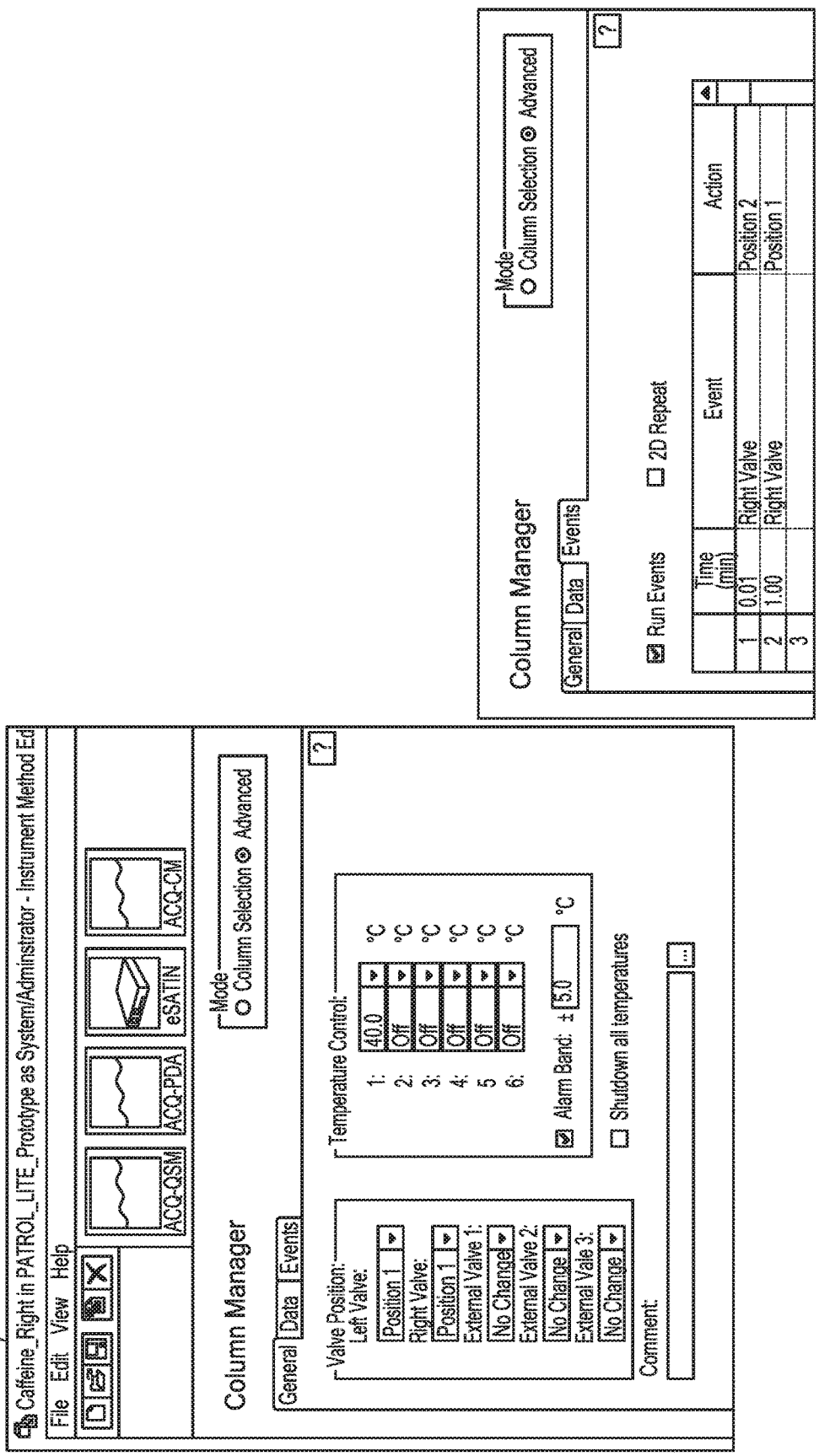

Specifically, FIG. 10A shows a chromatographic instrument console user menu for the column manager 6 and selection of advanced operating mode and identification of the six-port 2-position valves. FIG. 10B shows the instrument method editor for the column manager 6 and selection of the advanced operating mode, the starting valve position and the events table programming. FIGS. 10C1 and 10C2 show the instrument method editor for the external device showing the selection of the "Ready Loop" relay operating mode. When the sample set is started by the chromatographic instrument software, a "setting up" signal is sent to the external device to get ready. The external device in turns sends a signal to itself which triggers the "Inject Start" to start the chromatographic system and data collection system.

The menus of FIGS. 10A and 10B allow a user to place the column manager 6 in an advanced operating mode and identify and chose the six port 2-position valve for injection. Once sample is injected into the sample valve 16 and the chromatography data software started, a signal is sent to the external device 10 to set up and get ready (FIG. 10C1 and FIG. 10C2). The external device 10 then sends a signal to itself (an internal signal) to trigger the commencement of data acquisition. The step, "Inject Start," begins at with the commencement of the data acquisition process. In other words, an event output (a signal) by the external device 10 is used to initiate the chromatographic process.

HPLC System Having a Single Column

Figure 11A:
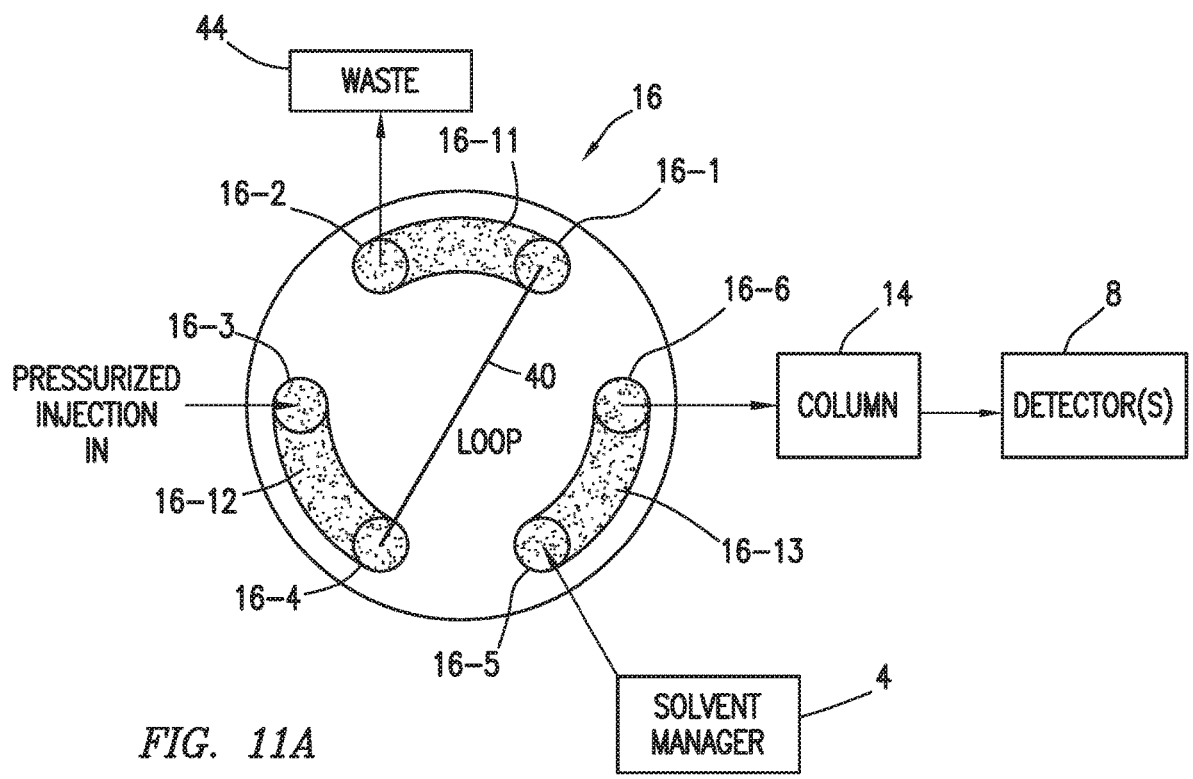
FIG. 11A shows the six port sample valve in a first position ("sample load").
Figure 11B:
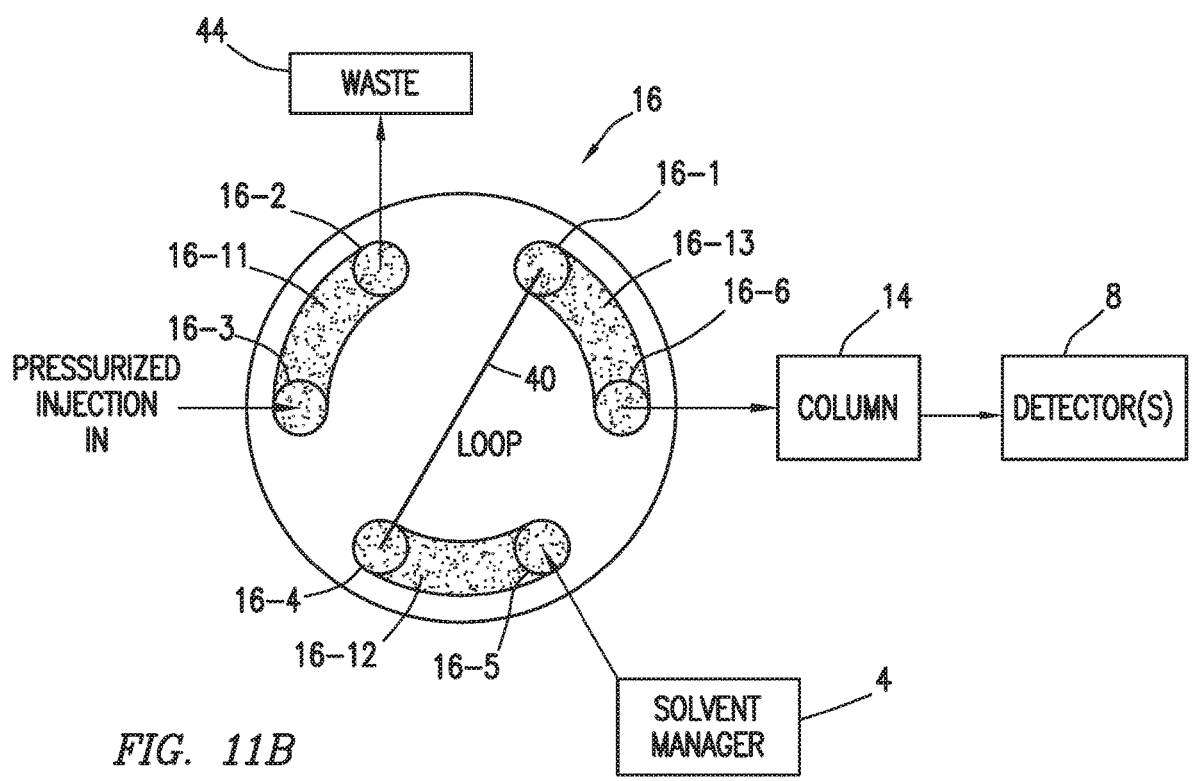
FIG. 11B show the six port sample valve in a second position ("sample analysis") where sample is discharged into the chromatographic column and then into one or more detector.

FIGS. 11A and 11B shows the exemplary LC system 100 comprising an LC instrument 2 having one sample valve 16 and one column 14. The sample valve 16 has two positions, a first position and a second position. As shown, the sample valve 16 has a sample loop 40, six fluidic ports 16-1, 16-2, 16-3, 16-4, 16-5 and 16-6 and three flow-through conduits 16-11, 16-12 and 16-13. The sample loop 40 connects fluidic port 16-1 and fluidic port 16-4. Sample is injected into the sample valve 16 through fluidic port 16-3. A reservoir 44 or other device designed to collect excess sample or waste is connected to fluidic port 16-2 by tubing. The solvent manager 4 is connected to fluidic port 16-5 by tubing. The column 14 connects to fluidic port 16-6 with tubing.

In FIG. 11A, the sample valve 16 is shown in the first position. In the first position, flow-through conduit 16-11 connects fluidic port 16-1 to fluidic port 16-2 establishing a fluidic pathway between the sample loop 40 and the reservoir 44. Flow-through conduit 16-12 connects fluidic port 16-3 to fluidic port 16-4 providing a fluidic pathway for sample injected to pass through to the sample loop 40. In addition, in the first position, flow-through conduit 16-13 connects fluidic port 16-5 to fluidic port 16-6 establishing a fluidic pathway of eluent or solvent from the solvent manager 4 to the column 14 and/or the detector 8.

In FIG. 11B, the sample valve 16 is shown in the second position. In the second position, flow-through conduit 16-11 connects fluidic port 16-2 to fluidic port 16-3 to establish a fluidic pathway between the point of manual injection to waste or the reservoir 44. In the second position, flow-through conduit 16-12 connects fluidic port 16-4 to fluidic port 16-5 providing a fluidic pathway for eluent from the solvent manager 4 that can push sample through the sample loop 40. Also in the second position as shown in FIG. 11B, flow-through conduit 16-13 connects fluidic port 16-1 to fluidic port 16-6 establishing a fluidic pathway from the solvent manager 4 through the sample loop 40 to the column 14 and/or the detector 8.

As described herein, in the first position, the sample valve 16 is configured to establish a fluidic pathway from sample injection to waste and have another fluidic pathway of solvent from the solvent manager 4 to the column 14 and/or detector 8. In the second position, the sample valve 16 establishes a fluidic pathway from the solvent manager 4 of the analytical solvent manager 4 through the sample loop 40 to push sample through the sample valve 16 to the column 14 and/or to the detector 8. Also, in the second position, a fluidic pathway is established from the point of manual injection to waste or the reservoir 44.

Sample Loading/Injection

Prior to injection as well as during operation, the analytical solvent manager 4 is on to establish a continuous fluidic pathway of chromatographic solvent through the sample valve 16. As noted above, in a first position, the solvent manager 4 discharges eluent (solvent) into fluidic port 16-5 of the sample valve 16 establishing a fluidic pathway between fluidic port 16-5 and the column 14 followed by the detector 8. More specifically, solvent is pumped into fluidic port 16-5 to establish a fluidic pathway between the fluidic port 16-5, flow-through conduit 16-13, fluidic port 16-6 and the column 14.

Sample is loaded into the column manager 6 by a pressurized source of sample introduction 52 into the sample valve 16. In a first position of the sample valve 16, sample flows into the sample loop 40 forming a fluidic pathway through the sample valve 16 and to waste or the reservoir 44. More specifically, sample is injected into fluidic port 16-3 establishing a fluidic pathway between flow-through conduit 16-12 into fluidic port 16-4 through the sample loop 40 into fluidic port 16-1 through flow-through conduit 16-11 and out fluidic port 16-2 to the reservoir 44a.

Sample Discharge to the Column

The sample valve 16 is then rotated to the second position (see e.g., FIG. 11B). In the second position, sample is then discharged through the sample valve 16 to the column 14 and/or detector 8. More specifically, the sample valve 16 is forming a fluidic pathway into fluidic port 16-5 through flow-through conduit 16-12 and out fluidic port 16-4 through the sample loop 40 into fluidic port 16-1 through flow-through conduit 16-13 and out fluidic port 16-6. Also in the second position, a fluidic pathway is formed between fluidic port 16-3 through flow-through conduit 16-11 and fluidic port 16-2 to waste.

For the next injection, the sample valve 16 is rotated back to its first position.

The LC Instrument—Two Columns

FIGS. 12A through 12F show the present LC instrument 2 having two columns 14a and 14b and a column selector valve 18. Each of the columns 14 has a first inlet end 36 and a second outlet end 38. As shown, the sample valve 16 can be a six-port valve having two positions and the selector valve 18 can be a seven-port valve having two positions.

As described above, in these figures, the sample valve 16 has a sample loop 40, six fluidic ports 16-1, 16-2, 16-3, 16-4, 16-5 and 16-6 and three flow-through conduits 16-11, 16-12 and 16-13. Sample can be injected into the sample valve 16 through fluidic port 16-3. The sample loop 40 is connected to fluidic ports 16-1 and 16-4. Fluidic port 16-2 is connected to a reservoir 44 or other device designed to collect excess sample or waste. The analytical solvent manager 4 is connected to fluidic port 16-5 of the sample valve 16. Furthermore, fluidic port 16-6 of the sample valve 16 connects to fluidic port 18-5 of the column selector valve 18. Connections to fluidic port 16-2, fluidic port 16-5 and fluidic port 16-6 are made by tubing.

Figure 12A:
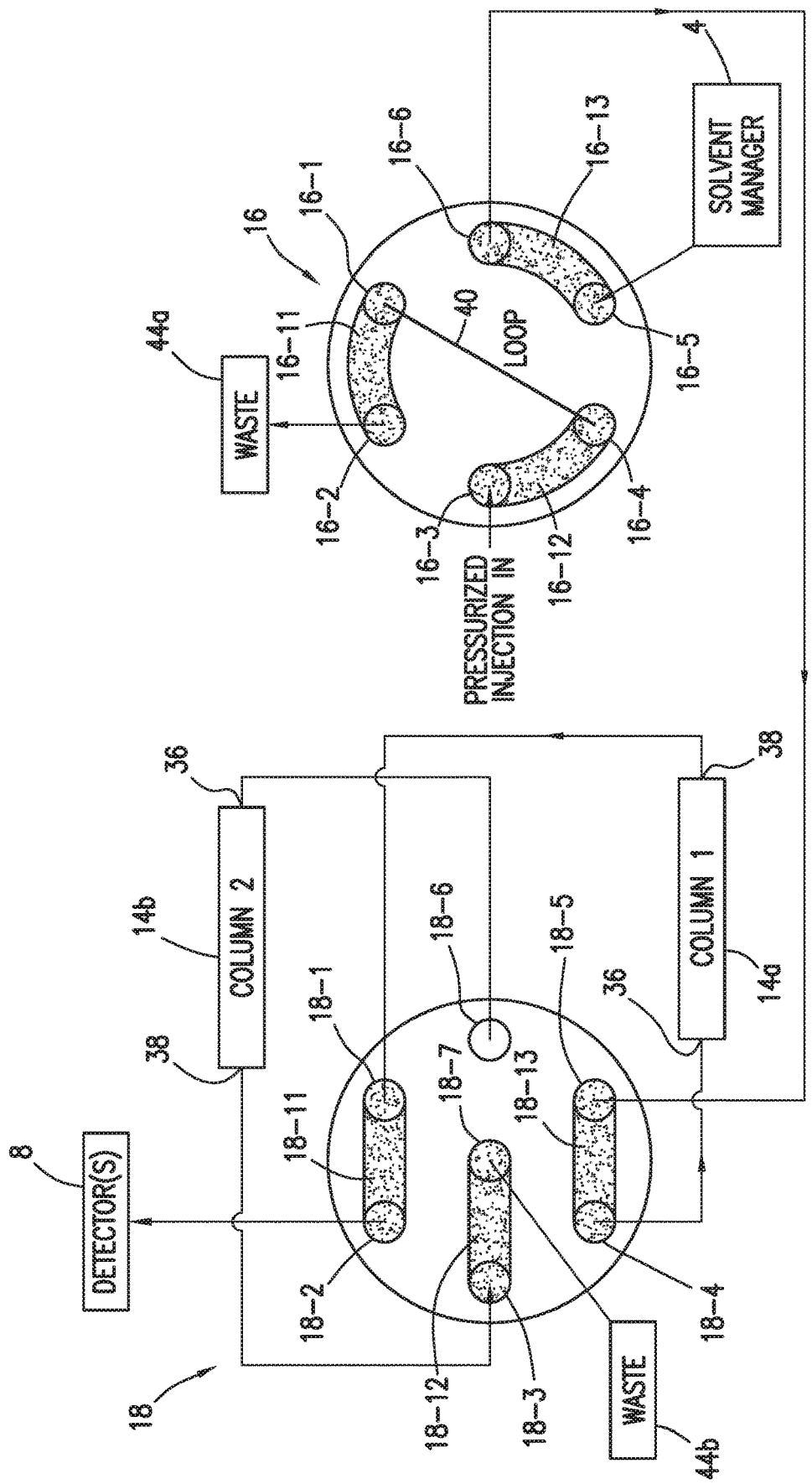
FIGS. 12A, 12B, 12C, 12D, 12E, and 12F show a chromatographic instrument having a sample valve and a column selector valve for use with two columns and in various positions.
Figure 12B:
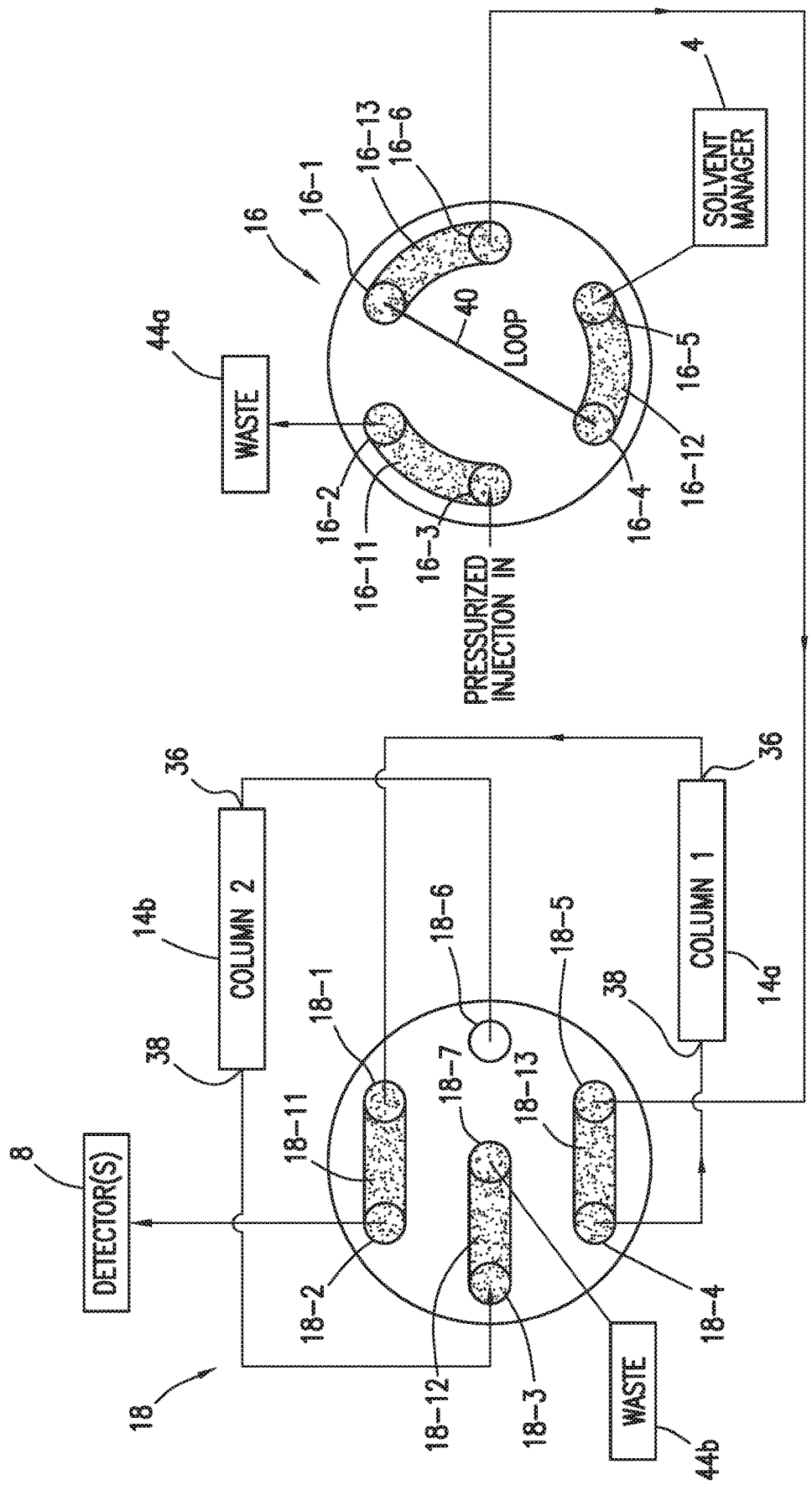
Figure 12C:
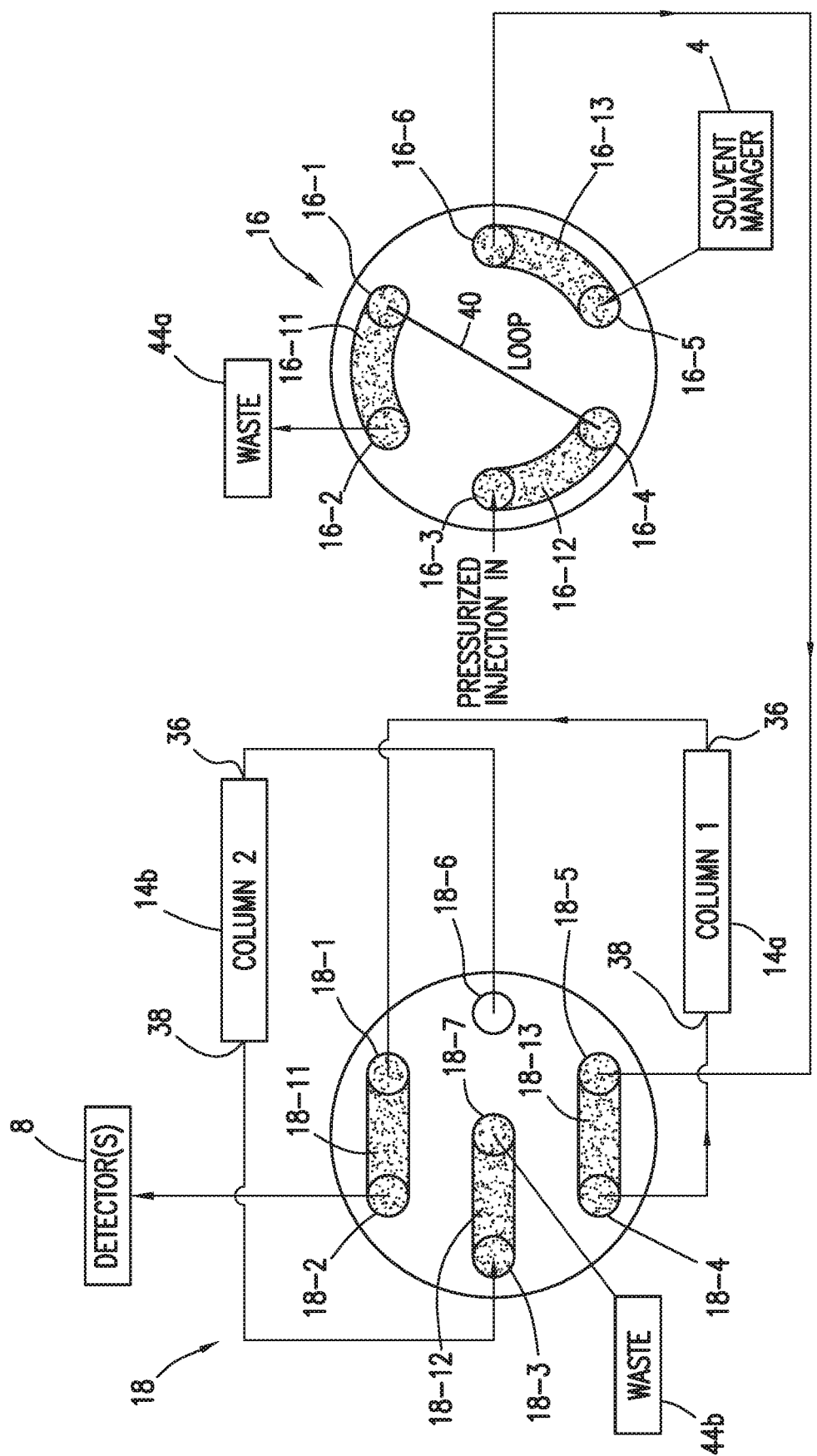
Figure 12D:
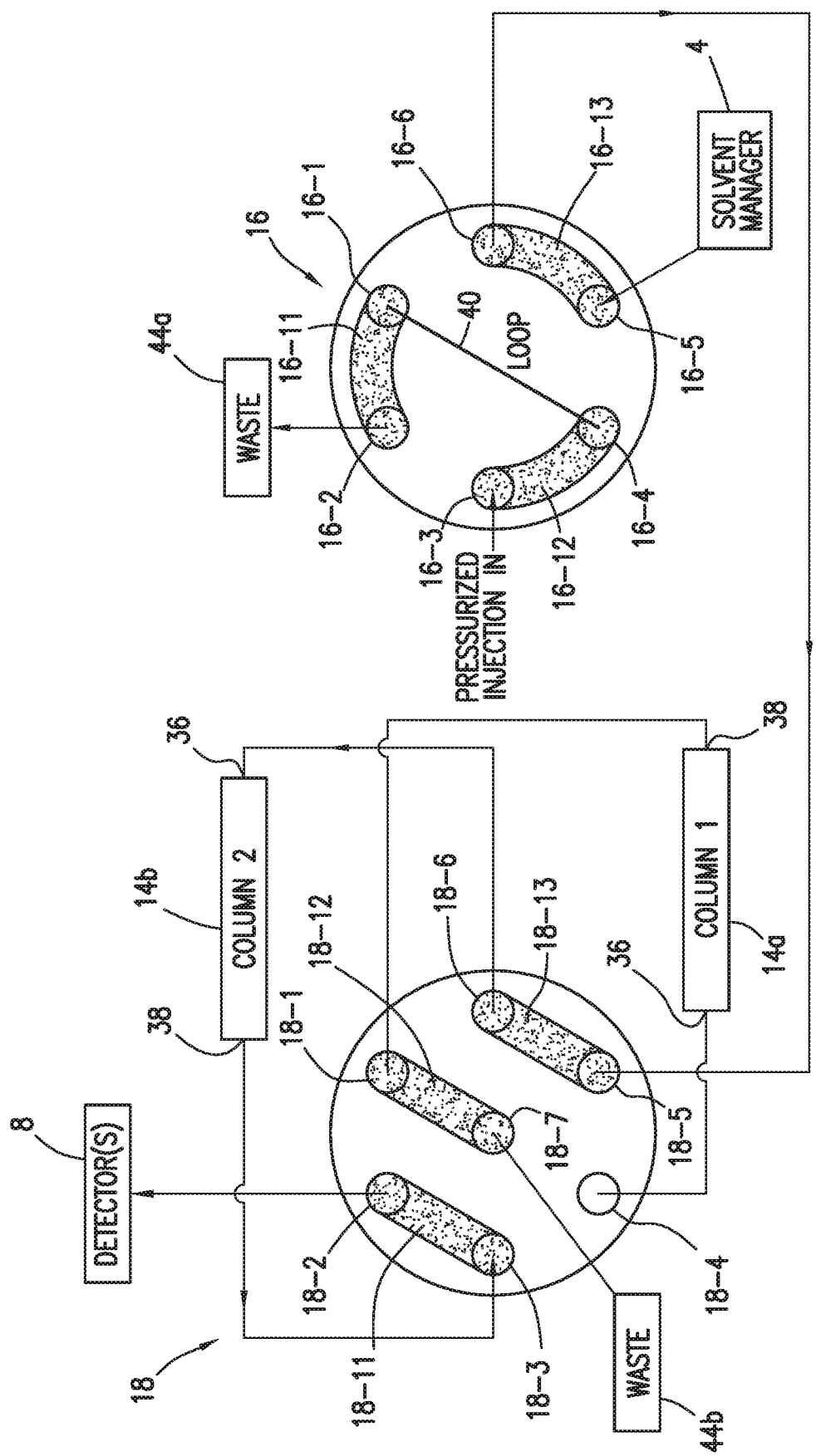
Figure 12E:
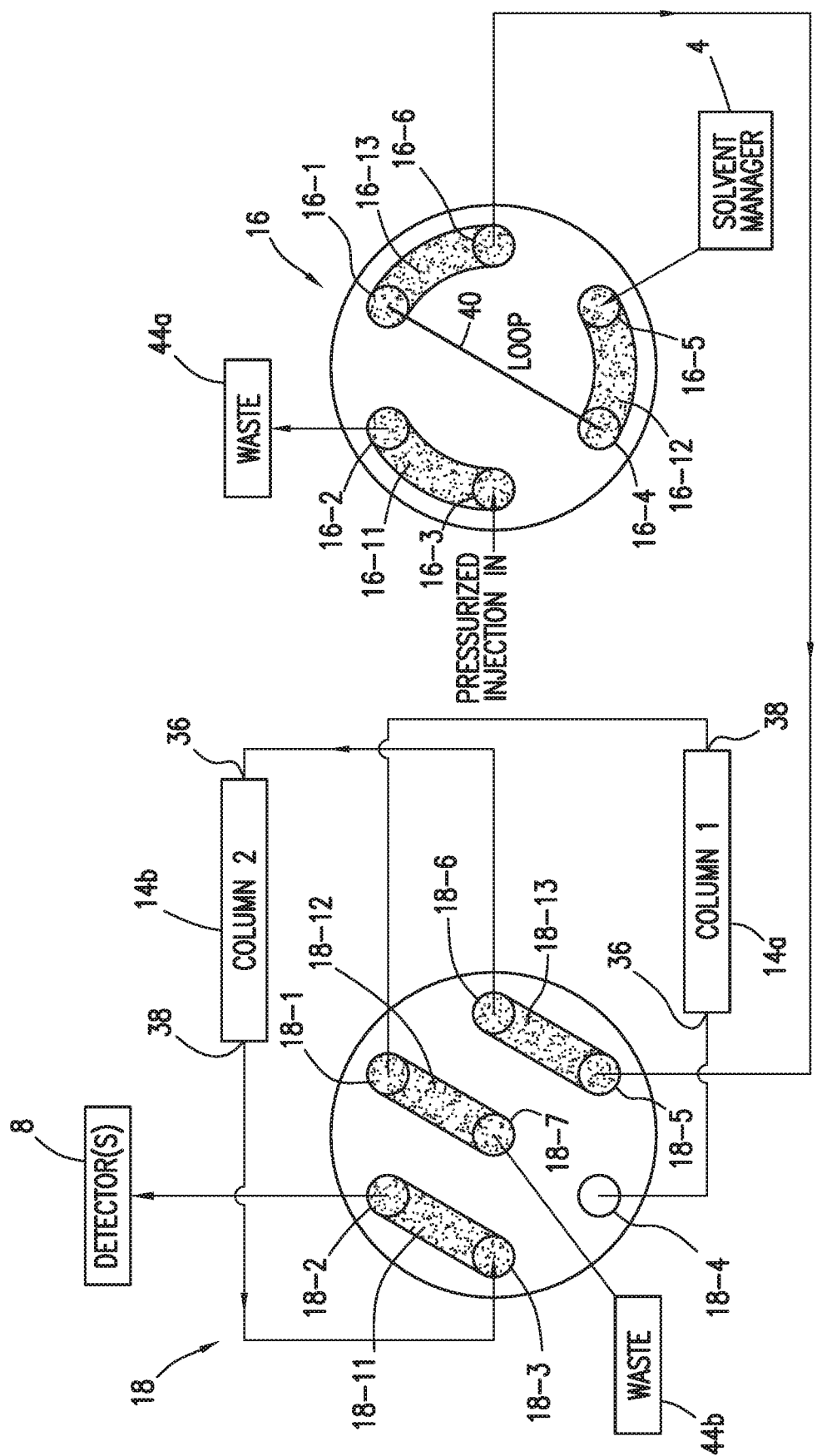
Figure 12F:
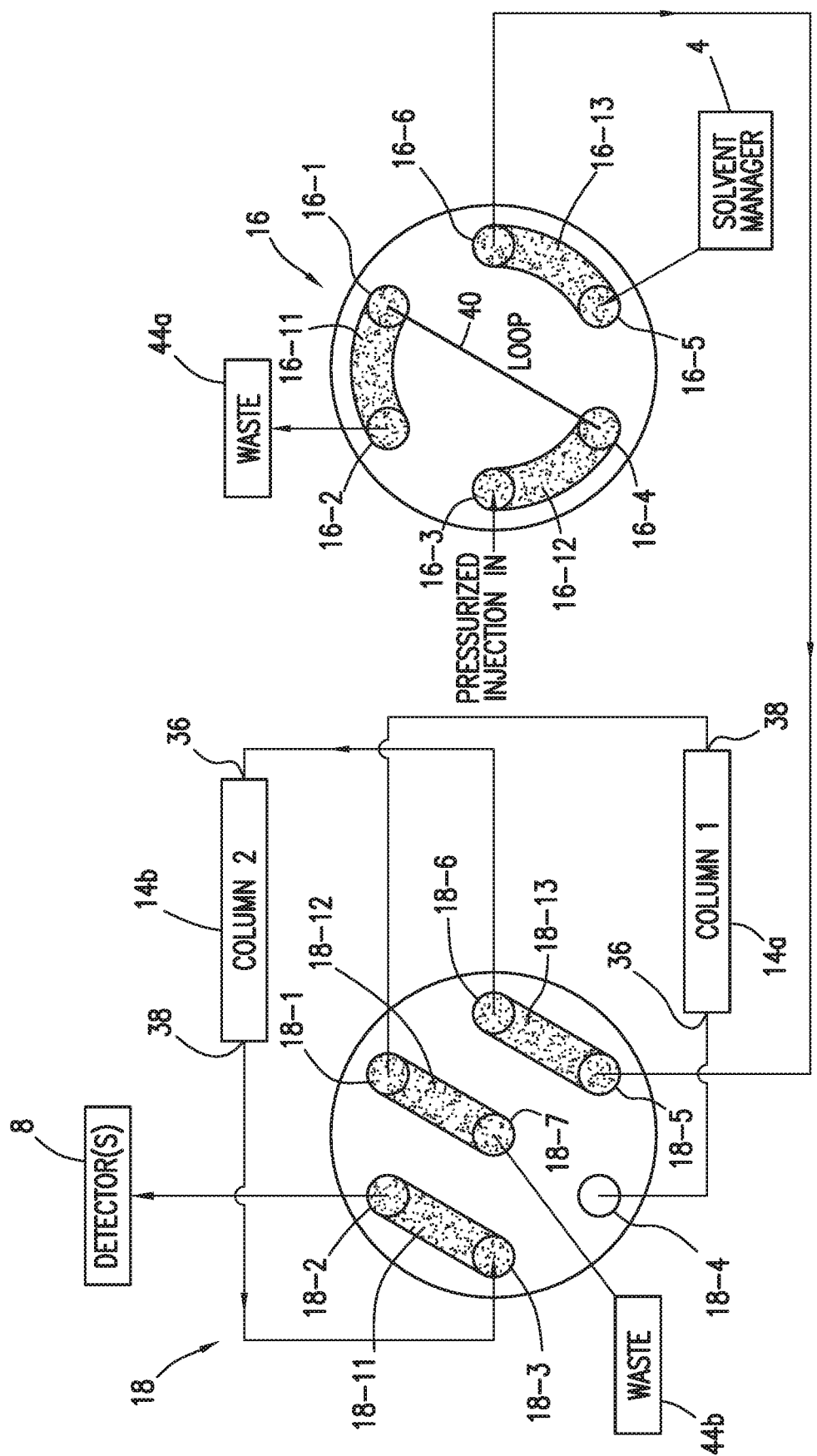

FIG. 12A shows the sample valve 16 in a first position and the column selector valve 18 in a second position where sample is introduced into the first column and the second column is offline and vented to waste. FIG. 12B shows the sample valve 16 in the second position and the column selector valve 18 in the first position where chromatographic eluent moves sample from a loop into the first column 14a and into a detector 8. The second column 14b is offline and vented to waste. FIG. 12C shows the sample valve 16 returning to first position where the loop 40 is ready and available to receive sample. FIG. 12D shows the sample valve 16 in the first position for pressurized injection of sample into the sample loop 40 with excess sample going to waste. The column selector valve is in the second position to allow sample to be introduced into the second column and the first column is offline and vented to waste. FIG. 12E shows the sample valve 16 in the second position and the column selector valve 18 in the second position for introducing sample into the second column 14b with flow to the detector 8. FIG. 12F shows the sample valve in the first position and the column selector valve 18 in the second position for filling the sample loop 40 where sample loop is ready for another injection.

More specifically, in the first position of the sample valve 16 (FIGS. 12A, 12C, 12D and 12F), flow-through conduit 16-11 connects fluidic port 16-1 to fluidic port 16-2 establishing a fluidic pathway between the sample loop 40 and waste or the reservoir 44a. Also, flow-through conduit 16-12 connects fluidic port 16-3 to fluidic port 16-4 providing a fluidic pathway for sample injected to pass through to the sample loop 40. Further, as shown in the figures, flow through conduit 16-13 connects fluidic port 16-5 to fluidic port 16-6 establishing a fluidic pathway of eluent or solvent from the solvent manager 4 to port 18-5 of the column selector valve. Here, sample is introduced into the sample loop 40. Chromatographic solvent flow is in and through the first column 14a and then through to the detector 8.

The sample valve 16 is rotated to a second position. In the second position of the sample valve 16, as shown in FIGS. 12B and 12E, sample is pushed through the sample loop 40 and discharged into the fluidic port 18-5 of the column selector valve 18 where a fluidic pathway to one of two columns, the first column 14a or the second column 14b is provided. More specifically, as shown, in the second position, the sample valve 16 is rotated forming a fluidic pathway into fluidic port 16-5 through flow-through conduit 16-12 and out fluidic port 16-4 through the sample loop 40 into fluidic port 16-1 through flow-through conduit 16-13 and out fluidic port 16-6. Sample with chromatographic solvent then flows from the loop 40 into the first column 14a and then to the detector 8. For the next injection, the sample valve 16 is rotated to the first position.

As shown in FIG. 12A through 12F, the column selector valve 18 has seven fluidic ports 18-1, 18-2, 18-3, 18-4, 18-5, 18-6 and 18-7 and three flow-through conduits 18-11, 18-12 and 18-13. Fluidic port 18-1 is connected to a second end 38 of the first column 14a. Fluidic port 18-2 is connected to the detector 8. Fluidic port 18-3 is connected to a second end 38 of the second column 14b. Fluidic port 18-4 is connected to the first end 36 of the column 14a. Fluidic port 18-5 of the column selector valve 18 is connected to fluidic port 16-6 of the sample valve 16. Fluidic port 18-6 is connected to the first end 36 of the column 14b. Fluidic port 18-7 is connected to the reservoir 44b. Each of the fluidic port (18-1, 18-2, 18-3, 18-4, 18-5, 18-6 and 18-7) connections described in this paragraph is made with tubing and one made with active preheaters. As described herein, tubing can be made of stainless steel, MP35N or PEEK.

As noted above, the column selector valve 18 has two positions. As shown in FIGS. 12A, 12B and 12C, in a first position, flow-through conduit 18-11 connects fluidic port 18-1 to fluidic port 18-2 to provide a fluidic pathway from the second end 38 of the column 14a to the detector 8. In addition, in the first position of the selector valve 18, flow-through conduit 18-12 connects fluidic port 18-3 to 18-7 providing a fluidic pathway from the second end 38 of the column 14b to waste or the reservoir 44b. Further, in the first position of the selector valve 18, flow-through conduit 18-13 connects fluidic port 18-4 to fluidic port 18-5 establishing a fluidic pathway from the sample valve 16 to the first end 36 of the column 14a.

As shown in FIGS. 12D, 12E and 12F, in a second position of the column selector valve 18, flow-through conduit 18-11 connects fluidic port 18-3 to fluidic port 18-2 to provide a fluidic pathway from the second end 38 of the column 14b to the detector 8. In addition, in the second position of the selector valve 18, flow-through conduit 18-12 connects fluidic port 18-1 to 18-7 providing a fluidic pathway from the second end 38 of the column 14a to waste or the reservoir 44b. Further, in the second position of the selector valve 18, flow-through conduit 18-13 connects fluidic port 18-5 to fluidic port 18-6 providing a fluidic pathway from the fluidic port 16-6 of the sample valve 16 to the first end 36 of the column 14b. As shown, in the second position, the selector valve 18 is configured to select the column 14b, establishing a fluidic pathway from the second end 38 of column 14b to fluidic port 18-3 through flow-through conduit 18-11 out fluidic port 18-2 and to the detector 8.

As shown in FIG. 12A, the sample valve 16 is in the first position and the column selector valve 18 is the first position. An analytical solvent flow is established with chromatographic solvent pumped through both the sample valve 16 and the selector valve 18 into the column 14a and detector 8. By using a pressurized source of sample introduction (not shown), the sample loop 40 is filled with sample to be analyzed with excess sample going to waste or the reservoir 44a. The other column 14b is offline and vented to waste or reservoir 44b. Specially, sample is injected via the pressurized source of sample introduction into the sample valve 16 through fluidic port 16-3 through flow-through conduit 16-12 into fluidic port 16-4 through the first sample loop 40 into fluidic port 16-1 through flow-through conduit 16-11 and out fluidic port 16-2 to the reservoir 44a. Solvent is pumped into fluidic port 16-5 from the solvent manager 4 to establish a fluidic pathway through flow-through conduit 16-13 out of fluidic port 16-6 to fluidic port 18-5 of the column selector valve 18 through flow-through conduit 18-13 out fluidic port 18-4 through the column 14a to fluidic port 18-1 through flow-through conduit 18-11 out fluidic port 18-2 and to the detector 8 or multiple detectors (not shown).

Introduction of Sample into the First Column

To introduce the sample into the first column 14a, the sample valve 16 is rotated to the second position, and the selector valve 18 is not rotated but remains in the first position. As shown in FIG. 12B, the sample valve 16 is in the second position and the selector valve 18 is in the first position. In this configuration of the valves 16 and 18, the sample loop 40 is placed in-line with chromatographic eluent flow and sample flows into column 14a for separation of components with fluidic flow continuing to one or more detectors 8. More specifically, sample flows out of fluidic port 16-6 of the sample valve 16 to fluidic port 18-5 of the selector valve 18 and through flow-through conduit 18-13 and out fluidic port 18-4 into the first end of column 14a. Sample passes through column 14a and continues to flow out the second end of the column 14a to fluidic port 18-1 through flow-through conduit 18-11 and out fluidic port 18-2 to one or more detector(s) 8.

Hence, the chromatographic process is started and the sample introduced without an autosampler or other sample manager.

Prime for Next Sample

Upon discharging sample into the detector 8, the sample valve 16 is returned to its first position while the selector valve 18 remains in the first position to select column 14a. An analytical solvent flow continues with chromatographic solvent pumped through both the sample valve 16 and the selector valve 18 into the column 14a and detectors 8. The sample loop 40 of the sample valve 16 is ready to be filled with another sample injection for analysis. Column 14b remained offline and vented to waste or a reservoir 44.

Selection of the Second Column

As shown in FIG. 12C, to select the other column 14b for sample analysis, after the sample valve 16 is return to its first position, the selector valve 18 is be rotated by one port position to establish a fluidic pathway to column 14b as shown in FIG. 12D. An analytical solvent flow is then established with chromatographic solvent pumped through both the sample valve 16 and the selector valve 18 into the column 14b and one or more detector 8. Specifically, solvent is pumped into fluidic port 16-5 of the sample valve 16 from the solvent manager 4 to establish a fluidic pathway between fluidic port 16-5 through flow-through conduit 16-13 and fluidic port 16-6 to fluidic port 18-5 of the column selector valve 18. Within the column selector valve 18 as shown in FIG. 12D, the fluidic pathway continues through flow-through conduit 18-13 and out fluidic port 18-6 into the first end 36 of column 14b. From the column 14b, the fluidic pathway further continues from the second end 38 of column 14b to fluidic port 18-3 through flow-through conduit 18-11 and out fluidic port 18-2 of the column selector valve 18 to the detector 8 or multiple detectors (not shown).

As shown in FIG. 12D, by using a pressurized source of sample introduction (not shown), as described above, the sample loop 40 is filled with sample to be analyzed with excess sample going to waste or the reservoir 44a. Specifically, sample is injected via the pressurized source of sample introduction into the sample valve 16 through fluidic port 16-3 through flow-through conduit 16-12 into fluidic port 16-4 through the sample loop 40 into fluidic port 16-1 through flow-through conduit 16-11 and out fluidic port 16-2 to the reservoir 44a. The first column 14a is now offline and vented to waste or reservoir 44b through a fluidic pathway established between fluidic port 18-4 through the first column 14a into fluidic port 18-1 through flow-through conduit 18-12 out fluidic port 18-7 and to waste or reservoir 44b.

Introduction of Sample into the Second Column

As shown in FIG. 12E, upon loading the sample loop 40 with sample, the sample valve 16 is rotated one fluidic port position such that the sample loop 40 is placed in-line with the chromatographic eluent flow. The selector valve 18 remains in the second position such that the column 14b is selected. Sample is introduced into the column 14b for separation of components. Column 14a is offline and vented to the reservoir 44b. The solvent manager 4 remains on.

The selector valve 18 in the second position establishes a fluidic pathway from the sample valve 16 to the detector 8 through the column 14b. Sample in the sample loop 40 discharges through fluidic port 16-1 through flow-through conduit 16-13 to fluidic port 16-6 and out of fluidic port 16-6 of the sample valve 16 to fluidic port 18-5 of the column selector valve 18. In the column selector valve 18, this fluidic pathway continues through flow-through conduit 18-13 out fluidic port 18-6 into the first end 36 of the column 14b for separation. A fluidic pathway is further established between the second end 38 of the second column 14b to fluidic port 18-3 through flow-through conduit 18-11 out fluidic port 18-2 to the detector 8 and/or multiple detectors.

Prime for Next Sample

As shown in FIG. 12F, the sample valve 16 is returned to the first position by rotating the valve one position while the selector valve 18 remains in the second position. The solvent manager 4 remains on and eluent (solvent) continues to flow through the valves 16, 18 and column 14b to the detector 8 or multiple detectors. The sample loop 40 is then ready to be filled via the pressurized source of sample introduction for analysis. The column 14a is offline and is vented to the second collection reservoir 44b.

Alternatively, upon discharging sample to the detector 8, the LC system 100 can be re-configured as described above to establish a fluidic pathway in and to column 14a. In this instance, both the sample valve 14 and the selector valve 18 are each returned to its first position.

Single or Multiple Column Applications with Sample Dilution

FIGS. 13A, 13B, 13C, and 13D present examples of single and multiple column of the LC systems 100 described herein that provide sample dilution with pressurized injection. Similar methods for diluting sample in an LC system where sample and diluent are drawn from reservoirs and combined to generate a volume of diluted sample that is loaded into a sample loop and injected into mobile phases are described in U.S. Pat. No. 9,551,329 entitled Automated Dilution for Liquid Chromatography.

As shown in FIGS. 13A to 13D, the present LC systems 100 can include an external valve 20 and mixing tee 28. The mixing tee 28 is connected to the external valve 20 and the sample valve 16 with tubing. A dilution pump 26 is connected to the mixing tee 28 with tubing. More specifically, the external valve 20 is a programmable switching valve having two positions: a first position and a second position. The external valve 20 has a primary loop 42, six fluidic ports 20-1, 20-2, 20-3, 20-4, 20-5 and 20-6 and three flow-through conduits 20-11, 20-12 and 20-13. A primary loop 42 connects fluidic ports 20-4 and 20-1. Fluidic port 20-2 is connected to the reservoir 44b or other device designed to collect excess sample or waste. A sample pump 24 is connected to fluidic port 20-5 of the external valve 20. Fluidic port 20-6 of the external valve 20 is connected to the mixing tee 28. In this embodiment, sample is injected into fluidic port 20-3 of the external valve 20. Tubing is used to make each of the connections described in this paragraph.

Figure 13A:
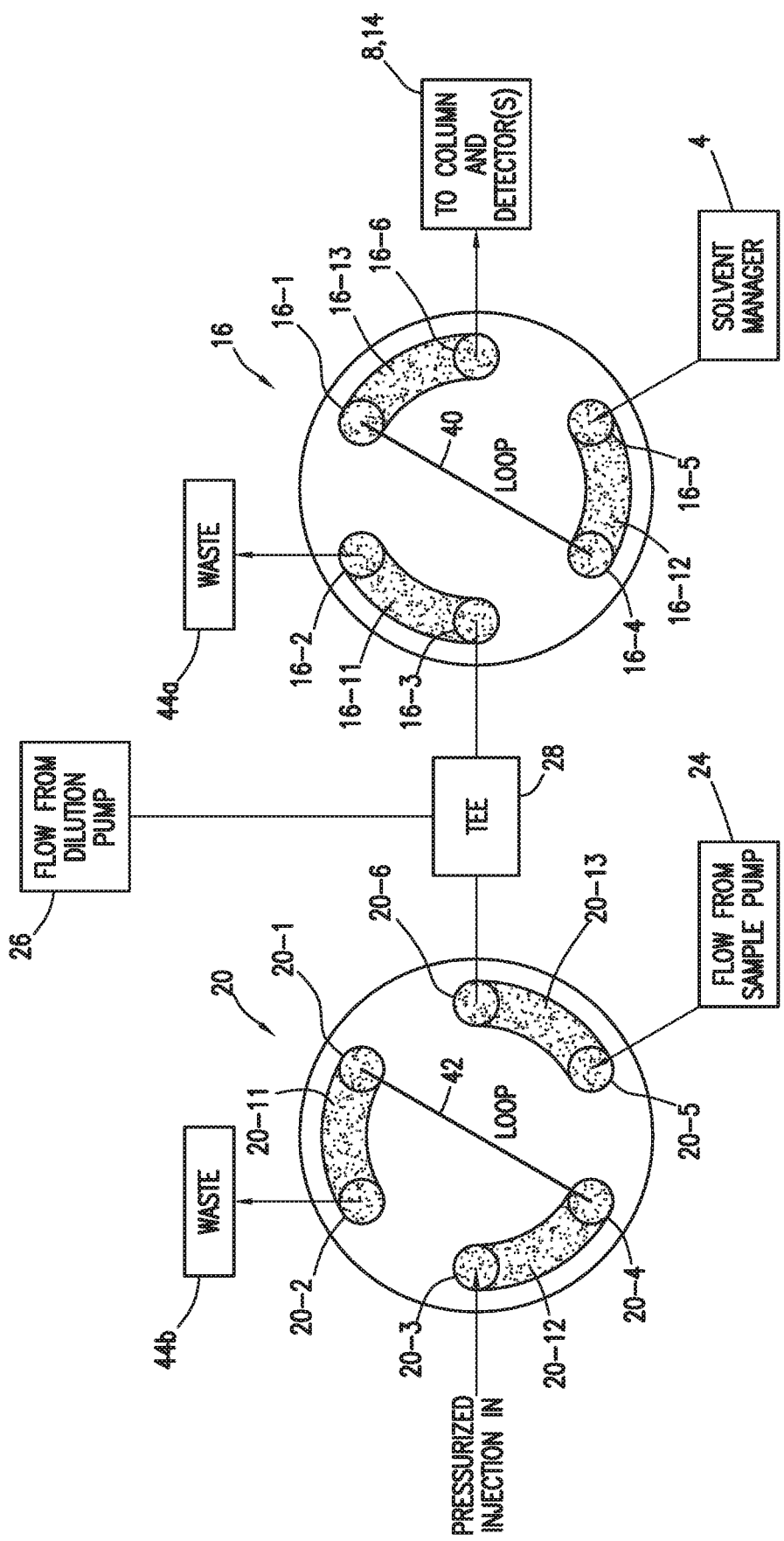
FIG. 13A provides an example of manual sample introduction, filling the loop with sample where excess sample flows to waste. The sample valve is in the first position and a dilution sample valve is in a first position.
Figure 13B:
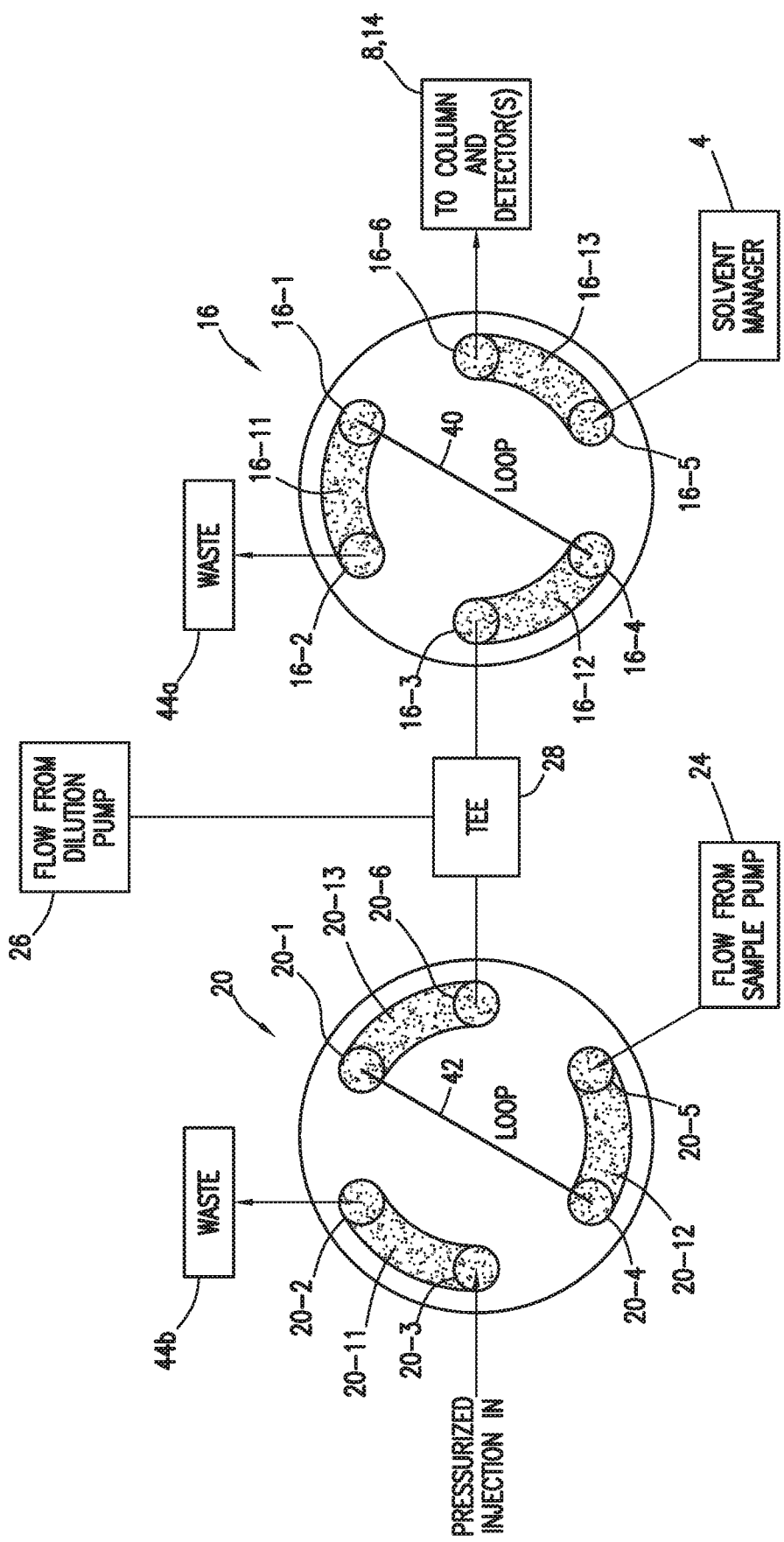
FIG. 13B shows the sample valve in the second position and dilution valve in a first position where sample flows from the loop into a mixing tee to be mixed with sample from a pump. At the mixing tee, sample is diluted with solvent flowing from a dilution pump. Diluted sample flows into the loop of the dilution sample valve with excess sample flowing to waste. The amount or concentration of sample dilution is determined by the flow ratios of sample and solvent from the dilution pump.
Figure 13C:
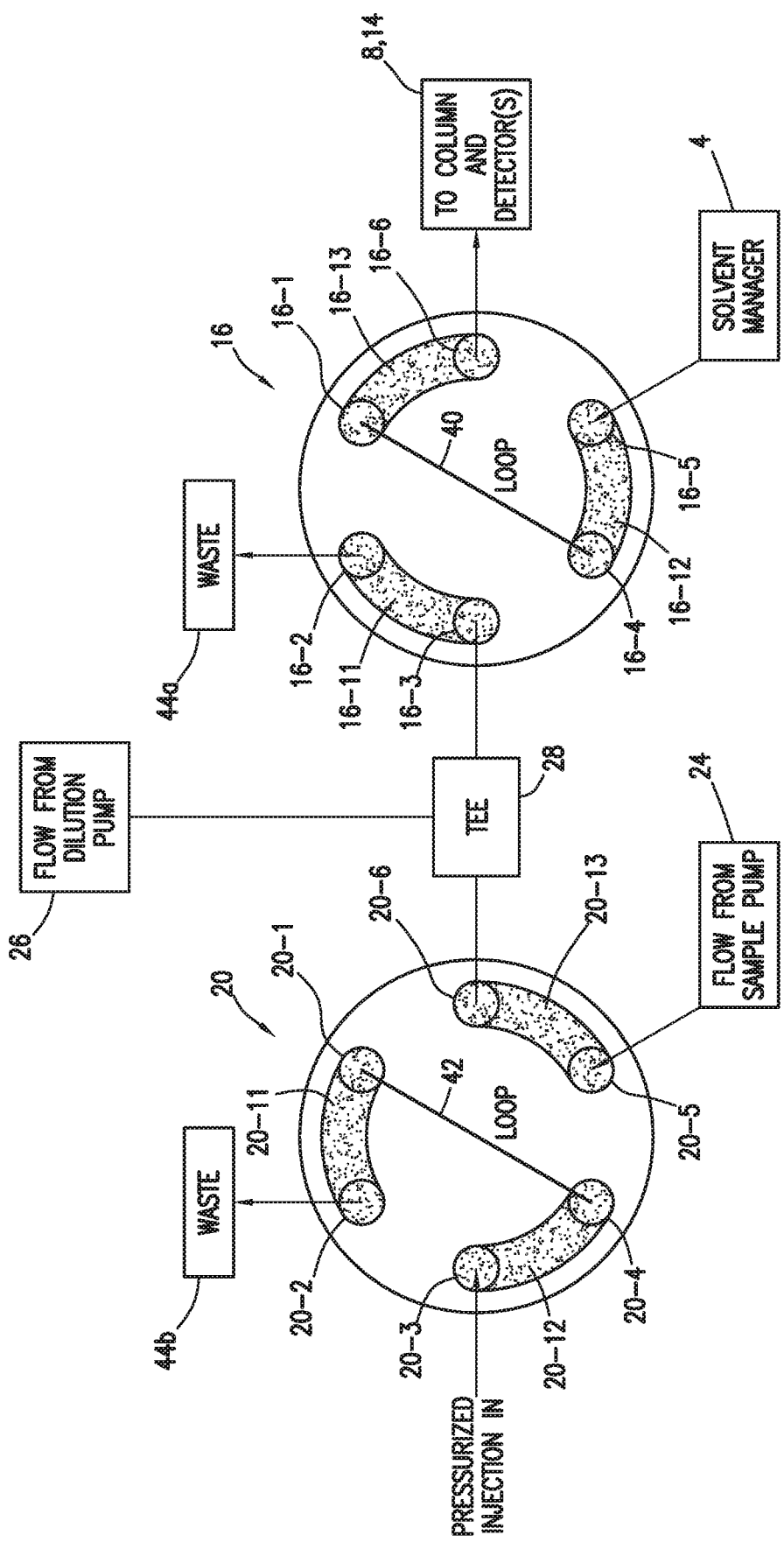
FIG. 13C shows the sample valve in the first position and the diluted sample valve in the second position where diluted sample flows into the loop from the analytical pump and into the chromatographic column and to the detector(s).
Figure 13D:
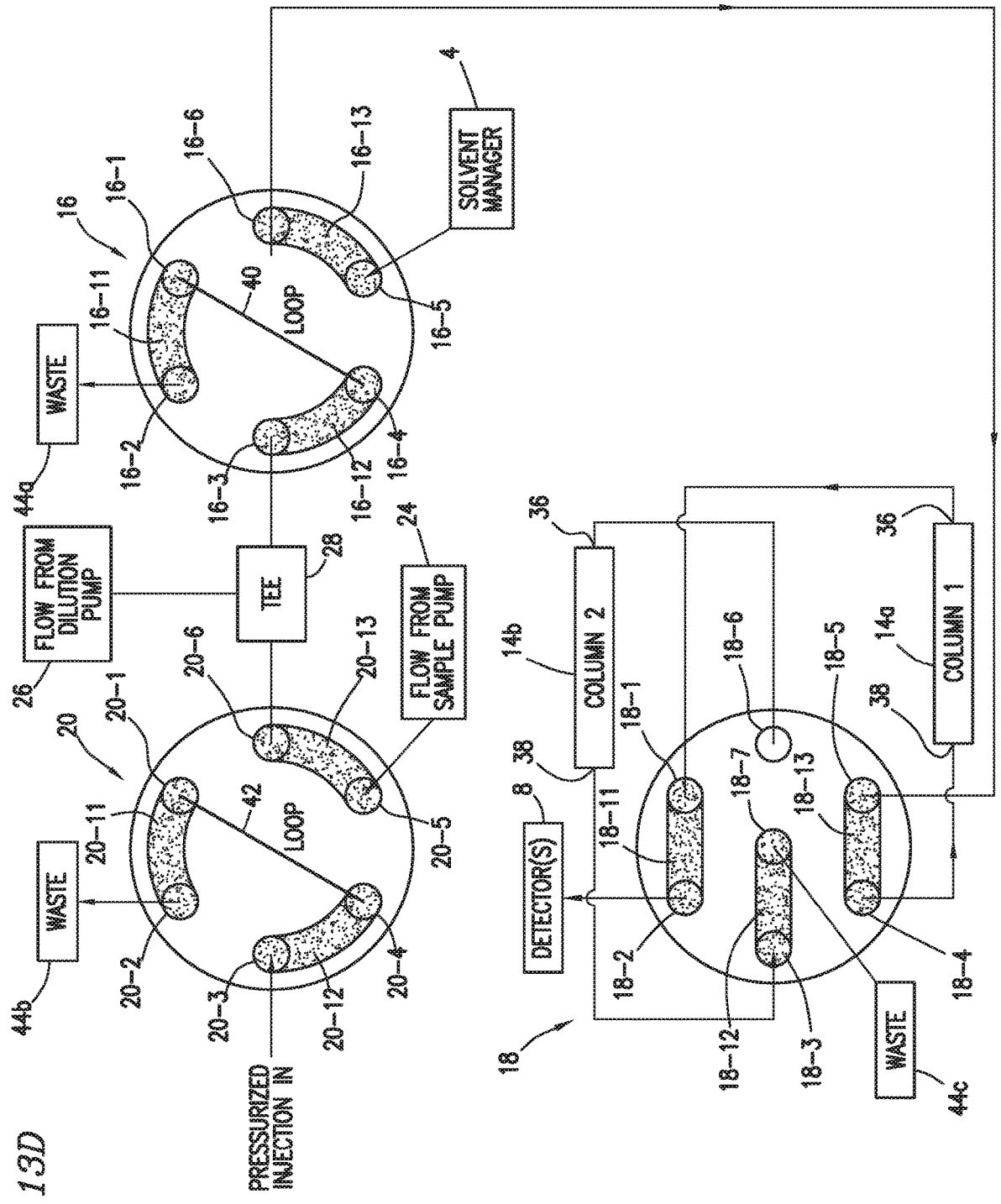
FIG. 13D show the manual injection sequence of FIGS. 12A through 12F for two columns used interchangeably with the diluted sample valve sequence of FIGS. 13A and 13B where sample is diluted prior to introduction into the chromatographic column.

The external valve 20 is shown in the first position in FIGS. 13A, 13C, and 13D. In the first position, flow-through conduit 20-11 connects fluidic port 20-1 to fluidic port 20-2 establishing a fluidic pathway between the primary loop 42 and waste or the reservoir 44b. Flow-through conduit 20-12 connects fluidic port 20-3 to fluidic port 20-4 providing a fluidic pathway through the primary loop 42 into fluidic port 20-1 through flow-through conduit 20-11 into fluidic port 20-2 and out to waste. In addition, flow-through conduit 20-13 connects fluidic port 20-5 to fluidic port 20-6 to establish a fluidic pathway the sample pump 24 to the mixing tee 28 into fluidic port 16-3 of the sample valve 16 through flow-through conduit 16-11 out fluidic port 16-2 and to waste or the reservoir 44a.

The external valve 20 is shown in the second position in FIG. 13B. In the second position, flow-through conduit 20-11 connects fluidic port 20-2 to fluidic port 20-3 to establish a fluidic pathway between the point of pressurized injection to waste or the reservoir 44b. In the second position, flow-through conduit 20-12 connects fluidic port 20-4 to fluidic port 20-5 providing a fluidic pathway for eluent from the sample pump 24 that can push sample through the primary loop 42. Also, in the second position as shown in FIG. 13B, flow-through conduit 20-13 connects fluidic port 20-1 to fluidic port 20-6 establishing a fluidic pathway from the sample pump 24 through the primary loop 42 to the mixing tee 28.

Sample Loading

For sample loading, FIG. 13A shows the LC system having the external valve 20 in the first position and the sample valve 16 in the first position. The primary loop 42 is loaded with sample to be analyzed with excess sample flowing to waste. The dilution pump 26 and the sample pump 24 are filled but idle. Chromatographic solvent is pumped from the solvent manager 4 through the sample valve 16 into the column 14 or the detector 8. Specifically, sample is injected using the manual injector 52 into fluidic port 20-3, providing a fluidic pathway of sample into through flow-through conduit 20-12, out fluidic port 20-4 into the primary loop 42 into fluidic port 20-1 through flow-through conduit 20-11 and out fluidic port 20-2 to waste or the reservoir 44b. A fluidic pathway is established through the sample valve 16 as shown in FIGS. 11B, 12B, and 12E, and described above.

Sample Dilution and Sample Loading

FIG. 13B shows the LC system 2 is configured to dilute (or quench) sample at the mixing tee 28. The external valve 20 is moved into the second position and the sample valve 16 is moved into the second position. For example, from the first position, the external valve 20 is rotated by one port position to the second position. Similarly, from the first position, the sample valve is rotated by one port position to the second position. Rotation of the external valve 20 and/or sample valve 16 by one port position achieves the same position. Sample is discharged to the mixing tee 28 where it is combined with diluent from the dilution pump 26. Diluted sample is then loaded automatically into the sample loop 40 of the sample valve 16. The analytical pump 22 of the solvent manager 4 is turned on to establish a chromatographic solvent flow into the column 14 and detector 8.

In the second position of the external valve 20, flow-through conduit 20-12 connects fluidic port 20-5 to fluidic port 20-4 establishing a fluidic pathway between the sample pump 24 through the primary loop 42 into fluidic port 20-1 through flow through conduit 20-13 out fluidic port 20-6 to the mixing tee 28 and to the sample valve 16 at fluidic port 16-3. In addition, in the second position of the sample valve 16, flow-through conduit 16-12 connects fluidic port 16-3 to fluidic port 16-4 establishing a fluidic pathway between the mixing tee 28 and the sample loop 40 into fluidic port 16-1 through flow-through conduit 16-11 and out fluidic port 16-2 to waste or the reservoir 44a.

For sample dilution, the sample pump 24 flows at a programmed flow rate pushing sample from the primary loop 42 into the mixing tee 28. At the mixing tee 28, sample is diluted with the programmed flow from the dilution pump 26, resulting in the formation of a diluted sample. Diluted sample is introduced into the sample loop 40 of the sample valve 16 with excess sample going to waste. Noteworthy, different dilutions can be obtained through the independent flow rate programming of the sample pump 24 and the dilution pump 26. The flow in the analytical pump 22 is maintained with chromatographic solvent through the sample valve 16 into the column 14 and detector 8.

Introduction of Sample into Column and/or Detector

FIG. 13C shows the LC system 2 configured to introduce sample into the column 14 and/or detector 8. Diluted sample is discharged to the column 14 for separation of components and/or to the detector 8. As shown, the external valve 20 is moved into the first position and the sample valve 16 is moved into the first position. From the second position, the external valve 20 is rotated counterclockwise by one port position to the first position. Similarly, from the second position, the sample valve is rotated by one port position to the first position. Rotation of the external valve 20 and/or sample valve 16 by one port position achieves the same position. More specifically, diluted sample is discharged into the column 14 for component separation establishing a fluidic pathway that continues to the detector 8 (s). The external valve 20 in the first position is ready to accept another sample manually. The sample pump 24 and diluent pump 26 empty to waste, refill, and sit idle ready for dilution of sample.

As noted above, for LC systems 2 having multiple columns (14a, 14b), upon mixing diluent with sample (FIG. 13B), diluted sample flows through the sample valve 16 and the selector valve 18 as shown in FIGS. 12A, 12B, 12C, 12D, 12E, and 12F and described herein with the external valve 20 subsequently returning to the first position when sample is introduced into the column 14 and/or detector 8.

FIG. 13D shows that sample can be diluted and introduced into the first column 14a or the second column 14b. Tubing connects the external valve 20 to the mixing tee 28 and to the sample valve 16. In addition, tubing connects fluidic port 16-6 of the sample valve 16 to fluidic port 18-5 of the selector valve 18. Selection between the first column 14a and the second column 14b is performed by the selector valve 18 and depends on the configuration of the selector valve 18, as described above for two-column applications.

In brief, for analysis of diluted sample using a two-column application, sample is injected into fluidic port 20-3 of the external valve 20 in the first configuration. Sample is then discharged by the sample pump 24 from the second sample loop 42 into the mixing tee 28 where it is diluted with diluent discharged by the diluent pump 26. Diluted sample is then further discharged into fluidic port 16-3 of the sample valve 16 in the second configuration, with excess flowing through flow-through conduit 16-11 out fluidic port 16-2 to the first collection reservoir 44. To load the first sample loop 40, the sample valve 16 is rotated by one port position such that the sample pump 24 and the dilution pump 26 can push the diluted sample out of fluidic port 16-6 through flow-through conduit 16-12 out fluidic port 16-4 and into the first sample loop 40. Excess diluted sample flows out fluidic port 16-1 through flow-through conduit 16-11 and out fluidic port 16-2 to the first collection reservoir 44. The sample valve 16 rotates by one port position into the second configuration such that flow-through conduit 16-12 provides a fluidic pathway between the solvent pump 22 and the selector valve 18. This configuration of the sample valve 16 places the first sample loop 40 filled with diluted sample in-line with the solvent pump 22. Sample can then be analyzed using the first column 14a or the second column 14b provided by the configuration of the selector valve 18 as described above.

Once diluted sample is analyzed, the sample pump 24 and the dilution pump 26 empty and refill as described above. The solvent pump 22 remains on with the solvent composition stream flowing to the columns 14a and 14b and to the detector 8.

2-Dimensional Technology with the Pressurized Source of Sample Introduction

As shown in FIGS. 14A through 14E, for a 2-dimensional application with the pressurized source of sample introduction 52, the present LC system 100 comprises a first dimension column 92, a second dimension column 94, a high pH (approximately pH7) elution pump 30, a low pH (approximately pH2) elution pump 32, a first dimension detector 7, a second dimension detector 9, a splitter 34. As shown in FIGS. 14A through 14E, the first dimension column 92, the low pH elution pump 32, the first dimension detector 7 and the solvent manager 4 are each connected to the selector valve 18 by tubing. The splitter 34 is connected to the first dimension detector and the second dimension column 94 by tubing. The second dimension column 94, the second dimension detector 9, the selector valve 18 are each connected to the sample valve 16 by tubing.

In an embodiment, the sample valve 16 is a ten port valve having the sample loop 40, ten fluidic ports 16-1, 16-2, 16-3, 16-4, 16-5, 16-6, 16-7, 16-8, 16-9 and 16-10 and five flow-through conduits 16-11, 16-12, 16-13, 16-14 and 16-15. Fluidic port 18-4 of the selector valve 18 is connected to fluidic port 16-1. The high pH elution pump 30 is connected to fluidic port 16-2. The sample loop 40 is connected to fluidic port 16-3 and fluidic port 16-10. Fluidic port 16-5 is connected to waste or the reservoir 44b. Fluidic port 16-6 is plugged and not used. The second dimension detector 9 is connected to fluidic port 16-7. An outlet end 38 of the second dimension column 94 is connected to fluidic port 16-8. Each of these fluidic ports 16-1, 16-2, 16-3, 16-4, 16-5, 16-6, 16-7, 16-8, 16-9 and 16-10 connections described in this paragraph is with tubing.

Figure 14A:
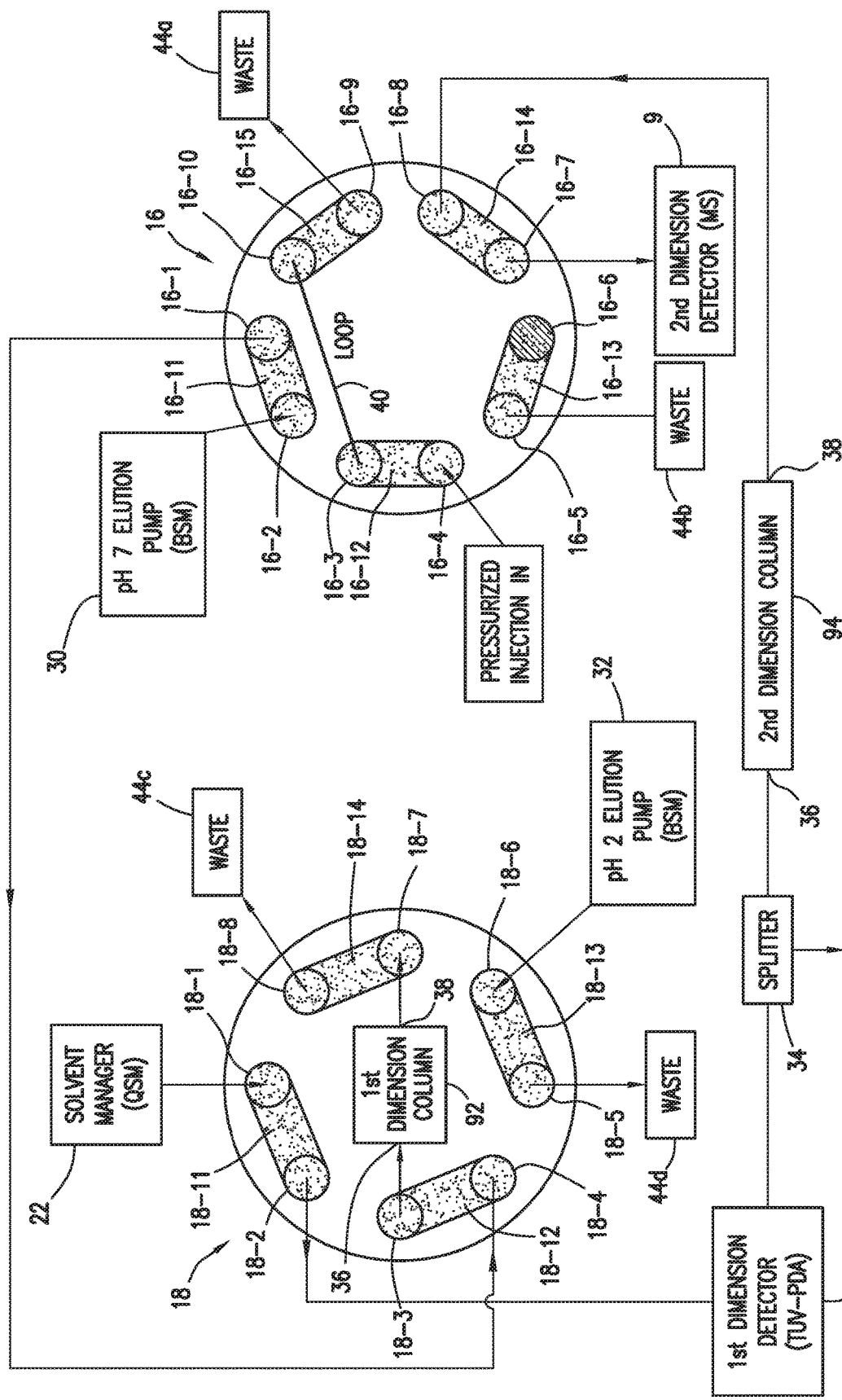
FIG. 14A shows the eight port selector valve in the first position and the 10 port sample valve in the first position for loading sample into the sample loop with excess going to waste.

The sample valve 16 has two positions: a first position and a second position. As shown in FIGS. 14A and 14E, in the first position, flow-through conduit 16-11 of the sample valve 16 connects fluidic port 16-1 to fluidic port 16-2 to establish a fluidic pathway from the high pH elution pump 30 to the inlet end 36 of the first dimension column 92 and out to waste or the reservoir 44c. Flow-through conduit 16-12 connects fluidic port 16-3 to fluidic port 16-4 providing a fluidic pathway for sample to load the sample loop 40 into fluidic port 16-10 through flow-through conduit 16-15 and out fluidic port 16-9 to waste or reservoir 44a. Also, flow-through conduit 16-14 connects fluidic port 16-8 to fluidic port 16-7 providing a fluidic pathway between an outlet end 38 of the second dimension column 94 and the second dimension detector 9 or multiple detectors.

Figure 14B:
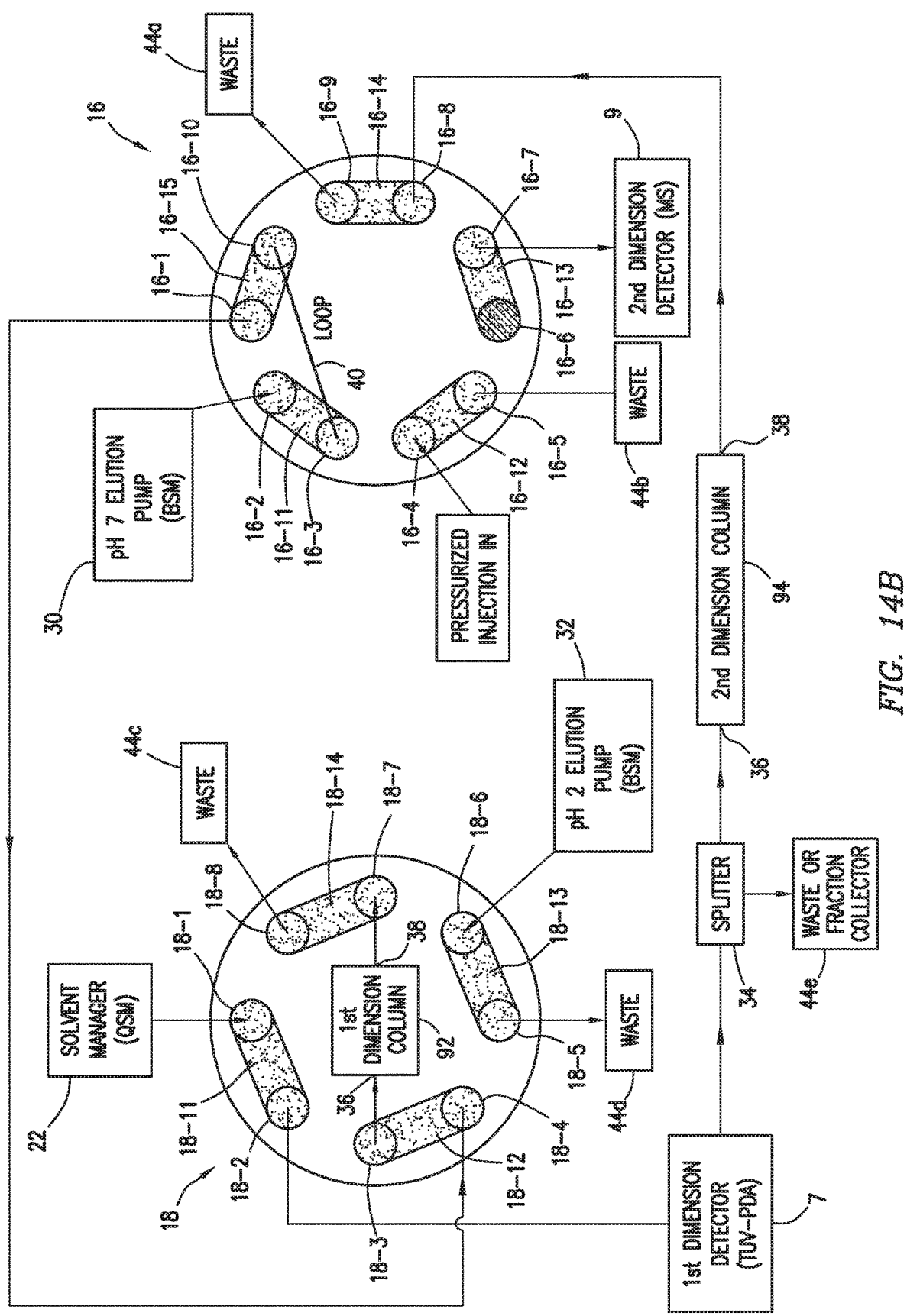
FIG. 14B shows the eight port selector valve in the first position and the 10 port sample valve in the second position for loading sample onto the first dimension column.
Figure 14C:
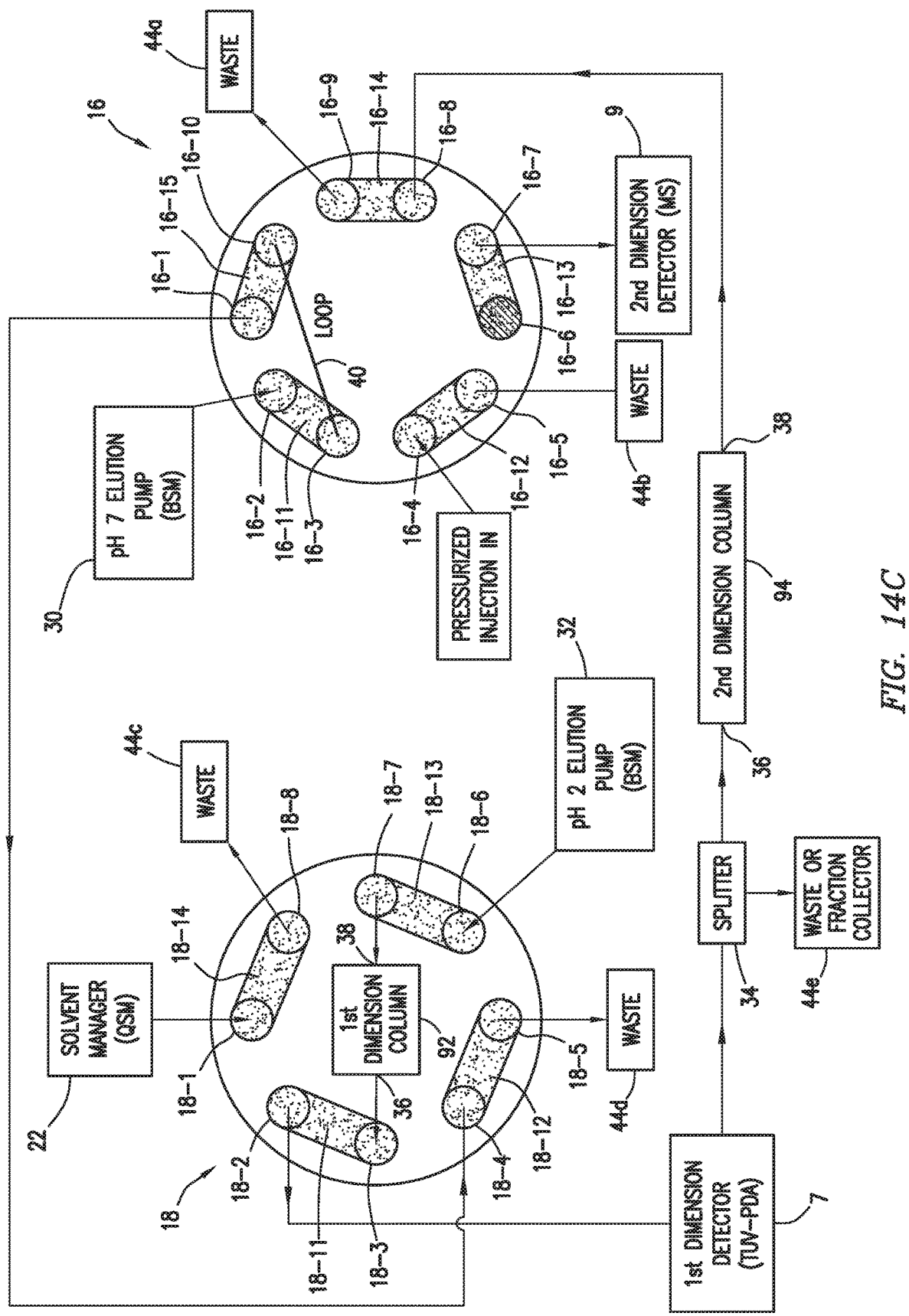
FIG. 14C shows the eight port selector valve in the second position and the 10 port sample valve in the second position for detecting sample in the first sample detector and sample trapped in the second dimension column.
Figure 14D:
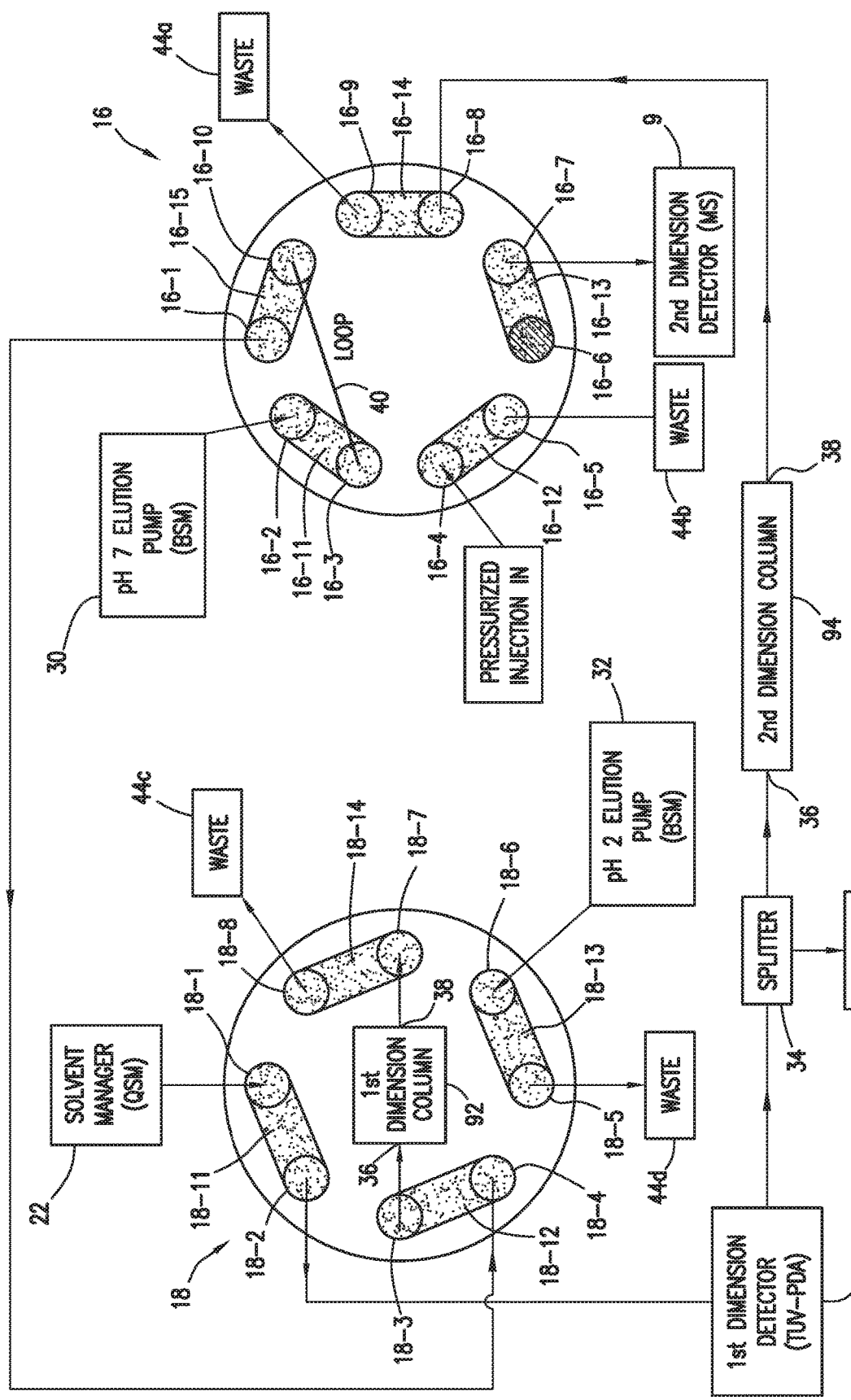
FIG. 14D shows the eight port selector valve in the first position and the 10 port sample valve in the second position for re-equilibrating the first dimension column so that it is prepared for the next injection.
Figure 14E:
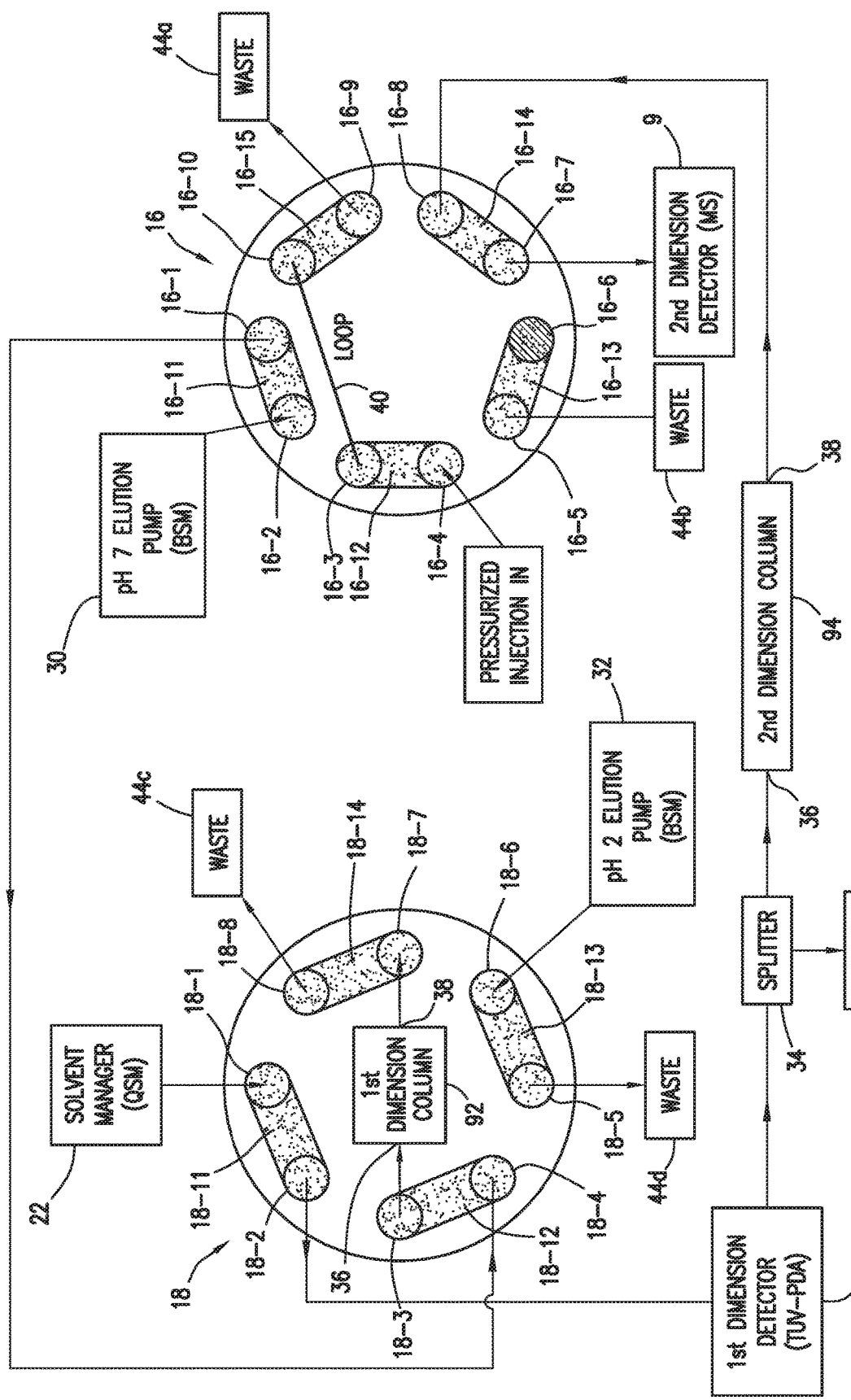
FIG. 14E shows the eight port selector valve in the first position and the 10 port sample valve in the first position for pumping eluting sample from the second dimension column with detection in the second dimension detector.

As shown in FIGS. 14B, 14C and 14D, in a second position of the sample valve 16, flow-through conduit 16-11 connects fluidic port 16-2 to fluidic port 16-3 providing a fluidic pathway between the high pH elution pump 30 through the sample loop 40 into fluidic port 16-10 through flow-through conduit 16-15 out fluidic port 16-1 to fluidic port 18-4 of the selector valve 18 through flow-through conduit 18-12 out fluidic port 18-3 and into the inlet end 36 of the first dimensional column 92. In addition, flow-through conduit 16-12 connects fluidic port 16-4 to fluidic port 16-5 providing a fluidic pathway for sample to waste or the reservoir 44*b*. In addition, in the second position of the sample valve 16, flow-through conduit 16-14 connects fluidic port 16-8 to fluidic port 16-9 providing a fluidic pathway between the outlet end of the second dimension column 94 to waste or the reservoir 44*a*.

As shown in FIGS. 14A through 14E, the selector valve 18 has eight fluidic ports 18-1, 18-2, 18-3, 18-4, 18-5, 18-6, 18-7 and 18-8 and four flow-through conduits 18-11, 18-12, 18-13 and 18-14. Fluidic port 18-1 is connected to the solvent manager 4. Fluidic port 18-2 is connected to the first dimension detector 7. Fluidic port 18-3 is connected to the inlet end 36 of the first dimension column 92. Fluidic port 18-7 is connected to the outlet end 38 of the first dimension column 92. Fluidic port 18-4 is connected to fluidic port 16-1 of the sample valve 16. Fluidic port 18-5 is connected to waste or a reservoir 44*d*. Fluidic port 18-6 is connected to the low pH elution pump 32. Fluidic port 18-8 is connected to waste or a reservoir 44*c*. Each of the connections described in this paragraph is with tubing.

The selector valve 18 has two positions: the first position and the second position. As shown in FIGS. 14A, 14B, 14D and 14E, in the first position of the selector valve 18, flow-through conduit 18-11 connects fluidic port 18-1 to fluidic port 18-2 providing a fluidic pathway between the solvent manager 4 and the first dimension detector 7. Flow-through conduit 18-12 connects fluidic port 18-3 to fluidic port 18-4 providing a fluidic pathway between fluidic port 16-1 of the sample valve 16 through the first dimension column 14 into fluidic port 18-7 through flow-through conduit 18-14 and out fluidic port 18-8 to waste or the reservoir 44*c*. Flow-through conduit 18-13 connects fluidic port 18-5 to fluidic port 18-6 providing a fluidic pathway between the low pH elution pump 32 to waste or the reservoir 44*d*. As noted above, tubing connects the inlet end 36 of the second dimension column 36 to the splitter 34. Tubing connects the splitter 34 to the first dimension detector 7 and to waste or reservoir 44*e*.

As shown in FIG. 14C, in the second position of the selector valve 18, flow-through conduit 18-11 connects fluidic port 18-2 to fluidic port 18-3 providing a fluidic pathway between the first dimension column 92 and the first dimension detector 7. Flow-through conduit 18-12 connects fluidic port 18-4 to fluidic port 18-5 providing a fluidic pathway from the fluidic port 16-1 of the sample valve 16 to waste or the reservoir 44*d*. Further, flow-through conduit 18-13 connects fluidic port 18-6 to fluidic port 18-7 providing a fluidic pathway from the low pH elution pump 32 to the first dimension column 92. Flow-through conduit 18-14 connects fluidic port 18-8 to fluidic port 18-1 providing a fluidic pathway from the solvent manager 4 to waste or the reservoir 44*c*.

Sample Loading/Injection

FIG. 14A shows the LC instrument 2 having the sample valve 16 in the first position and the selection valve 18 in the first position for sample loading. Here, the sample loop 40 is loaded with sample to be analyzed with excess sample flowing to waste. Specifically, sample is introduced using the pressurized source of sample introduction 52 into fluidic port 16-4, providing a fluidic pathway through flow-through conduit 16-12 and out fluidic port 16-3 into the sample loop 40 to fluidic port 16-10 through flow-through conduit 16-15 and out fluidic port 16-9 to waste or the reservoir 44*a*. The high pH elution pump 30 established flow through the first dimension column 92 to waste or the reservoir 44*c*. The solvent manager 4 establishes weak chromatographic solvent strength flow to the first dimension detector 7 and the second dimension detector 9 and to equilibrate the second dimension column 94.

Sample Loading onto Column

FIG. 14B shows the sample valve 16 moved to the second position and the selection valve 18 remaining in the first position to introduce the sample into the first column 92. Here, the sample valve 16 moves by one port position into the second position such that flow-through conduit 16-11 connects fluidic port 16-2 to fluidic port 16-3 establishing a fluidic pathway from the low pH elution pump 30 to the sample loop 40 through to the first dimension column 92 to waste. The solvent manager 4 continues to provide weak chromatographic solvent strength flow to the first dimension detector 7 and the second dimension detector 9 and to equilibrate the second dimension column 94.

Sample Separation and Detection

FIG. 14C shows the sample valve 16 remaining in the second position and the selection valve 18 moved to the second position to elute the sample from the first dimension column and to detect sample on the first dimension detector 7 and to trap sample on the second dimension column 94. In the second position of the selector valve 18, flow-through conduit 18-11 provides a fluidic pathway between the first dimension column 92 and the first dimension detector 7. A fluidic pathway established from the high pH elution pump 30 is diverted to waste through the selector valve 18, or reservoir 44*d*. The low pH elution pump 32 establishes a fluidic pathway through the selector valve 18, back flushing sample off the first dimension column 92 and detected in the first dimension detector 7. After, the first dimension detector 7, fluid flow is split at the splitter 34 with a portion of the sample trapped on the second dimension column 94 and the remainder of the sample going to waste or fraction collection at reservoir 44*e*. Flow through the second dimension column 94 continues to the sample valve 16 and to waste or the reservoir 44*a*.

Equilibration of the First Dimension Column

FIG. 14D shows the sample valve 16 remaining in the second position and the selection valve 18 moved to the first position. The solvent manager 4 pumps weak chromatographic solvent flushing low pH buffer from solvent lines and the second dimensional column 94 establishing a fluidic pathway through the sample valve 16 to waste, or reservoir 44*a*. Flow from the low pH elution pump 32 is diverted to waste or the reservoir 44*d*. The high pH elution pump 30 establishes a fluidic pathway through the sample valve 16 to re-equilibrate the first dimension column 92 so that it is prepared for the next injection.

Sample Detection by the Second Dimension Detector

FIG. 14E shows the sample valve 16 moved to the first position and the selection valve 18 remaining in the first position. The solvent manager 4 pumps strong chromatographic solvent to elute the sample from the second dimension column 94 for detection in the second dimension detector 9. The first buffer pump 30 continues to re-equilibrate the first dimension column 92 so that it is prepared for the next injection. The sample loop 40 is prepared to accept the next sample injection via the pressurized source of sample introduction 52.

On-Line Process Analysis Using Ultra Performance Convergence Chromatography (UPC2®)

Flow or batch chemical synthesis requires the analysis of the product to determine its quality either by chromatographic or spectroscopic techniques. In earlier prior art methods, samples were withdrawn from the chemical reactor and sent to the analytical QC lab for testing. This required the process development or manufacturing facilities to be maintained in an idle state waiting for results. Current trends include analysis that take place within the domain of the process development or manufacturing areas. Analysis can use an in-line spectroscopic or an on-line chromatographic analysis. This improves efficiency and the quality of the product. In addition, the chemical synthesis can be conducted in strong organic solvents, such as toluene, tetrahydrofuran and N-methylpyrrolidone (as examples) and/or the compounds synthesized are chiral.

Therefore, to analyze chiral compounds, an UltraPerformance Convergence Chromatography System without sample manager is described herein. The UltraPerformance Convergence Chromatographic (UPC2®) system allows sample to be introduced into the chromatographic stream directly from a process stream. Therefore, the chromatography system 2 utilizing a UPC2® system that does not require a vial based sample manager because the sample is directly introduced into the chromatographic stream with a valve controlled by the column manager.

EXAMPLE I

An Isocratic Application Using External Sample Introduction Injection

In this isocratic example, chromatographic eluent was pre-blended with a Quaternary Solvent Management ("QSM") and delivered to the chromatographic column at a flow rate of 0.6 mL/minute. (FIG. 15A). As shown in FIGS. 15B1 and 15B2, the photodiode array detector ("PDA") was programmed to collect a single channel of data at 273 nm which is the ultra-violet maximum absorbance for the compound of interest, caffeine. Sample solution of caffeine at a concentration of 50 µg/mL was dissolved in a mixture of water and acetonitrile (ratio of 90/10) was analyzed.

Specifically, the chromatographic conditions were as follows:
Chromatographic column:
Waters ACQUITY UPLC® BEH C18 1.7 µm (2.1 mm ID×50 mm) part number
186002350
Column Temperature: 40° C.
Chromatographic Eluent Flow Rate: 0.6 mL/minute
Chromatographic Eluent Composition:
  Eluent A (water): 80%
  Eluent B (acetonitrile): 15%
  Eluent C (methanol): 0%
  Eluent D (water with 2.0% formic acid): 5%
Injection Volume: 1 µL Sample was introduced with the pressurized source of sample introduction 52, into the sample loop (1 µL). The sample loop was attached to the sample valve housed inside the column manager ("CM"). As shown in FIGS. 15D1, 15D2 and 15E, the external device, functioning in the Ready Loop mode, was programmed via use of the events table as follows: at 0.1 minute TTL1 event pulses for the duration of 0.02 seconds; at 0.2 minutes TTL2 event turns on; and at 0.25 minutes TTL2 event turns off. The programming of the external device in this manner allows for the starting of the chromatographic system through the QSM when the chromatographic data system sends out a "get ready" signal that is received by the external device 10. As shown in the FIGS. 15C1 and 15C2, the column manager was programmed to have the sample valve turn from position 1 (the first position) to position 2 (the second position) at 0.01 minutes after the initiation of the chromatographic run to introduce the sample onto the column. As also shown in FIG. 15C2, the column manager was then programmed to return to position 1 (the first position) at 1.0 minutes to permit the loading of the sample for replicate injections.

Figure 15D1:
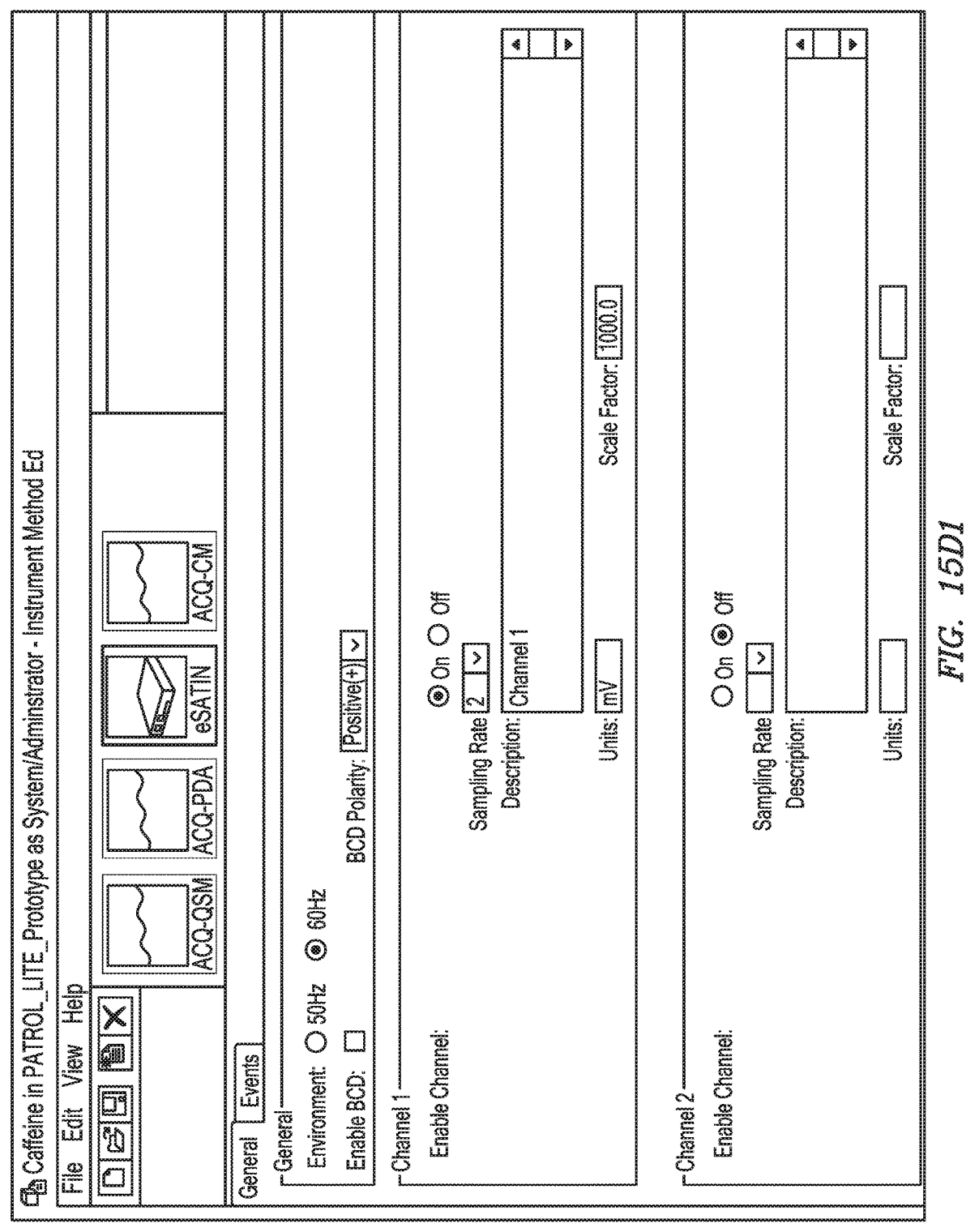
Figure 15E:
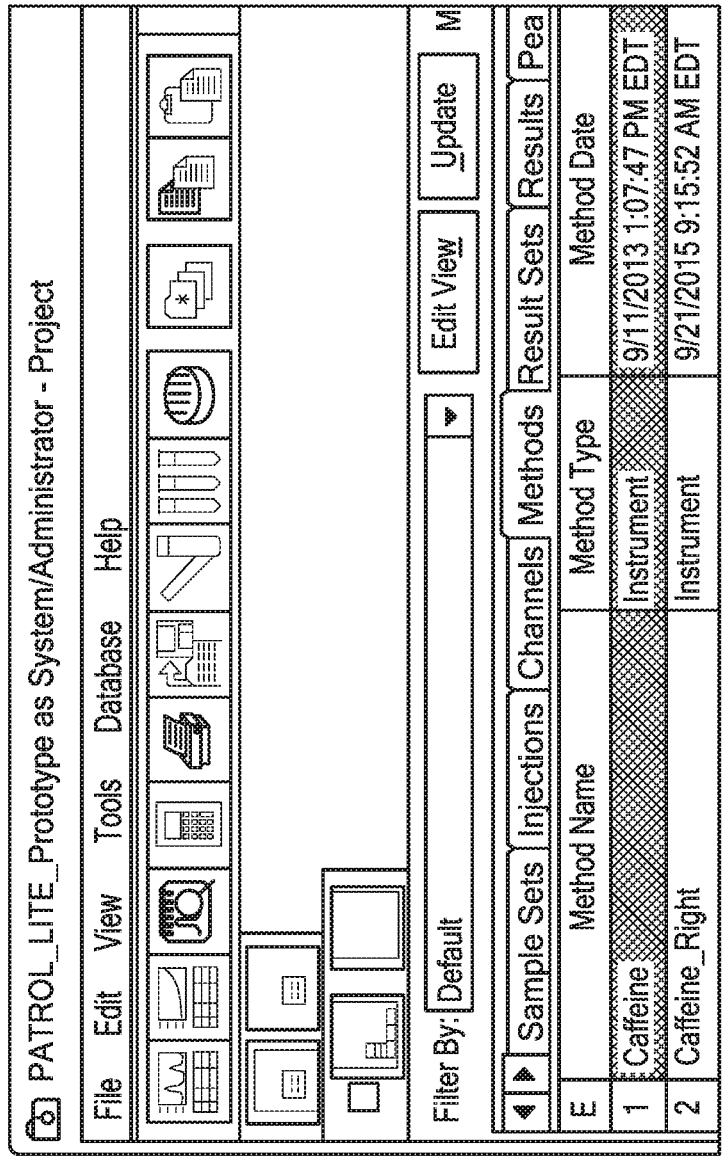
Figure 15F:
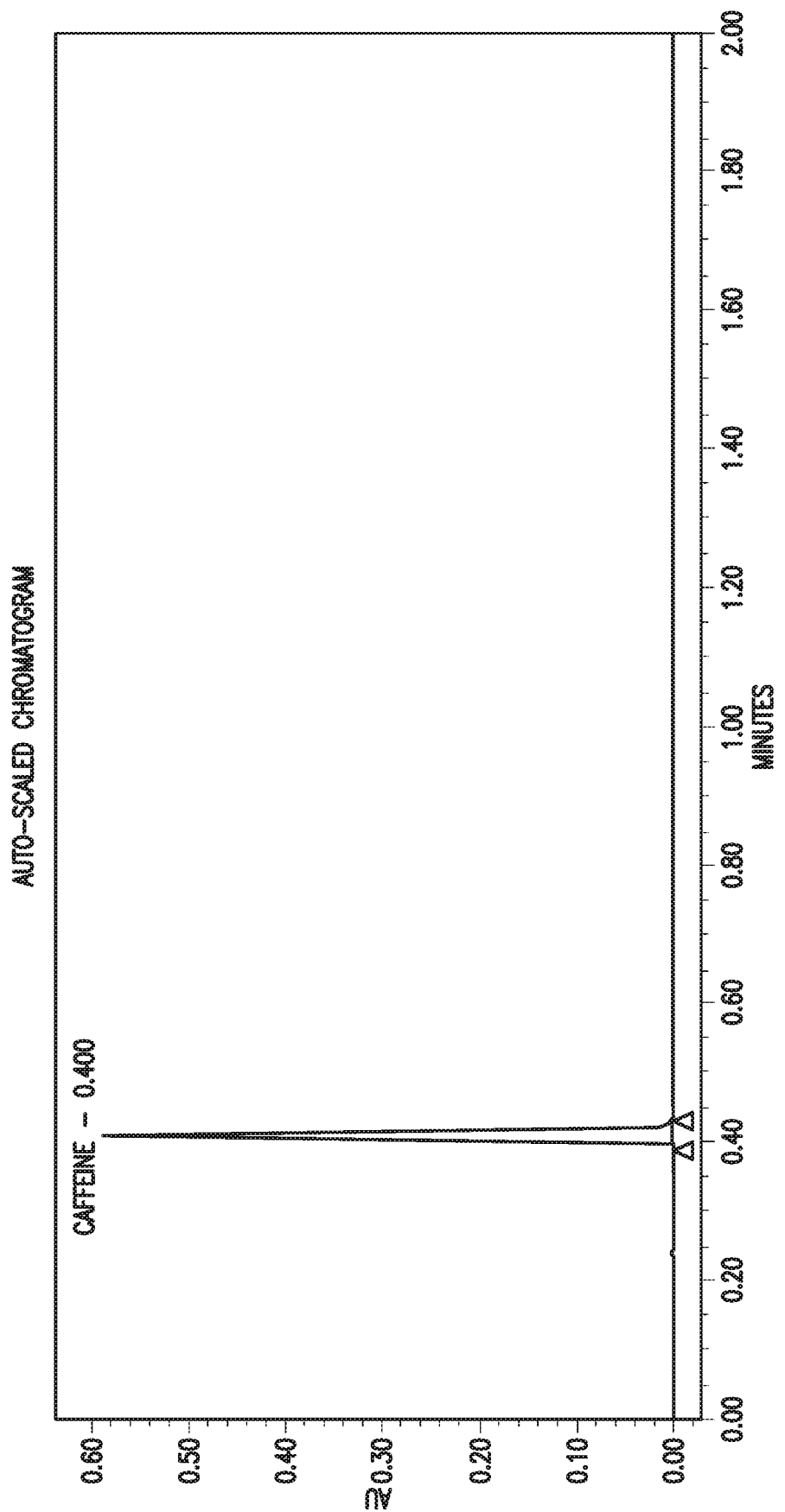
FIG. 15F is an auto-scaled chromatogram produced in Example I.

FIGS. 15A, 15B1, 15B2, 15C1, 15C2, 15D1, 15D2 and 15E show chromatographic data software user menus for the Caffeine Instrument Method of Example I. FIG. 15A shows the menu for the quaternary solvent manager and the chromatographic eluent composition of Example I. FIGS. 15B1 and 15B2 show the menus for the photodiode array ("PDA") detector and the sample rate, range and resolution. FIGS. 15C1 and 15C2 depict the menus associated with programming the column manager as described in Example I. FIGS. 15D1 and 15D2 show menus used to program the e-SAT/In Module in Example I. FIG. 15E is a menu for the caffeine instrument method as used to collect the data in Example I. FIG. 15F is an auto-scaled chromatogram produced in Example I. FIG. 15G shows a peak results table for Example I. FIG. 15H shows a table of raw date and time stamped data from which the peak results table for Example I is generated.

EXAMPLE II

Chromatographic Gradient Method for Blended Eluents

Figure 8:
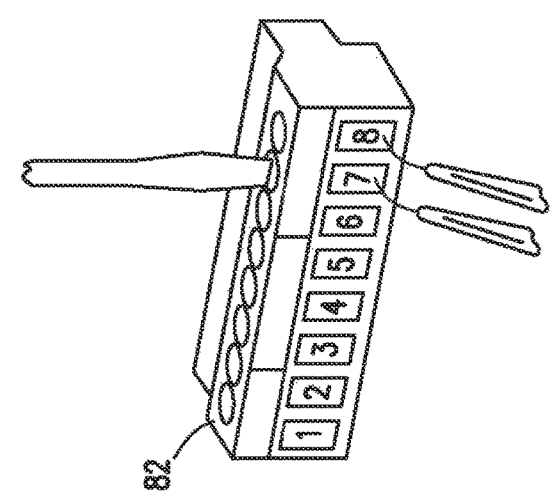
FIG. 8 depicts a binary code connector and replacement of the same in the external device.
Figure 8:
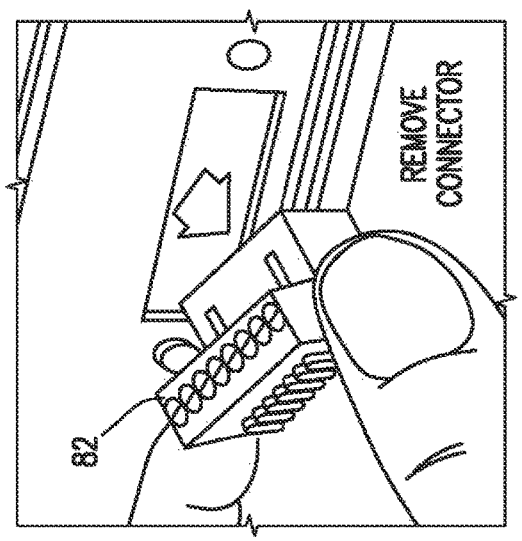
Figure 9:
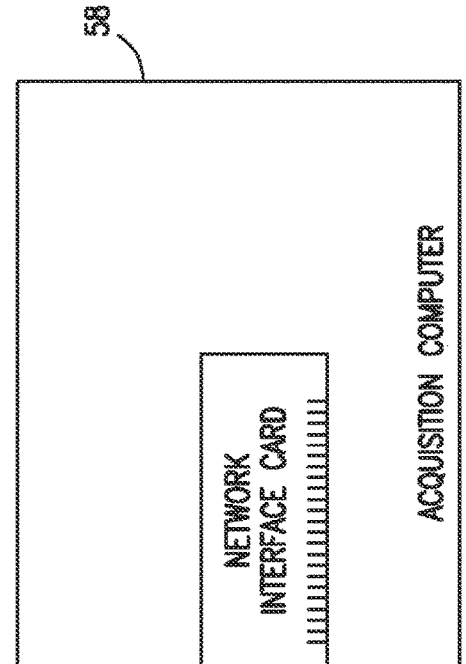
FIG. 9 shows the external device in communication with a chromatographic data system via a single Ethernet connection.
Figure 9:
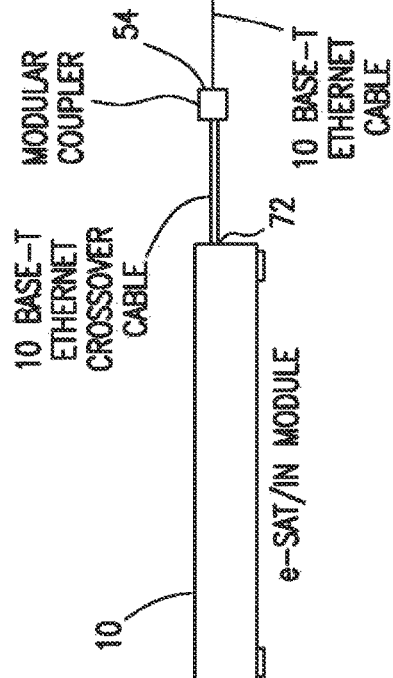
Figure 16A:
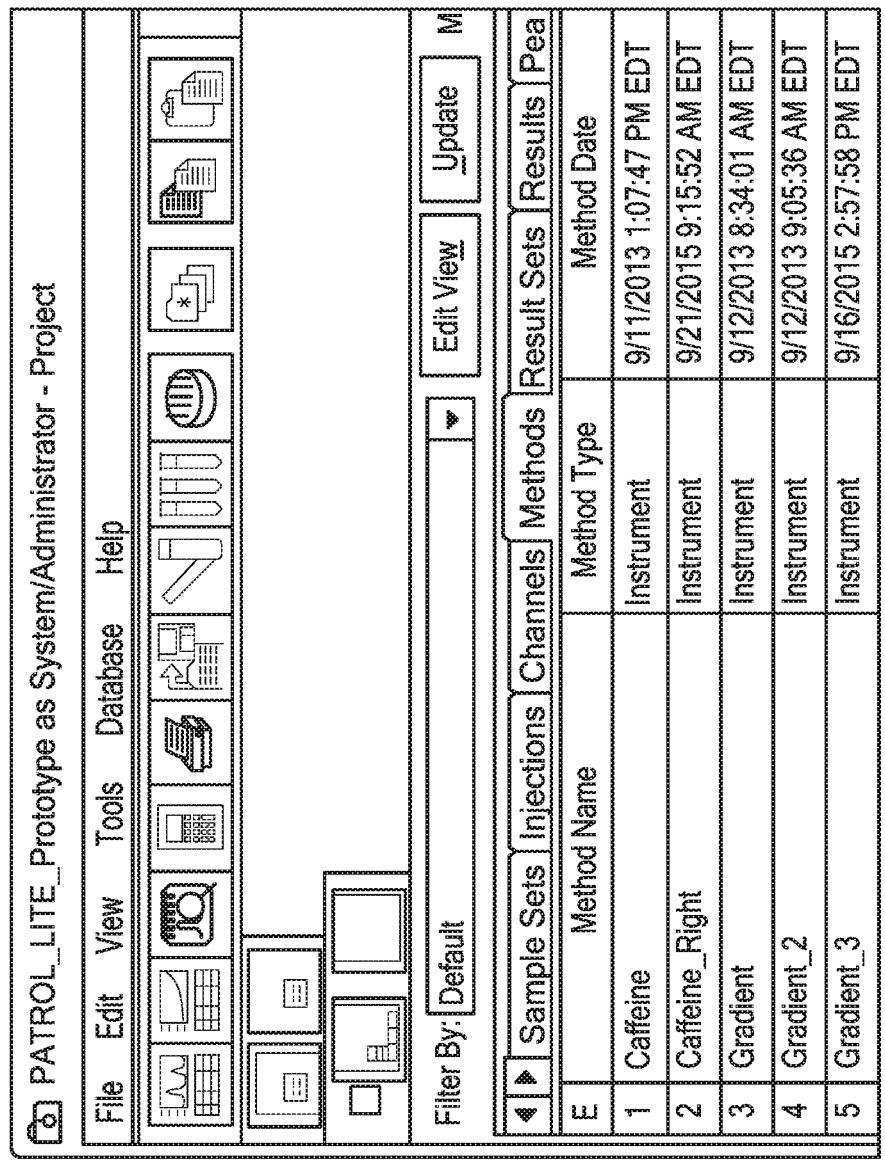
FIG. 16A is the chromatographic data software menu for the Gradient 2 Instrument Method used to collect the data of Example II.
Figures 16F, 16G:
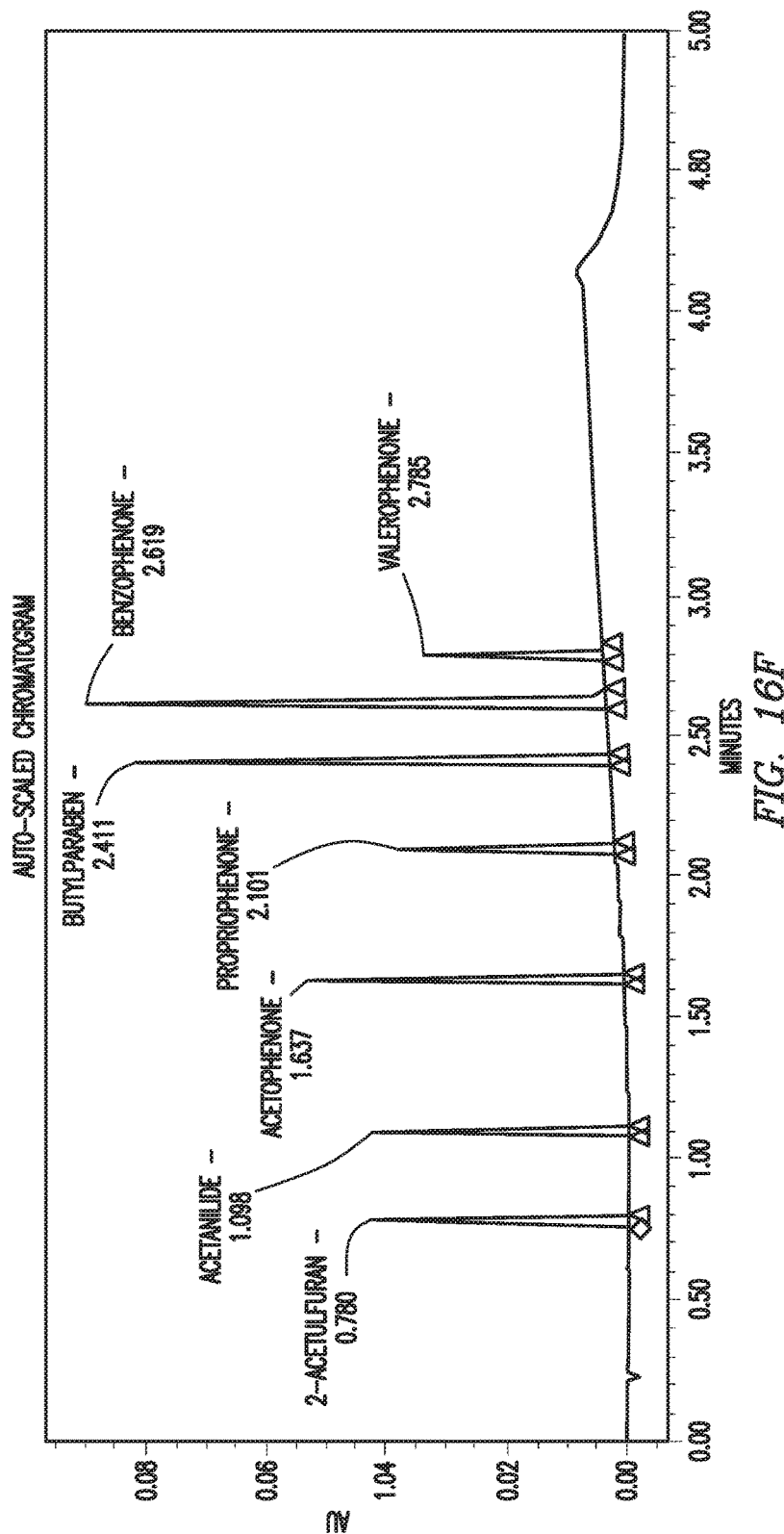
FIG. 16F shows chromatographic gradient of Example II was generated with blended eluents.
FIG. 16G provides raw data files for four (4) injections where injection one has been discarded.

As noted herein, FIG. 16A shows the chromatographic data software menu for the Gradient 2 Instrument Method used to collect the data of Example II. FIGS. 16B1 and 16B2 show the chromatographic data software menu to program the quaternary solvent manager ("QSM"). FIGS. 16C1 and 16C2 show the chromatographic data software menu to program the photodiode array detector ("PDA"). FIGS. 16D1 and 16D2 show the chromatographic data software to program the column manager. FIGS. 16E1 and 16E2 show the chromatographic data software menus used to program the e-SAT/IN module of Example II. FIG. 16F shows an chromatogram obtained from Example II that was generated with blended eluents. FIG. 16G provides raw data files for four (4) injections where injection one has been discarded. FIGS. 16H1, 16H2, 16H3, 16H4, 16H5, 16H6 and 16H7 show the combined results for each peak detected in Example II. FIGS. 16H8 shows a table of raw data and time stamped data from which the peak results table for Example II is generated.

In this example, the Gradient_2 Instrument Method is used to collect data. (FIG. 16A). As shown in FIG. 16F, chromatographic gradient is generated with blended eluents with the use of the Quaternary Solvent Manager 4 ("QSM") and delivered to the chromatographic column at a flow rate of 0.6 mL/minute (FIGS. 16B1 and 16B2 show the menus). The photodiode array detector ("PDA") is programmed to collect at a single channel of data at 254 nm (FIGS. 16C1 and 16C2). The sample is introduced with the pressurized source of sample introduction 52 into the sample loop (1 µL) which is attached to the injection valve housed inside the column manager ("CM").

As shown in FIGS. 16E1 and 16E2, the e-SAT/IN module, functioning in the Ready Loop mode, is programmed in its events table as follows: at 0.1 minute TTL1 event pulses for a duration of 0.02 seconds, at 0.15 minutes TTL2 event turns on and at 0.20 minutes TTL2 event turns off. The programming of the e-SAT/IN module in this manner allows for the starting of the chromatographic system through the QSM when the chromatographic data system sends out a "get ready" signal that is received by the e-SAT/In module. As shown by the menu of FIG. 16D2, the column manager 6 is programmed to have the injection valve turn from the first position (position 1) to a second position (position 2) at 0.01 minutes after the initiation of the chromatographic run to introduce the sample onto the column. The column manager is then programmed to return to position 1 at 3.52 minutes to permit the loading of the sample for replicate injections. (FIG. 16D2). The peak results for each compound are shown in the tables of FIGS. 16H1, 16H2, 16H3, 16H4, 16H5, 16H6 and 16H7.

EXAMPLE III

Two Dimensional Liquid Chromatography

Figure 17D:
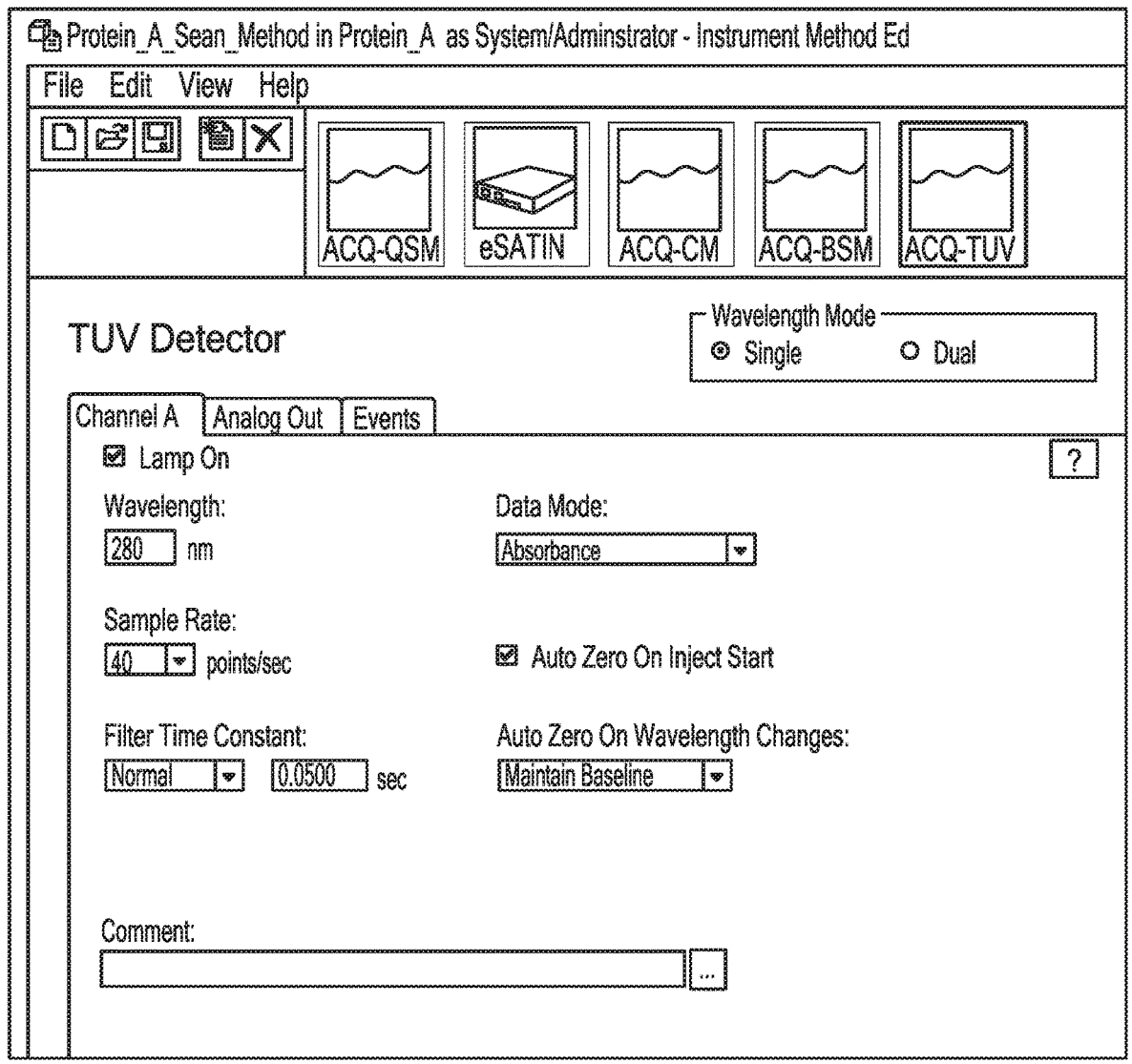
Figure 17G:
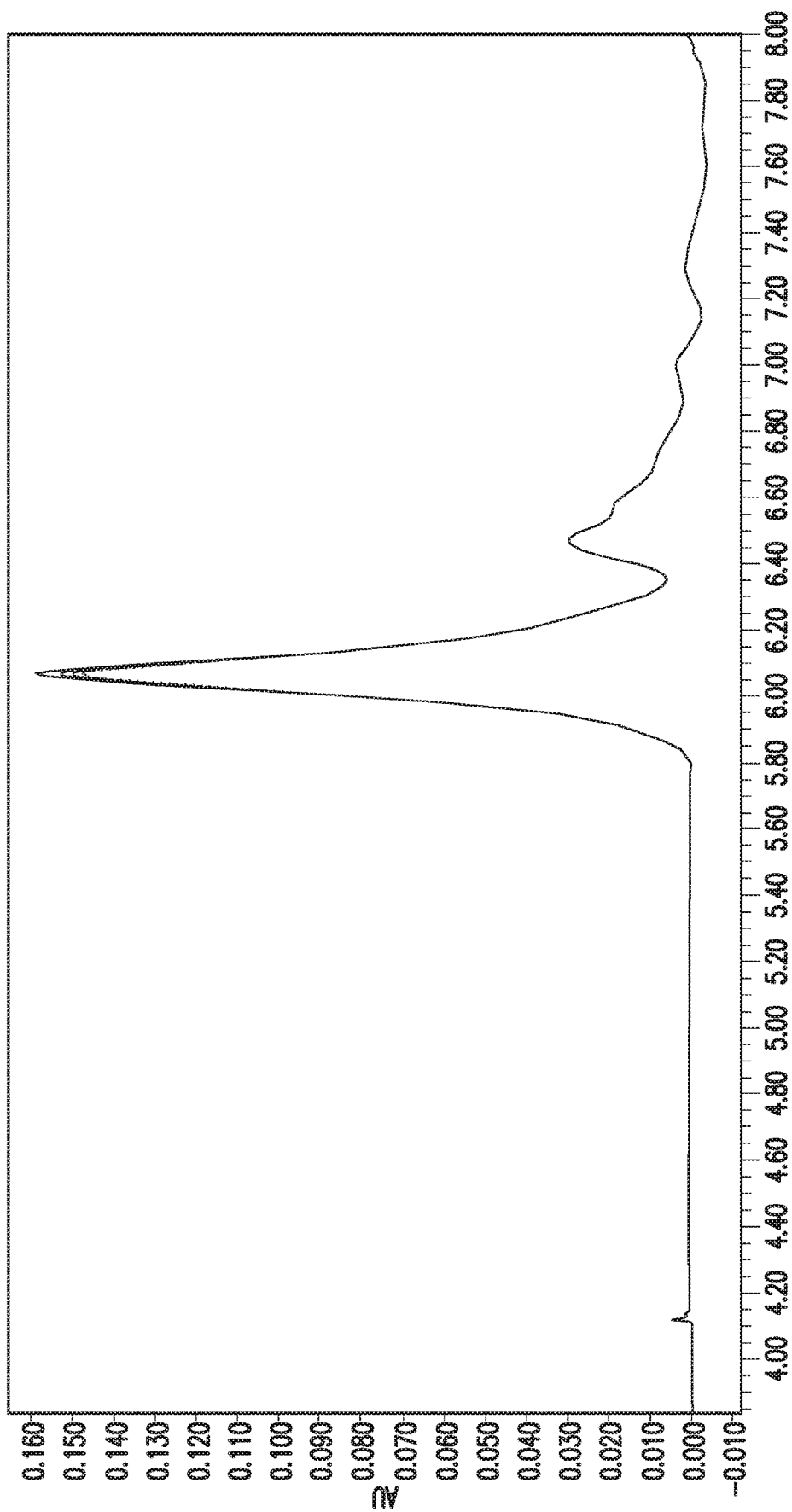
FIG. 17G is an auto-scaled chromatogram produced in Example III.

As discussed above, FIGS. 17A1, 17A2, 17B1, 17B2, 17C1, 17C2, 17D, 17E1, and 17E2 show the different menus of the chromatographic data software used to program the various instruments and that makes up the chromatographic data system of Example III. FIG. 17F depicts the raw data. FIG. 17G is an auto-scaled chromatogram produced in Example III.

We used a two-dimensional technology having the ability for simultaneous purification and MS analysis in a high throughput manner. Specifically, we used a two-dimensional chromatography system to purify and separate certain antibodies contained in a sample. The sample was simultaneously purified and quantified using Protein A affinity chromatography. The mass profile was determined by MS analysis after desalting on a short reverse phase ("RP") column. This 2 dimensional ("2D") UPLC® method required little to no sample preparation and analysis can be quickly completed with an instrument duty cycle time of about seven minutes.

In this example, the chromatography system included a one dimensional UPLC® quaternary solvent manager, an UPLC® column manager, an UPLC® tunable UV Detector, an UPLC® binary solvent manager and the e-SAT/IN Module. FIGS. 17A1 and 17A2 show the menus of the chromatography data software used to program the quaternary solvent manager in the two dimensional liquid chromatography system. FIGS. 17B1 and 17B2 show the menus used to program the column manager. FIGS. 17C1 and 17C2 show the menus used to program the binary solvent manager. FIG. 17D show the menus used to program the tunable UV-Vis ("TUV") detector. FIGS. 17E1 and 17E2 show the menus to program the e-SAT/In module. FIG. 17F is a table containing raw data related to this example. FIG. 17G is an auto-scaled chromatogram produced in Example III.

This two dimensional liquid chromatography system can accept an external sample from any pressurized source or process. Samples are not limited in volume because the loop installed can be constructed to handle any desired volume. The UPLC® binary solvent manager ("BSM") flow path is altered so that the BSM can deliver mobile phases independent (either mobile phase A or B) to a unique valve position without mixing of mobile phase A or B and without a time delay for a 100% mobile phase A or B delivery.

EXAMPLE IV

Two Dimensional Application of Antibody Detection

In this example, the liquid chromatography system was setup for initial conditions using a chromatographic data system ("CDS") for data acquisition with chromatographic data software. The 8-port two position valve 18 and the 10-port two position valve 16 were in position one (an initial position) using the programmed events of the UPLC® Column Manager Instrument Method. A flow rate of 0.2 mL/minute was established to equilibrate the second dimension column 94, a MassPrep™ Micro Desalting Column, and to establish flow to the first and second dimension detectors with an initial gradient mobile phase consisting of water/water with 2% formic acid (mobile phase A/mobile phase D, 95/5) using the Quaternary Solvent Manager ("QSM"). In this specific case, the second dimension detector was a TUV detector programmed at a detection wavelength of 280 nm.

The MassPrep Micro Desalting Column contains polymer-based, reversed phase packing material that can be used to effectively desalt protein samples prior to mass spectrometry. The phenyl packing phase material contained in these columns successfully retains proteins allowing the salts to be washed to waste prior to elution of the desalted protein into the mass spectrometer. With an optimized LC/MS method, cycle times as low as four minutes are achievable.

As described herein, the flow splitter 34 can be plumbed into the flow path after the first dimension detector diverting some of the sample to either waste or a fraction collector while the remainder of the sample is loaded onto the second dimension column. This allows for a smaller amount of sample to be eluted from the second dimension column to the second dimension detector (such as a mass spectrometer) without exceeding the detection limits of the detector. However, in this example the flow splitter was not installed so that all of the sample would be loaded onto the second dimension column to allow for detection with the less sensitive TUV detection. Reconstituted monoclonal antibody sample (infliximab at a concentration of 10 mg/mL) was loaded via the pressurized source of sample introduction 52 into the sample loop with excess sample being diverted to waste.

A chromatographic run was initiated using the CDS with the e-SAT/IN module initiating the signal to the QSM to start and the QSM to broadcast to the remainder of the system components to start. At time 0.01 minutes, column manager programmed events moved the 10-port valve to position 2 as described herein. At time 0.02 minutes a flow rate of 1 mL/minute is established to the first dimension column, POROS® CaptureSelect® IgA Affinity Column with mobile phase B (pH 7 buffer) using the BSM pump with flow going to waste. CaptureSelect® IgA Affinity Column is a pre-packed, affinity column that enables the purification of antibodies, antibody fragments and profiles with affinity solutions. The sample was then moved from the loop onto the first dimension column using a pH 7 buffer where the monoclonal antibody is retained (captured) with the remainder of the sample components flowing to waste. The initial flow and mobile phase conditions continue with the QSM to the second dimension column and detector(s). Having a mobile phase composition of A/mobile phase B at 50/50, the delivery of the mobile phases to each respective valve port ran at a flow rate of about 1 mL/minute.

At time 2.30 minutes, the flow rate of the BSM was increased to 2 ml/minute with a composition of mobile phase A/mobile phase B at 50/50. This resulted in a delivery of both mobile phases to their respective and independent valve ports at a flow rate of 1 mL/minute. At time 2.40 minutes, column manager programmed events moved the 8-port valve to position 2 while the 10-port valve remains in position 2. The movement of the 8-port valve to position 2 diverts the flow from the QSM to waste and the flow of the BSM mobile phase pH 7 buffer to waste. Furthermore, flow of the BSM mobile phase pH 2 buffer to the first dimension column was initiated. Trapped monoclonal antibody was eluted off the first dimension column with the pH 2 buffer with a change in flow direction. The flow from the first dimension column can be directed into the first dimension detector; however, in this example a first dimension detector is not used. Furthermore, flow out of the first dimension detector may be directed to a flow splitter (if the splitter is installed) or the flow may be directed entirely onto the second dimension column. However, in this example no flow splitter is installed. The flow of the mobile phase pH 2 buffer into the second dimension column resulted in the trapping of the monoclonal antibody with the remainder of the flow continuing to the 10-port valve and out to waste. At the programmed time of 2.50 minutes, the flow rate of the BSM was decreased to 1 ml/minute with a composition of mobile phase A/mobile phase B at 100/0. At the programmed time of 3.00 minutes, the flow rate of the BSM was decreased to 0 ml/minute.

At time 3.10 minutes, column manager programmed events moved the 8-port valve to position 1 while the 10-port valve remains in position 2. The position change of the 8-port valve re-directed the QSM flow at 0.2 mL/minute to the second dimension column with an initial gradient mobile phase consisting of water/water with 2% formic acid to purge the solvent lines and wash off all remaining pH 2 buffer components to waste. At time 3.20 minutes, a flow rate of 1 mL/minute was established to re-equilibrate the first dimension column with mobile phase B (pH 7 buffer) with the BSM pump with the flow going to waste in preparation for the next injection.

Figure 18A:
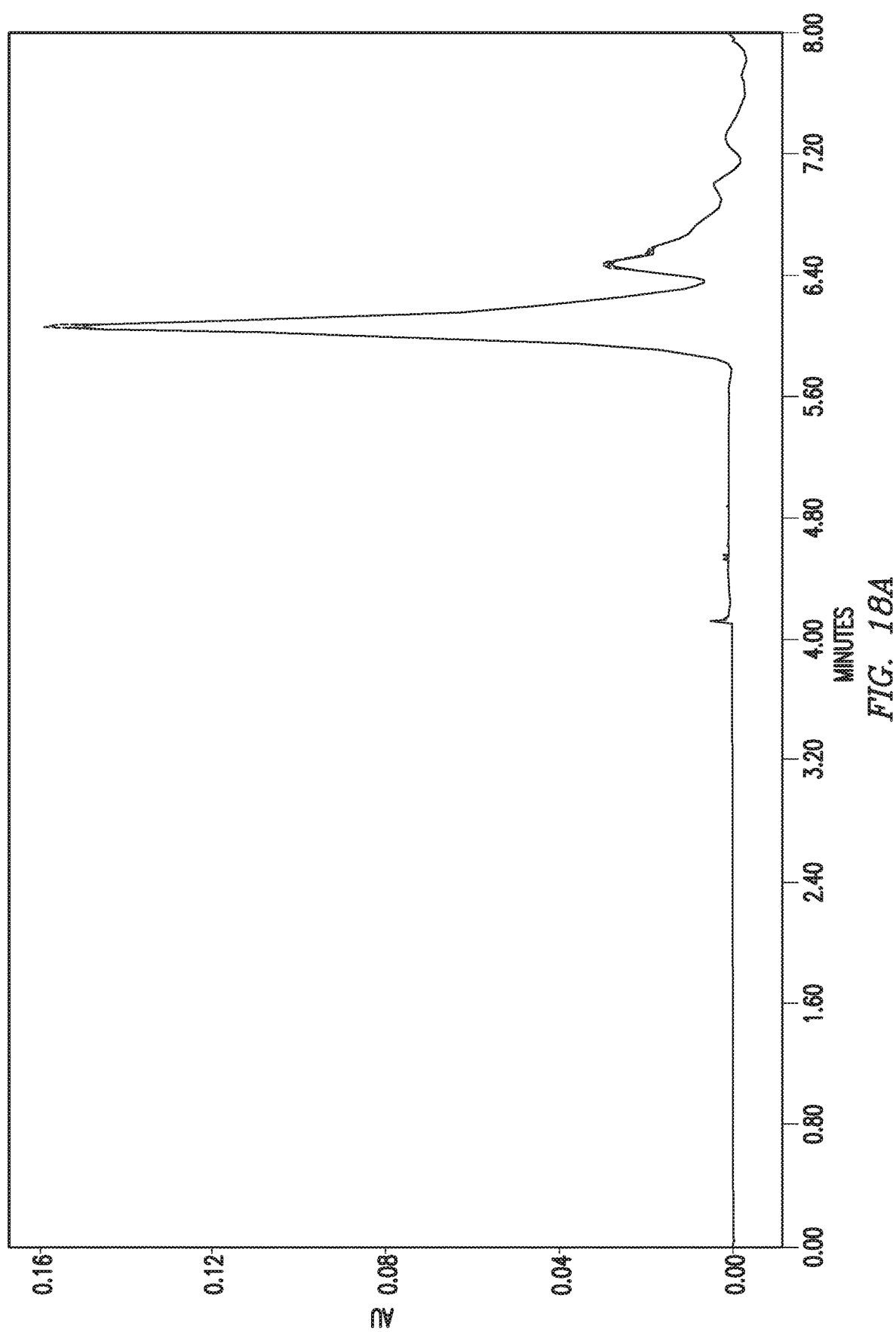
FIGS. 18A and 18B are chromatograms of four replicate injections from 0 to 8 minutes and 4 to 8 minutes, respectively as described in Example IV.
Figure 18B:
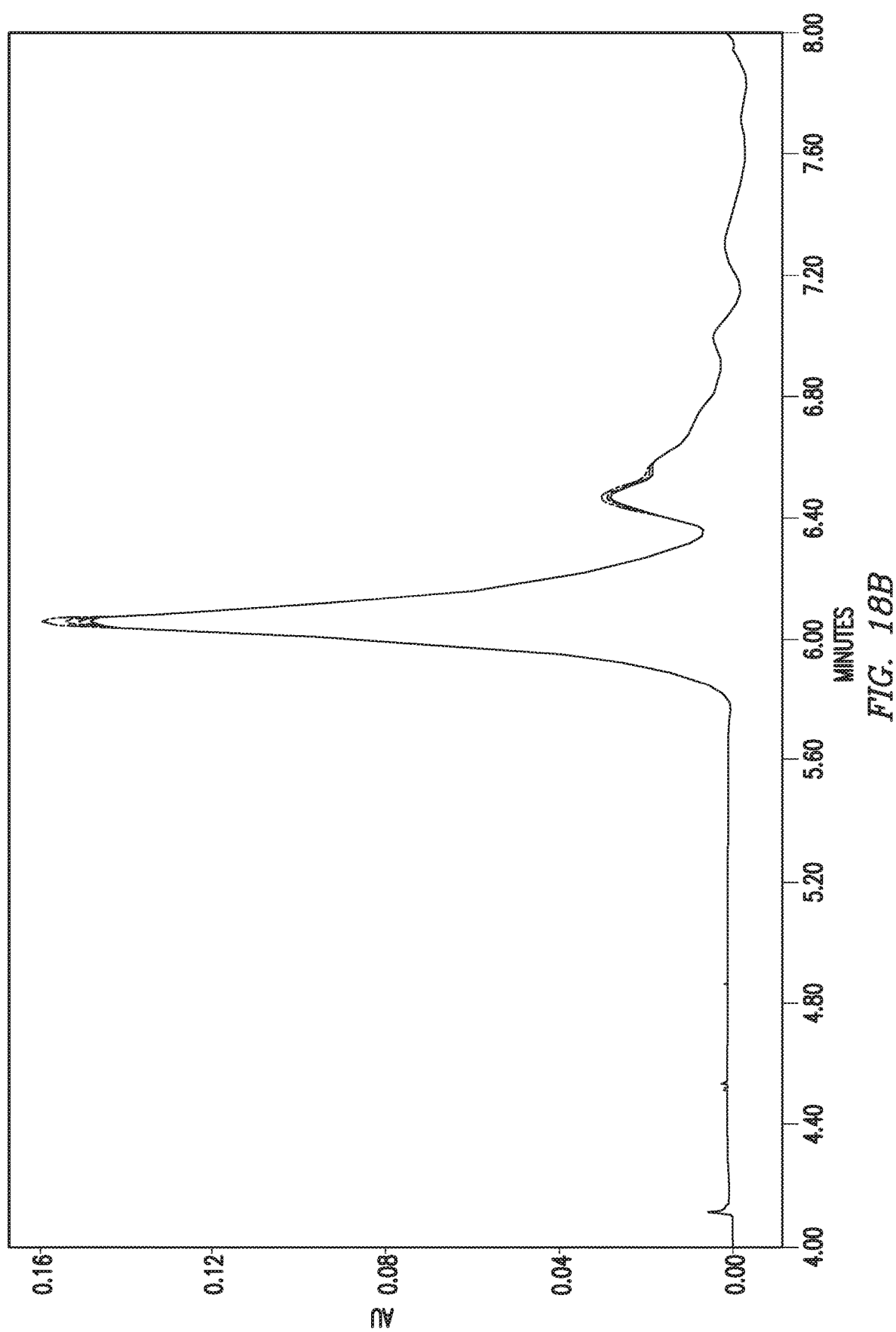

At time 4.10 minutes, column manager programmed events moved the 10-port valve to position 1 bringing the second dimension detector on line with the second dimension column. At time 4.20 minutes, a 1.5 minute linear gradient was initiated resulting in a change from the initial gradient conditions of water/water with 2% formic acid (95/5) to the final gradient conditions of acetonitrile/water with 2% formic acid (95/5) resulting in the elution of the monoclonal antibody from the second dimension column into the second dimension detector. FIGS. 18A and 18B show the results for four replicate injections with detection at 280 nm with the UPLC® Tunable UV-VIS detector. At time 5.80 minutes, the QSM mobile phase was changed to the initial gradient conditions to re-equilibrate the second dimension column in preparation for the next injection. Sample loop in back in-line to accept the next sample.

FIGS. 18A and 18B are chromatograms of four replicate injections from 0 to 8 minutes and 4 to 8 minutes, respectively as described in Example IV.

We claim:

1. A method of chromatographic detection comprising the steps of:
providing a liquid chromatography system comprising a chromatographic instrument having a sample valve, a column manager and a solvent manager; a chromatographic data system; an external device; and a pressurized sample injection device, wherein the sample valve is connected to the column manager, the solvent manager is connected to the column manager, and each of the column manager, the solvent manager, the external device and the chromatographic data system are in communication with the other;
injecting sample into the sample valve with the pressurized sample injection device;
transmitting a signal from the chromatographic data system to the external device; receiving the signal by the external device;
producing an event output with the external device, wherein a fluidic pathway between the solvent manager and the column manager is established, and wherein the event output generates a contact closure that activates the sample valve;
discharging solvent from the solvent manager into the sample valve;
and
discharging sample into the column for chromatographic detection.

2. The method of claim 1, further comprising the step of: transmitting an internal signal to the external device to trigger an Inject Start signal to the chromatographic instrument and chromatographic data system.

3. The method of claim 2, wherein the chromatographic instrument is started after an Inject Start signal is received by the solvent manager and the solvent manager signals the column manager to start.

4. The method of claim 1 wherein the sample valve moves from a first position to a second position establishing a fluidic pathway from the solvent manager to the column and sample is discharged from the sample valve to the column.

5. The method of claim 4, further comprising the step of resetting the sample valve to a first position wherein the sample valve is ready to be injected with another sample.

6. The method of claim 1, wherein the chromatographic instrument employs an liquid chromatography process, a high performance liquid chromatography process, an ultra performance convergence chromatography process, or an ultra high performance liquid chromatography process.

7. The method of claim 1, wherein sampling rates, BCD preferences, units and/or scale rates are associated with the external device.

8. The method of claim 1, wherein the chromatographic data system comprises a plurality of sample set methods for acquiring data.

9. The method of claim 1, wherein the chromatographic instrument further comprises a selector valve having a first position and a second position, wherein in the first position, the selector valve establishes a fluidic pathway between the sample valve and the column, and in the second position, the selector valve establishes a fluidic pathway between the column and a detector or a waste reservoir.

10. The method of claim 1, further comprising the step of discharging the sample from the column into a detector.

11. The method of claim 10, wherein the detector identifies and/or quantitates the concentration of sample constituents.

12. A liquid chromatography system comprising:
a chromatographic instrument having a sample valve, a column manager and a solvent manager;
a chromatographic data system;
an external device, wherein the external device further comprising a contact wherein the contact can activate and/or regulate the solvent manager and the column manager; and a pressurized sample injection device, wherein the sample valve is connected to the column manager, the solvent manager is connected to the column manager, and each of the column manager, the solvent manager, the external device and the chromatographic data system are in communication with the other, the external device comprising a single time base, dual-channel analog to digital converter configured to trigger an internal signal to start the chromatographic instrument and chromatographic data system.

13. The system of claim 12, wherein the chromatographic instrument employs an ultra-performance liquid chromatography process, a high performance liquid chromatography process, an ultra performance convergence chromatography process, or an ultra high performance liquid chromatography process.

14. The system of claim 12, wherein the sample valve is configured to move between a first position and a second position to establish a fluidic pathway from the solvent manager to the column.

15. The system of claim 12, wherein the sample valve is configured to move between the second position and the first position to reset the sample valve for a next injection of sample.

16. The system of claim 12, further comprising a detector wherein the detector identifies and/or quantitates the concentration of sample constituents.

17. The system of claim 16, further comprising a selector valve having a first position and a second position, wherein in the first position, the selector valve establishes a fluidic pathway between the sample valve and the column, and in the second position, the selector valve establishes a fluidic pathway between the column and a detector.

18. The system of claim 12, wherein the external device is configured to generate an event output to establish a fluidic pathway between the solvent manager and the column manager.

19. A method of chromatographic detection comprising the steps of:

providing a liquid chromatography system comprising a chromatographic instrument having a sample valve, a column manager and a solvent manager;

a chromatographic data system; an external device, wherein the chromatographic data system comprises a plurality of sample set methods for acquiring data; and a pressurized sample injection device, wherein the sample valve is connected to the column manager, the solvent manager is connected to the column manager, and each of the column manager, the solvent manager, the external device and the chromatographic data system are in communication with the other;

injecting sample into the sample valve with the pressurized sample injection device;

transmitting a signal from the chromatographic data system to the external device;

receiving the signal by the external device;

producing an event output with the external device, wherein a fluidic pathway between the solvent manager and the column manager is established;

discharging solvent from the solvent manager into the sample valve;

and discharging sample into the column for chromatographic detection.

20. The method of claim 19, wherein the chromatographic instrument employs a liquid chromatography process, a high performance liquid chromatography process, an ultra performance convergence chromatography process, or an ultra high performance liquid chromatography process.

* * * * *